US010057889B2

(12) United States Patent
Li et al.

(10) Patent No.: US 10,057,889 B2
(45) Date of Patent: Aug. 21, 2018

(54) RESOURCE ASSIGNMENT METHOD AND DEVICE

(71) Applicant: Huawei Technologies Co., Ltd., Shenzhen (CN)

(72) Inventors: Chaojun Li, Beijing (CN); Xiaobo Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 15/016,843

(22) Filed: Feb. 5, 2016

(65) Prior Publication Data

US 2016/0165591 A1  Jun. 9, 2016

Related U.S. Application Data

(63) Continuation of application No. PCT/CN2013/081099, filed on Aug. 8, 2013.

(51) Int. Cl.
*H04W 72/04* (2009.01)
*H04L 1/18* (2006.01)
(Continued)

(52) U.S. Cl.
CPC .......... *H04W 72/0413* (2013.01); *H04J 3/12* (2013.01); *H04L 1/1812* (2013.01);
(Continued)

(58) Field of Classification Search
None
See application file for complete search history.

(56) References Cited

U.S. PATENT DOCUMENTS

2013/0195066 A1  8/2013  Lee et al.
2014/0161001 A1*  6/2014  Gao ................. H04W 72/0446
370/280
(Continued)

FOREIGN PATENT DOCUMENTS

CN    101778419 A    7/2010
CN    101835271 A    9/2010
(Continued)

OTHER PUBLICATIONS

"3rd Generation Partnership Project; Technical Specification Group Radio Access Network; Evolved Universal Terrestrial Radio Access (E-UTRA); Physical Layer Procedures (Release 11)," 3GPP TS 36.213, V11.3.0, Jun. 2013, 176 pages.
(Continued)

*Primary Examiner* — Saba Tsegaye
(74) *Attorney, Agent, or Firm* — Slater Matsil LLP

(57) ABSTRACT

Embodiments disclose a resource assignment method and a device. The method includes determining a first downlink subframe set, where the first downlink subframe set is associated with a first uplink subframe in both a first uplink-downlink configuration and a second uplink-downlink configuration; and determining, in the first uplink subframe, a first PUCCH resource region according to HARQ timing of the first uplink-downlink configuration, where the first PUCCH resource region is a resource region reserved for HARQ feedback information for the first downlink subframe set. A quantity and sequence numbers of elements under a first uplink-downlink configuration is used for all downlink subframes in a first downlink subframe set of later-released UE, so that a same first PUCCH resource region is assigned, so as to implement assignment of a PUCCH resource region to the later-released UE in a system compatible with two types of UEs.

28 Claims, 10 Drawing Sheets

(51) Int. Cl.
*H04J 3/12* (2006.01)
*H04L 5/00* (2006.01)

(52) U.S. Cl.
CPC .......... *H04L 1/1854* (2013.01); *H04L 1/1861* (2013.01); *H04L 5/0055* (2013.01); *H04W 72/042* (2013.01)

(56) References Cited

U.S. PATENT DOCUMENTS

2014/0293883 A1* 10/2014 Wang .................... H04W 72/04
370/329
2017/0223671 A1* 8/2017 He ...................... H04W 72/042

FOREIGN PATENT DOCUMENTS

| CN | 103152835 A | 6/2013 |
|---|---|---|
| WO | 2012060629 A2 | 5/2012 |
| WO | 2012093953 A2 | 7/2012 |
| WO | 2012106840 A1 | 8/2012 |
| WO | 2014109411 A1 | 7/2014 |

OTHER PUBLICATIONS

"3rd Generation Partnership Project: Technical Specification Group Radio Access Network; Evolved Universal Terrestrial Radio Access (E-UTRA); Radio Resource Control (RRC); Protocol Specification (Release 11)," 3GPP TS 36.331, V11.4.0, Jun. 2013, 346 pages.
Huawei, et al., "HARQ timing design for TDD eIMTA," 3GPP TSG RAN WG1 Meeting #73, R1-132409, Fukuoka, Japan, May 20-24, 2013, 4 pages.
Huawei, et al., "HARQ-ACK PUCCH resource allocation," 3GPP TSG RAN WG1 Meeting #74bis, R1-134050, Guangzhou, China, Oct. 7-11, 2013, 5 pages.
NEC Group, "Backward compatibility for TDD eIMTA system," 3GPP TSG RAN WG1 Meeting #73, R1-132333, Fukuoka, Japan, May 20-24, 2013, 4 pages.

* cited by examiner

RESOURCE ASSIGNMENT METHOD AND DEVICE

This application is a continuation of International Application No. PCT/CN2013/081099, filed on Aug. 8, 2013, which is hereby incorporated by reference in its entirety.

TECHNICAL FIELD

The present application relates to the field of communications, and in particular, to a resource assignment method and a device.

BACKGROUND

At present, in a Long Term Evolution (LTE) system, after receiving a physical downlink shared channel (PDSCH) by using a downlink subframe, user equipment (UE) needs to send, in an uplink subframe, hybrid automatic repeat request (HARQ) feedback information for the PDSCH. The HARQ feedback information includes ACK (Acknowledgement, acknowledgement)/NACK (negative acknowledgement) information, or further includes DTX (discontinuous transmission) information, where an ACK indicates that the PDSCH is received correctly, an NACK indicates that the PDSCH is received incorrectly, and the DTX indicates that the PDSCH is not received. The HARQ feedback information is fed back according to fixed HARQ timing, that is, a sending interval between the PDSCH and the HARQ feedback information is predefined. According to a HARQ timing relationship, a system reserves, in a corresponding uplink subframe, a physical uplink control channel (PUCCH) resource region for sending the HARQ feedback information. At a time for sending the HARQ feedback information, if no physical uplink shared channel (PUSCH) needs to be sent, the HARQ feedback information is carried on the PUCCH and sent.

In an LTE TDD system, an uplink-downlink configuration used by legacy UE is configured in a semi-static manner, and the configuration changes once every 640 milliseconds (ms) at least; an uplink-downlink configuration of later-released UE may change dynamically, and for example, the uplink-downlink configuration changes once every 10 ms to 40 ms.

In a TDD system, different HARQ timing is defined for different uplink-downlink configurations, and a PUCCH resource region is determined according to the HARQ timing. For a system compatible with legacy UEs and later-released UEs, when different uplink-downlink configurations are used for the legacy UE and the later-released UE, an issue how a PUCCH resource region is assigned to the later-released UE is not resolved in the prior art.

SUMMARY

The present application mainly resolves a technical issue of providing a resource assignment method and a device, which can implement assignment of a PUCCH resource region to later-released UE in a system compatible with two types of UEs.

To resolve the foregoing problem, a first aspect of the present application provides a resource assignment method, where the method includes the following steps: determining a first downlink subframe set, where the first downlink subframe set is associated with a first uplink subframe in both a first uplink-downlink configuration and a second uplink-downlink configuration; and determining, in the first uplink subframe, a first PUCCH resource region according to HARQ timing of the first uplink-downlink configuration, where the first PUCCH resource region is a resource region reserved for HARQ feedback information for the first downlink subframe set.

With reference to the first aspect, in a first possible implementation manner of the first aspect of the present application, the first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs are UEs that have a dynamic TDD uplink-downlink configuration capability, or are UEs that are configured with a dynamic TDD uplink-downlink configuration, or are later-released UEs.

With reference to the first aspect or the first possible implementation manner of the first aspect, in a second possible implementation manner of the first aspect of the present application, the step of determining, in the first uplink subframe, a first PUCCH resource region according to HARQ timing of the first uplink-downlink configuration is specifically: determining, in the first uplink subframe, the first PUCCH resource region for a downlink subframe in the first downlink subframe set according to $M_1$ and j, where $M_1$ is a quantity of elements in a downlink subframe set A that is determined according to the HARQ timing of the first uplink-downlink configuration and that is associated with the first uplink subframe, and j is a sequence number, of a downlink subframe in the first downlink subframe set, in the downlink subframe set A.

With reference to the second possible implementation manner of the first aspect, in a third possible implementation manner of the first aspect of the present application, the determining the first PUCCH resource region for a downlink subframe in the first downlink subframe set according to $M_1$ and j specifically includes: determining the first PUCCH resource region according to a formula $n_{PUCCH}^{(1,\tilde{p}x)} = (M_1 - j - 1) \cdot N_c + j \cdot N_{c+1} + n_{CCE} + x + N_{PUCCH}^{(1)}$, where $n_{PUCCH}^{(1,\tilde{p}x)}$ is a PUCCH resource in the first PUCCH resource region, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by a PDCCH transmitted in a downlink subframe in the first downlink subframe set, and $N_{PUCCH}^{(1)}$ is an offset of the first PUCCH resource region.

With reference to the first aspect or the first to third possible implementation manners of the first aspect, in a fourth possible implementation manner of the first aspect of the present application, the method further includes: determining a second downlink subframe set, where the second downlink subframe set is associated with the first uplink subframe in the second uplink-downlink configuration, and the second downlink subframe set is not associated with the first uplink subframe in the first uplink-downlink configuration; and determining, in the first uplink subframe, a second PUCCH resource region, where the second PUCCH resource region is a resource region reserved for HARQ feedback information for the second downlink subframe set.

With reference to the fourth possible implementation manner of the first aspect, in a fifth possible implementation manner of the first aspect of the present application, the determining, in the first uplink subframe, a second PUCCH resource region includes: determining $M_2$ and i, where $M_2$ is a quantity of elements in the second downlink subframe set, and i is a sequence number, of a downlink subframe in the second downlink subframe set, in the second downlink subframe set; determining a second offset $N_A$; and determining, in the first uplink subframe, the second PUCCH resource region according to $M_2$, i, and the second offset $N_A$.

With reference to the fourth possible implementation manner of the first aspect, in a sixth possible implementation manner of the first aspect of the present application, the determining, in the first uplink subframe, a second PUCCH resource region includes: determining $M_2$ and i and sending first signaling, where the first signaling indicates $M_2$ and i, where $M_2$ is a quantity of downlink subframes, for which PUCCH resource regions need to be reserved according to a PDCCH resource region, in the second downlink subframe set, and i is a sequence number of a downlink subframe, for which a PUCCH resource region needs to be reserved according to a PDCCH resource region, in the second downlink subframe set; determining a second offset $N_A$; and determining, in the first uplink subframe, the second PUCCH resource region according to $M_2$, i, and the second offset $N_A$.

With reference to the fifth or sixth possible implementation manner of the first aspect, in a seventh possible implementation manner of the first aspect of the present application, the determining a second offset $N_A$ includes: determining that the second offset $N_A$ equals a quantity of downlink subframes associated with the first uplink subframe in the first uplink-downlink configuration multiplied by a maximum quantity of CCEs that can be configured in one downlink subframe; or configuring the second offset $N_A$, and sending second signaling, where the second signaling indicates the second offset $N_A$ or $N_{PUCCH}^{(2)}$, where $N_{PUCCH}^{(2)} = N_{PUCCH}^{(1)} + N_A$; or configuring the second offset $N_A = M_1 \times N_c$, and sending third signaling, where the third signaling indicates a value of c.

With reference to the fifth to seventh possible implementation manners of the first aspect, in an eighth possible implementation manner of the first aspect of the present application, the determining, in the first uplink subframe, the second PUCCH resource region according to $M_2$, i, and the second offset $N_A$ includes: determining the second PUCCH resource region according to a formula $n_{PUCCH2}^{(1,p_x)} = (M_2 - i - 1) \cdot N_c + i \cdot N_{c+1} + n_{CCE}' + x + N_{PUCCH}^{(2)}$, where $n_{PUCCH2}^{(1,p_x)}$ is a PUCCH resource in the second PUCCH resource region, $p_x$ is an antenna port number, x is a non-negative integer, $N_c = \max\{0, \lfloor[N_{RB}^{DL} \cdot (N_{sc}^{RB} \cdot c - 4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by a PDCCH transmitted in a downlink subframe in the second downlink subframe set, and $N_{PUCCH}^{(2)} = N_{PUCCH}^{(1)} = N_A$ is an offset of the second PUCCH resource region.

A second aspect of the present application provides a resource assignment method, where the method includes the following steps: determining, by UE, a first downlink subframe set, where the first downlink subframe set is associated with a first uplink subframe in both a first uplink-downlink configuration and a second uplink-downlink configuration; receiving, by the UE, a first PDCCH in a third downlink subframe, and when the third downlink subframe belongs to the first downlink subframe set, determining, in the first uplink subframe, a third PUCCH resource according to HARQ timing of the first uplink-downlink configuration, where the third PUCCH resource is a PUCCH resource occupied by HARQ feedback information for a PDSCH scheduled by the first PDCCH or HARQ feedback information for downlink SPS release signaling indicated by the first PDCCH.

With reference to the second aspect, in a first possible implementation manner of the second aspect of the present application, the UE is UE of a second group, and the second group of UEs are UEs that have a dynamic TDD uplink-downlink configuration capability, or are UEs that are configured with a dynamic TDD uplink-downlink configuration, or are later-released UEs; the first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to the second group of UEs and that is used for indicating HARQ timing of the second group of UEs, or an uplink-downlink configuration that is used for indicating uplink-downlink subframe assignment of the second group of UEs.

With reference to the second aspect or the first possible implementation manner of the second aspect, in a second possible implementation manner of the second aspect of the present application, the determining, in the first uplink subframe, a third PUCCH resource according to HARQ timing of the first uplink-downlink configuration includes: determining, in the first uplink subframe, the third PUCCH resource for the third downlink subframe according to $M_1$ and j, where $M_1$ is a quantity of elements in a downlink subframe set A that is determined according to the HARQ timing of the first uplink-downlink configuration and that is associated with the first uplink subframe, and j is a sequence number of the third downlink subframe in the downlink subframe set A.

With reference to the second possible implementation manner of the second aspect, in a third possible implementation manner of the second aspect of the present application, the determining the third PUCCH resource for the third downlink subframe according to $M_1$ and j includes: determining the third PUCCH resource according to a formula $n_{PUCCH}^{(1,p_x)} = (M_1 - j - 1) \cdot N_c + j \cdot N_{c+1} + n_{CCE} + x + N_{PUCCH}^{(1)}$, where $n_{PUCCH}^{(1,p_x)}$ is the third PUCCH resource, $p_x$ is an antenna port number, x is a non-negative integer, $N_c = \max\{0, \lfloor[N_{RB}^{DL} \cdot (N_{sc}^{RB} \cdot c - 4)]/36\rfloor\}$, $N_{RB}^{DL}$ is a is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by the first PDCCH, and $N_{PUCCH}^{(1)}$ is an offset of the third PUCCH resource.

With reference to the second aspect or the first to third possible implementation manners of the second aspect, in a fourth possible implementation manner of the second aspect of the present application, the method further includes: determining, by the UE, a second downlink subframe set, where the second downlink subframe set is associated with the first uplink subframe in the second uplink-downlink configuration, and the second downlink subframe set is not associated with the first uplink subframe in the first uplink-downlink configuration; and receiving, by the UE, a second PDCCH in a fourth downlink subframe, and when the fourth downlink subframe belongs to the second downlink subframe set, determining a fourth PUCCH resource, where the fourth PUCCH resource is a PUCCH resource occupied by HARQ feedback information for a PDSCH scheduled by the second PDCCH or HARQ feedback information for downlink semi-persistent scheduling (SPS) release signaling indicated by the second PDCCH.

With reference to the fourth possible implementation manner of the second aspect, in a fifth possible implementation manner of the second aspect of the present application, the determining the fourth PUCCH resource includes: determining $M_2$ and i, where $M_2$ is a quantity of elements in the second downlink subframe set, and i is a sequence number of the fourth downlink subframe in the second downlink subframe set; determining a second offset $N_A$; and determining, in the first uplink subframe, the fourth PUCCH resource according to $M_2$, i, and the second offset $N_A$.

With reference to the fourth possible implementation manner of the second aspect, in a sixth possible implementation manner of the second aspect of the present application, the determining the fourth PUCCH resource includes: receiving first signaling and determining $M_2$ and i, where the first signaling indicates $M_2$ and i, where $M_2$ is a quantity of downlink subframes, for which PUCCH resource regions need to be reserved according to a PDCCH resource region, in the second downlink subframe set, and i is a sequence number of the fourth downlink subframe; determining a second offset $N_A$; and determining, in the first uplink subframe, the fourth PUCCH resource according to $M_2$, i, and the second offset $N_A$.

With reference to the fifth or sixth possible implementation manner of the second aspect, in a seventh possible implementation manner of the second aspect of the present application, the determining a second offset $N_A$ includes: determining that the second offset $N_A$ equals a quantity of downlink subframes associated with the first uplink subframe in the first uplink-downlink configuration multiplied by a maximum quantity of CCEs that can be configured in one downlink subframe; or receiving second signaling and determining the second offset $N_A$, where the second signaling indicates the second offset $N_A$ or $N_{PUCCH}^{(2)}$, where $N_{PUCCH}^{(2)} = N_{PUCCH}^{(1)} + N_A$; or receiving third signaling and determining that the second offset $N_A = M_1 \times N_c$, where the third signaling indicates a value of c.

With reference to the fifth to seventh possible implementation manners of the second aspect, in an eighth possible implementation manner of the second aspect of the present application, the determining, in the first uplink subframe, the fourth PUCCH resource according to $M_2$, i and the second offset $N_A$ includes: determining the fourth PUCCH resource according to a formula $n_{PUCCH2}^{(1,p_x)} = (M_2 - i - 1) \cdot N_c + i \cdot N_{c+1} + n_{CCE}' + x + N_{PUCCH}^{(2)}$, where $n_{PUCCH2}^{(1,p_x)}$ is the fourth PUCCH resource, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_A$ is an offset of the fourth PUCCH resource.

A third aspect of the present application provides a base station, where the base station includes: a first determining module and a first assignment module, where the first determining module is configured to determine a first downlink subframe set, where the first downlink subframe set is associated with a first uplink subframe in both a first uplink-downlink configuration and a second uplink-downlink configuration, so that the first determining module sends the first downlink subframe set to the first assignment module; and the first assignment module is configured to receive the first downlink subframe set, and determine, in the first uplink subframe, a first PUCCH resource region according to HARQ timing of the first uplink-downlink configuration, where the first PUCCH resource region is a resource region reserved for HARQ feedback information for the first downlink subframe set.

With reference to the third aspect, in a first possible implementation manner of the third aspect of the present application, the first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs are UEs that have a dynamic TDD uplink-downlink configuration capability, or are UEs that are configured with a dynamic TDD uplink-downlink configuration, or are later-released UEs.

With reference to the third aspect or the first possible implementation manner of the third aspect, in a second possible implementation manner of the third aspect of the present application, the first assignment module is specifically configured to determine, in the first uplink subframe, the first PUCCH resource region for a downlink subframe in the first downlink subframe set according to $M_1$ and j, where $M_1$ is a quantity of elements in a downlink subframe set A that is determined according to the HARQ timing of the first uplink-downlink configuration and that is associated with the first uplink subframe, and j is a sequence number, of a downlink subframe in the first downlink subframe set, in the downlink subframe set A.

With reference to the second possible implementation manner of the third aspect, in a third possible implementation manner of the third aspect of the present application, the first assignment module is specifically configured to determine the first PUCCH resource region according to a formula $n_{PUCCH}^{(1,p_x)} = (M_1 - j - 1) \cdot N_c + j \cdot N_{c+1} + n_{CCE} + x + N_{PUCCH}^{(1)}$, where $n_{PUCCH}^{(1,p_x)}$ is a PUCCH resource in the first PUCCH resource region, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by a PDCCH transmitted in a downlink subframe in the first downlink subframe set, and $N_{PUCCH}^{(1)}$ is an offset of the first PUCCH resource region.

With reference to the third aspect or the first to third possible implementation manners of the third aspect, in a fourth possible implementation manner of the third aspect of the present application, the base station further includes a second determining module and a second assignment module, where the second determining module is configured to determine a second downlink subframe set, where the second downlink subframe set is associated with the first uplink subframe in the second uplink-downlink configuration, and the second downlink subframe set is not associated with the first uplink subframe in the first uplink-downlink configuration, so that the second determining module sends the second downlink subframe set to the second assignment module; and the second assignment module is configured to receive the second downlink subframe set, and determine, in the first uplink subframe, a second PUCCH resource region, where the second PUCCH resource region is a resource region reserved for HARQ feedback information for the second downlink subframe set.

With reference to the fourth possible implementation manner of the third aspect, in a fifth possible implementation manner of the third aspect of the present application, the second assignment module includes a first determining unit, a second determining unit, and an assignment unit, where the first determining unit is further configured to determine $M_2$ and i, where $M_2$ is a quantity of elements in the second downlink subframe set, and i is a sequence number, of a downlink subframe in the second downlink subframe set, in the second downlink subframe set, so that the first determining unit sends $M_2$ and i to the assignment unit; the second determining unit is configured to determine a second offset $N_A$, so that the second determining unit sends the second offset to the assignment unit; and the assignment unit is further configured to receive $M_2$, i, and $N_A$, and determine, in the first uplink subframe, the second PUCCH resource region according to $M_2$, i, and the second offset $N_A$.

With reference to the fourth possible implementation manner of the third aspect, in a sixth possible implementation manner of the third aspect of the present application, the second assignment module includes a first determining unit, a second determining unit, and an assignment unit, where the first determining unit is further configured to determine $M_2$ and i and send first signaling, where the first signaling indicates $M_2$ and i, where $M_2$ is a quantity of downlink subframes, for which PUCCH resource regions need to be reserved according to a PDCCH resource region, in the second downlink subframe set, and i is a sequence number of a downlink subframe, for which a PUCCH resource region needs to be reserved according to a PDCCH resource region, in the second downlink subframe set, so that the first determining unit sends the second downlink subframe set to the assignment unit; the assignment unit is configured to determine a second offset $N_A$, so that the second determining unit sends the second offset to the assignment unit; and the assignment unit is further configured to receive $M_2$, i, and $N_A$, and determine, in the first uplink subframe, the second PUCCH resource region according to $M_2$, i, and the second offset $N_A$.

With reference to the fifth or sixth possible implementation manner of the third aspect, in a seventh possible implementation manner of the third aspect of the present application, the second determining unit is configured to determine that the second offset $N_A$ equals a quantity of downlink subframes associated with the first uplink subframe in the first uplink-downlink configuration multiplied by a maximum quantity of CCEs that can be configured in one downlink subframe; or the second determining unit is configured to configure the second offset $N_A$, and send second signaling, where the second signaling indicates the second offset $N_A$ or $N_{PUCCH}^{(2)}$, where $N_{PUCCH}^{(2)} = N_{PUCCH}^{(1)} + N_A$; or the second determining unit is configured to configure the second offset $N_A = M_1 \times N_c$, and send third signaling, where the third signaling indicates a value of c.

With reference to the fifth to seventh possible implementation manners of the third aspect, in an eighth possible implementation manner of the third aspect of the present application, the second assignment module is further configured to determine the second PUCCH resource region according to a formula $n_{PUCCH2}^{(1,p_x)} = (M_2 - i - 1) \cdot N_c + i \cdot N_{c+1} + n_{CCE}' + x + N_{PUCCH}^{(2)}$, where $n_{PUCCH2}^{(1,p_x)}$ is a PUCCH resource in where the second PUCCH resource region, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by a PDCCH transmitted in a downlink subframe in the second downlink subframe set, and $N_{PUCCH}^{(2)} = N_{PUCCH}^{(1)} + N_A$ is an offset of the second PUCCH resource region.

To resolve the foregoing problem, a fourth aspect of the present application provides user equipment, where the user equipment includes: a first determining module and a first assignment module, where the first determining module is configured to determine a first downlink subframe set, where the first downlink subframe set is associated with a first uplink subframe in both a first uplink-downlink configuration and a second uplink-downlink configuration, so that the first determining module sends the first downlink subframe set to the first assignment module; and the first assignment module is configured to receive the first downlink subframe set, receive a first PDCCH in a third downlink subframe, and when the third downlink subframe belongs to the first downlink subframe set, determine, in the first uplink subframe, a third PUCCH resource according to HARQ timing of the first uplink-downlink configuration, where the third PUCCH resource is a PUCCH resource occupied by HARQ feedback information for a PDSCH scheduled by the first PDCCH or HARQ feedback information for downlink SPS release signaling indicated by the first PDCCH.

With reference to the fourth aspect, in a first possible implementation manner of the fourth aspect of the present application, the UE is UE of a second group, and the second group of UEs are UEs that have a dynamic TDD uplink-downlink configuration capability, or are UEs that are configured with a dynamic TDD uplink-downlink configuration, or are later-released UEs; the first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to the second group of UEs and that is used for indicating HARQ timing of the second group of UEs, or an uplink-downlink configuration that is used for indicating uplink-downlink subframe assignment of the second group of UEs.

With reference to the fourth aspect or the first possible implementation manner of the fourth aspect, in a second possible implementation manner of the fourth aspect of the present application, the first assignment module is further configured to determine, in the first uplink subframe, the third PUCCH resource for the third downlink subframe according to $M_1$ and j, where $M_1$ is a quantity of elements in a downlink subframe set A that is determined according to the HARQ timing of the first uplink-downlink configuration and that is associated with the first uplink subframe, and j is a sequence number of the third downlink subframe in the downlink subframe set A.

With reference to the second possible implementation manner of the fourth aspect, in a third possible implementation manner of the fourth aspect of the present application, the first assignment module is further configured to determine the third PUCCH resource according to a formula $n_{PUCCH}^{(1,p_x)} = (M_1 - j - 1) \cdot N_c + j \cdot N_{c+1} + n_{CCE} + x + N_{PUCCH}^{(1)}$, where $n_{PUCCH}^{(1,p_x)}$ is the third PUCCH resource, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE} < N_{c+1}$, $n_{CCE}$ is a number of a first CCE occupied by the first PDCCH, and $N_{PUCCH}^{(1)}$ is an offset of the third PUCCH resource.

With reference to the fourth aspect or the first to third possible implementation manners of the fourth aspect, in a fourth possible implementation manner of the fourth aspect of the present application, the user equipment further includes a second determining module and a second assignment module, where the second determining module is configured to determine a second downlink subframe set, where the second downlink subframe set is associated with the first uplink subframe in the second uplink-downlink configuration, and the second downlink subframe set is not associated with the first uplink subframe in the first uplink-downlink configuration, so that the second determining module sends the second downlink subframe set to the second assignment module; and the second assignment module is configured to receive the second downlink subframe set, receive a second PDCCH in a fourth downlink subframe, and when the fourth downlink subframe belongs to the second downlink subframe set, determine a fourth PUCCH resource, where the fourth PUCCH resource is a PUCCH resource occupied by HARQ feedback information for a PDSCH scheduled by the second PDCCH or HARQ feedback information for downlink SPS release signaling indicated by the second PDCCH.

With reference to the fourth possible implementation manner of the fourth aspect, in a fifth possible implementation manner of the fourth aspect of the present application, the second assignment module includes a first determining unit, a second determining unit, and an assignment unit, where the first determining unit is configured to determine $M_2$ and i, where $M_2$ is a quantity of elements in the second downlink subframe set, and i is a sequence number of the fourth downlink subframe in the second downlink subframe set, so that the first determining unit sends $M_2$ and i to the assignment unit; the second determining unit is configured to determine a second offset $N_A$, so that the second determining unit is configured to send the second offset $N_A$ to the assignment unit; and the assignment unit is configured to receive $M_2$, i, and $N_A$, and determine, in the first uplink subframe, the fourth PUCCH resource according to $M_2$, i, and the second offset $N_A$.

With reference to the fourth possible implementation manner of the fourth aspect, in a sixth possible implementation manner of the fourth aspect of the present application, the second assignment module includes a first determining unit, a second determining unit, and an assignment unit, where the first determining unit is configured to receive first signaling and determine $M_2$ and i, where the first signaling indicates $M_2$ and i, where $M_2$ is a quantity of downlink subframes, for which PUCCH resource regions need to be reserved according to a PDCCH resource region, in the second downlink subframe set, and i is a sequence number of the fourth downlink subframe, so that the first determining unit sends $M_2$ and i to the assignment unit; the second determining unit is configured to determine a second offset $N_A$, so that the second determining unit is configured to send the second offset $N_A$ to the assignment unit; and the assignment unit is configured to receive $M_2$, i, and $N_A$, and determine, in the first uplink subframe, the fourth PUCCH resource according to $M_2$, i, and the second offset $N_A$.

With reference to the fifth or sixth possible implementation manner of the fourth aspect, in a seventh possible implementation manner of the fourth aspect of the present application, the second determining unit is further configured to determine that the second offset $N_A$ equals a quantity of downlink subframes associated with the first uplink subframe in the first uplink-downlink configuration multiplied by a maximum quantity of CCEs that can be configured in one downlink subframe; or the second determining unit is further configured to receive second signaling and determine the second offset $N_A$, where the second signaling indicates the second offset $N_A$ or $N_{PUCCH}^{(2)}$, where $N_{PUCCH}^{(2)} = N_{PUCCH}^{(1)} + N_A$; or the second determining unit is further configured to receive third signaling and determine the second offset $N_A = M_1 \times N_c$, where the third signaling indicates a value of c.

With reference to the fifth to seventh possible implementation manners of the fourth aspect, in an eighth possible implementation manner of the fourth aspect of the present application, the second assignment module is further configured to determine the fourth PUCCH resource according to a formula $n_{PUCCH2}^{(1,p_x)} = (M_2 - i - 1) \cdot N_c + i \cdot N_{c+1} + n_{CCE}' + x + N_{PUCCH}^{(2)}$, where $n_{PUCCH2}^{(1,p_x)}$ is the fourth PUCCH resource, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_A$ is an offset of the fourth PUCCH resource.

A fifth aspect of the present application provides a base station, where the base station includes: a base transceiver station BTS and a base station controller BSC, where the base transceiver station is coupled to the base station controller, the base station controller is configured to determine a first downlink subframe set, where the first downlink subframe set is associated with a first uplink subframe in both a first uplink-downlink configuration and a second uplink-downlink configuration; and determine, in the first uplink subframe, a first PUCCH resource region according to HARQ timing of the first uplink-downlink configuration, where the first PUCCH resource region is a resource region reserved for HARQ feedback information for the first downlink subframe set.

With reference to the fifth aspect, in a first possible implementation manner of the fifth aspect of the present application, the first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs are UEs that have a dynamic TDD uplink-downlink configuration capability, or are UEs that are configured with a dynamic TDD uplink-downlink configuration, or are later-released UEs.

With reference to the fifth aspect or the first possible implementation manner of the fifth aspect, in a second possible implementation manner of the fifth aspect of the present application, the base station controller is further configured to determine, in the first uplink subframe, the first PUCCH resource region for a downlink subframe in the first downlink subframe set according to $M_1$ and j, where $M_1$ is a Quantity of Elements in a Downlink subframe set A that is determined according to the HARQ timing of the first uplink-downlink configuration and that is associated with the first uplink subframe, and j is a sequence number, of a downlink subframe in the first downlink subframe set, in the downlink subframe set A.

With reference to the second possible implementation manner of the fifth aspect, in a third possible implementation manner of the fifth aspect of the present application, the base station controller is further configured to determine the first PUCCH resource region according to a formula $n_{PUCCH}^{(1,p_x)}=(M_1-j-1)\cdot N_c+j\cdot N_{c+1}+n_{CCE}+x+N_{PUCCH}^{(1)}$, where $n_{PUCCH}^{(1,p_x)}$ is a PUCCH resource in the first PUCCH resource region, $p_x$ is an antenna port number, x is a non-negative integer, $N_c=\max\{0, \lfloor [N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by a PDCCH transmitted in a downlink subframe in the first downlink subframe set, and $N_{PUCCH}^{(1)}$ is an offset of the first PUCCH resource region.

With reference to the fifth aspect or the first to third possible implementation manners of the fifth aspect, in a fourth possible implementation manner of the fifth aspect of the present application, the base station controller is further configured to determine a second downlink subframe set, where the second downlink subframe set is associated with the first uplink subframe in the second uplink-downlink configuration, and the second downlink subframe set is not associated with the first uplink subframe in the first uplink-downlink configuration; and determine, in the first uplink subframe, a second PUCCH resource region, where the second PUCCH resource region is a resource region reserved for HARQ feedback information for the second downlink subframe set.

With reference to the fourth possible implementation manner of the fifth aspect, in a fifth possible implementation manner of the fifth aspect of the present application, the base station controller is further configured to determine $M_2$ and i, where $M_2$ is a quantity of elements in the second downlink subframe set, and i is a sequence number, of a downlink subframe in the second downlink subframe set, in the second downlink subframe set; determine a second offset $N_A$; and determine, in the first uplink subframe, the second PUCCH resource region according to $M_2$, i, and the second offset $N_A$.

With reference to the fourth possible implementation manner of the fifth aspect, in a sixth possible implementation manner of the fifth aspect of the present application, the base station controller is further configured to determine $M_2$ and i and send first signaling, where the first signaling indicates $M_2$ and i, where $M_2$ is a quantity of downlink subframes, for which PUCCH resource regions need to be reserved according to a PDCCH resource region, in the second downlink subframe set, and i is a sequence number of a downlink subframe, for which a PUCCH resource region needs to be reserved according to a PDCCH resource region, in the second downlink subframe set; determine a second offset $N_A$; and determine, in the first uplink subframe, the second PUCCH resource region according to $M_2$, i, and the second offset $N_A$.

With reference to the fifth or sixth possible implementation manner of the fifth aspect, in a seventh possible implementation manner of the fifth aspect of the present application, the base station controller is further configured to determine that the second offset $N_A$ equals a quantity of downlink subframes associated with the first uplink subframe in the first uplink-downlink configuration multiplied by a maximum quantity of CCEs that can be configured in one downlink subframe; or configure the second offset $N_A$, and send second signaling, where the second signaling indicates the second offset $N_A$ or $N_{PUCCH}^{(2)}$, where $N_{PUCCH}^{(2)}=N_{PUCCH}^{(1)}+N_A$; or configure the second offset $N_A=M_1\times N_c$, and send third signaling, where the third signaling indicates a value of c.

With reference to the fifth to seventh possible implementation manners of the fifth aspect, in an eighth possible implementation manner of the fifth aspect of the present application, the base station controller is further configured to determine the second PUCCH resource region according to a formula $n_{PUCCH2}^{(1,p_x)}=(M_2-i-1)\cdot N_c+i\cdot N_{c+1}+n_{CCE}'+x+N_{PUCCH}^{(2)}$, where $n_{PUCCH2}^{(1,p_x)}$ is a PUCCH resource in the second PUCCH resource region, $p_x$ is an antenna port number, x is a non-negative integer, $N_c=\max\{0, \lfloor [N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by a PDCCH transmitted in a downlink subframe in the second downlink subframe set, and $N_{PUCCH}^{(2)}=N_{PUCCH}^{(1)}+N_A$ is an offset of the second PUCCH resource region.

A sixth aspect of the present application provides user equipment, where the user equipment includes a receiver, a processor, and a transmitter, and the processor is separately coupled to the receiver and the transmitter, where the processor is configured to determine a first downlink subframe set, where the first downlink subframe set is associated with a first uplink subframe in both a first uplink-downlink configuration and a second uplink-downlink configuration; the receiver is configured to receive a first PDCCH in a third downlink subframe; and the processor is further configured to: when the third downlink subframe belongs to the first downlink subframe set, determine, in the first uplink subframe, a third PUCCH resource according to HARQ timing of the first uplink-downlink configuration, where the third PUCCH resource is a PUCCH resource occupied by HARQ feedback information for a PDSCH scheduled by the first PDCCH or HARQ feedback information for downlink SPS release signaling indicated by the first PDCCH.

With reference to the sixth aspect, in a first possible implementation manner of the sixth aspect of the present application, the UE is UE of a second group, and the second group of UEs are UEs that have a dynamic TDD uplink-downlink configuration capability, or are UEs that are configured with a dynamic TDD uplink-downlink configuration, or are later-released UEs; the first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to the second group of UEs and that is used for indicating HARQ timing of the second group of UEs, or an uplink-downlink configuration that is used for indicating uplink-downlink subframe assignment of the second group of UEs.

With reference to the sixth aspect or the first possible implementation manner of the sixth aspect, in a second possible implementation manner of the sixth aspect of the present application, the processor is further configured to determine, in the first uplink subframe, the third PUCCH resource for the third downlink subframe according to $M_1$ and j, where $M_1$ is a quantity of elements in a downlink subframe set A that is determined according to the HARQ timing of the first uplink-downlink configuration and that is associated with the first uplink subframe, and j is a sequence number of the third downlink subframe in the downlink subframe set A.

With reference to the second possible implementation manner of the sixth aspect, in a third possible implementation manner of the sixth aspect of the present application, the processor is further configured to determine the third PUCCH resource according to a formula $n_{PUCCH}^{(1,p_x)} = (M_1 - j - 1) \cdot N_c + j \cdot N_{c+1} + n_{CCE} + x + N_{PUCCH}^{(1)}$, where $n_{PUCCH}^{(1,p_x)}$ is the third PUCCH resource, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by the first PDCCH, and $N_{PUCCH}^{(1)}$ is an offset of the third PUCCH resource.

With reference to the sixth aspect or the first to third possible implementation manners of the sixth aspect, in a fourth possible implementation manner of the sixth aspect of the present application, the processor is further configured to determine a second downlink subframe set, where the second downlink subframe set is associated with the first uplink subframe in the second uplink-downlink configuration, and the second downlink subframe set is not associated with the first uplink subframe in the first uplink-downlink configuration; the receiver is further configured to receive a second PDCCH in a fourth downlink subframe; and the processor is further configured to: when the fourth downlink subframe belongs to the second downlink subframe set, determine a fourth PUCCH resource, where the fourth PUCCH resource is a PUCCH resource occupied by HARQ feedback information for a PDSCH scheduled by the second PDCCH or HARQ feedback information for downlink SPS release signaling indicated by the second PDCCH.

With reference to the fourth possible implementation manner of the sixth aspect, in a fifth possible implementation manner of the sixth aspect of the present application, the processor is further configured to determine $M_2$ and i, where $M_2$ is a quantity of elements in the second downlink subframe set, and i is a sequence number of the fourth downlink subframe in the second downlink subframe set; determine a second offset $N_A$; and determine, in the first uplink subframe, the fourth PUCCH resource according to $M_2$, i, and the second offset $N_A$.

With reference to the fourth possible implementation manner of the sixth aspect, in a sixth possible implementation manner of the sixth aspect of the present application, the receiver is further configured to receive first signaling and determine $M_2$ and i, where the first signaling indicates $M_2$ and i, where $M_2$ is a quantity of downlink subframes, for which PUCCH resource regions need to be reserved according to a PDCCH resource region, in the second downlink subframe set, and i is a sequence number of the fourth downlink subframe; and the processor is further configured to determine a second offset $N_A$, and determine, in the first uplink subframe, the fourth PUCCH resource according to $M_2$, i, and the second offset $N_A$.

With reference to the fifth or sixth possible implementation manner of the sixth aspect, in a seventh possible implementation manner of the sixth aspect of the present application, the processor is further configured to determine that the second offset $N_A$ equals a quantity of downlink subframes associated with the first uplink subframe in the first uplink-downlink configuration multiplied by a maximum quantity of CCEs that can be configured in one downlink subframe; or the receiver is further configured to receive second signaling and determine the second offset $N_A$, where the second signaling indicates the second offset $N_A$ or $N_{PUCCH}^{(2)}$, where $N_{PUCCH}^{(2)} = N_{PUCCH}^{(1)} + N_A$; or the receiver is further configured to receive third signaling and determine the second offset $N_A = M_1 \times N_c$, where the third signaling indicates a value of c.

With reference to the fifth to seventh possible implementation manners of the sixth aspect, in an eighth possible implementation manner of the sixth aspect of the present application, the processor is further configured to determine the fourth PUCCH resource according to a formula $n_{PUCCH2}^{(1,p_x)} = (M_2 - i - 1) \cdot N_c + i \cdot N_{c+1} + n_{CCE}' + x + N_{PUCCH}^{(2)}$, where $n_{PUCCH2}^{(1,p_x)}$ is the fourth PUCCH resource, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_A$ is an offset of the fourth PUCCH resource.

In the foregoing solutions, a first downlink subframe set is separately determined by using an uplink-downlink configuration, and a quantity and sequence numbers of elements under a first uplink-downlink configuration are used for all downlink subframes in the first downlink subframe set of later-released UE, so that a same first PUCCH resource region is assigned, so as to implement assignment of a PUCCH resource region to the later-released UE in a system compatible with two types of UEs.

In addition, when a PUCCH resource region is assigned to a second group of UEs, for downlink subframes having same HARQ timing of the second group of UEs and a first group of UEs, a base station determines a PUCCH resource region according to a mapping rule of the first group of UEs, and for a downlink subframe having HARQ timing different from that of the first group of UEs, the base station determines a PUCCH resource region according to a new mapping rule, so as to ensure that there is no overlap with the PUCCH resource region of the first group of UEs; therefore, the method not only avoids complexity of implementing the base station, but also reduces PUCCH resource overheads.

DETAILED DESCRIPTION OF ILLUSTRATIVE EMBODIMENTS

Figure 1:
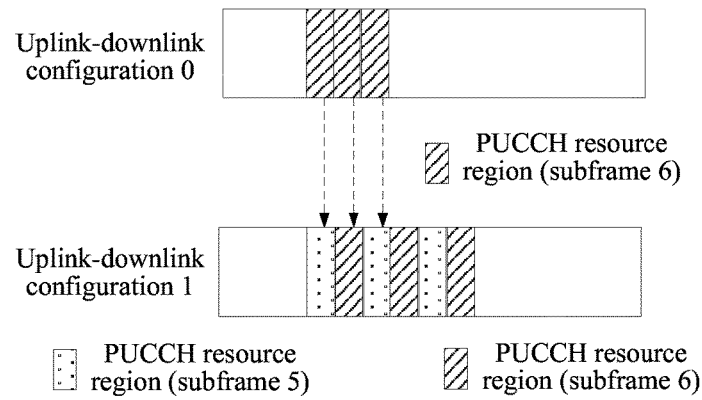
FIG. 1 is a schematic diagram of an implementation manner of assigning, in an uplink subframe, a PUCCH resource region to a downlink subframe.

In the following description, for illustration but not limitation, specific details such as a particular system structure, an interface, and a technology are provided to make a thorough understanding of the present application. However, a person skilled in the art should know that the present application may be practiced in other implementation manners without these specific details. In other cases, detailed descriptions of well-known apparatuses, circuits, and methods are omitted, so that the present application is described without being obscured by unnecessary details.

A time domain in a system is made up of radio frames. A radio frame is identified by using a system frame number (SFN) $n_f$. An SFN is to number a radio frame in a cyclic manner periodically. For example, 10 bits are used to mark an SFN, and $n_f=0, 1, 2, \ldots, 1023$, that is, radio frames are numbered from 0 to 1023 and then start to be numbered from 0 again. Each radio frame includes 10 subframes whose length is 1 ms, a subframe in each radio frame is identified by using a subframe number $n_{sbf}$, and $n_{sbf}=0, 1, 2, \ldots, 9$. Therefore, in the system, one subframe is identified by using a system frame number $n_f$ and a subframe number $n_{sbf}$ in each radio frame. The same applies to subframes (including an uplink subframe and a downlink subframe) mentioned below.

A current TDD system supports 7 uplink-downlink configurations, and a specific configuration manner of each uplink-downlink configuration is shown in the following table:

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

U represents an uplink subframe, D represents a downlink subframe, and S represents a special subframe that is mainly used for downlink transmission. In some embodiments, special subframes and downlink subframes are collectively referred to as downlink subframes. It can be known from the foregoing description of the radio frame that subframes whose subframe numbers are 0 to 9 form one radio frame. For legacy UEs, the system notifies a current uplink-downlink configuration by using broadcast information, and a configuration changes once every 640 milliseconds (ms) at least. For later-released UEs, the system may dynamically notify different uplink-downlink configurations.

HARQ timing refers to a sending timing relationship between a PDSCH (a PDSCH scheduled by using a PDCCH, and the PDCCH and the PDSCH are sent in a same downlink subframe) and HARQ feedback information, or further includes a sending timing relationship between downlink semi-persistent scheduling release PDCCH validation (SPS Release PDCCH Validation, Semi-Persistent Scheduling Release PDCCH Validation) signaling (which may be referred to as downlink SPS release signaling for short) and HARQ feedback information. The TDD system defines different HARQ timing for different uplink-downlink configurations. As shown in Table 2, the "different HARQ timing" discussed herein includes two cases: In one case, different quantities of HARQ timing are defined for different uplink-downlink configurations; for example, HARQ timing for four downlink subframes is defined for configuration 0, and HARQ timing for 6 downlink subframes is defined for configuration 1. In the other case, same downlink subframes (which refer to downlink subframes having a same subframe number) have different HARQ timing in different uplink-downlink configurations; for example, in uplink-downlink configuration 0, HARQ feedback information for a downlink subframe 0 is sent in an uplink subframe 4, and in uplink-downlink configuration 1, the HARQ feedback information for the downlink subframe 0 is sent in an uplink subframe 7. Specifically, a base station sends, in a downlink subframe n−k, a PDSCH or downlink SPS release PDCCH validation signaling to UE, and the UE sends, in an uplink subframe n, HARQ feedback information for the PDSCH or the downlink SPS release PDCCH validation signaling to the base station. In some embodiments, for ease of description, it may be briefly described that the downlink subframe n−k is associated with the uplink subframe n. The downlink subframe n−k is a $k^{th}$ subframe counted backward (that is, earlier) from the uplink subframe n, that is, according to a time order, the downlink subframe n−k appears first, and a counted $k^{th}$ subframe is the uplink subframe n, where k∈K, K is a set including M elements, the set is referred to as a downlink association set, indices of the elements included in the set are $\{k_0, k_1, \ldots, k_{M-1}\}$, and M is a quantity of the elements in the downlink association set. For different uplink-downlink configurations, different downlink association sets K may be determined in different uplink subframes.

Therefore, after an uplink-downlink configuration is determined, HARQ timing in each uplink-downlink configuration may be correspondingly determined, as shown in the following table.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in uplink-downlink configuration 0, an uplink subframe whose subframe number is 2 is used for transmitting HARQ feedback information for a sixth subframe counted backward, that is, a downlink subframe, whose subframe number is 6, of a previous radio frame. Therefore, the downlink subframe, whose subframe number is 6, of the previous radio frame is associated with an uplink subframe, whose subframe number is 2, of a current radio frame; that is, it must be in the uplink subframe, whose subframe number is 2, of the current radio frame that a PUCCH resource region is assigned to the downlink subframe, whose subframe number is 6, of the previous radio frame. In uplink-downlink configuration 1, an uplink subframe whose subframe number is 2 is used for transmitting HARQ feedback information for a sixth subframe counted backward and a seventh subframe counted backward, that is, a downlink subframe, whose subframe number is 6, of a previous radio frame and a downlink subframe, whose subframe number is 5, of the previous radio frame. Therefore, the downlink subframe, whose subframe number is 6, of the previous radio frame and the downlink subframe, whose subframe number is 5, of the previous radio frame are associated with the uplink subframe, whose subframe number is 2, of the current radio frame; that is, it must be in the uplink subframe, whose subframe number is 2, of the current radio frame that PUCCH resource regions are assigned to the downlink subframe, whose subframe number is 6, of the previous radio frame and the downlink frame, whose subframe number is 5, of the previous radio frame.

In an existing system, when a PUCCH resource carrying HARQ feedback information is determined according to a control channel element (CCE) occupied by a PDCCH, a process of determining, in the uplink subframe n, a PUCCH resource is as follows:

First, one value of c is chosen from $\{0, 1, 2, 3\}$, making $N_c \leq n_{CCE} < N_{c+1}$, where $n_{CCE}$ is a number of a first CCE used by a PDCCH transmitted in a downlink subframe n−$k_m$, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, sc is a frequency domain size of a resource block (RB), that is, a quantity of included subcarriers, $k_m$ is one element in the downlink association set K in the uplink subframe n, m is an association region index, that is, a sequence number, of a downlink subframe in a downlink subframe set, in the downlink subframe set.

Next, a PUCCH resource is determined. When only one antenna port is configured, a PUCCH resource on the antenna port $p_0$ is $n_{PUCCH}^{(1,\tilde{p}0)} = (M-m-1) \cdot N_c + m \cdot N_{c+1} + n_{CCE} + N_{PUCCH}^{(1)}$. When two antenna ports are configured, a PUCCH resource on an antenna port $p_1$ is $n_{PUCCH}^{(1,\tilde{p}1)} = (M-m-1) \cdot N_c + m \cdot N_{c+1} + n_{CCE} + 1 + N_{PUCCH}^{(1)}$. $N_{PUCCH}^{(1)}$ is configured by using higher layer signaling, and M is a quantity of elements in the downlink association set, that is, a quantity of elements in the downlink subframe set.

Multiple CCEs are configured for each DL subframe, and different CCEs correspond to different PUCCH resources; therefore, in one UL subframe, multiple PUCCH resources are reserved for a DL subframe associated with the UL subframe, and these multiple PUCCH resources form one PUCCH region, that is, in one UL subframe, one PUCCH resource region is reserved for a DL subframe associated with the UL subframe. As can be seen from the foregoing process, when m is different, that is, for different downlink subframes, reserved PUCCH resource regions are different. In addition, a control channel in each downlink subframe is divided into c regions, and correspondingly, a PUCCH resource region corresponding to each downlink subframe is also divided into c regions. When multiple downlink subframes are associated with one uplink subframe, PUCCH resource regions corresponding to the multiple downlink subframes are arranged in a staggered manner, as shown exemplarily in FIG. 1.

However, when a system needs to be compatible with both legacy UE and later-released UE, such a problem occurs: As shown in FIG. 1, it is assumed that uplink-downlink configuration 0 is used by the legacy UE. In an uplink subframe, whose subframe number is 2, of a current radio frame, a PUCCH resource region is assigned to a downlink subframe, whose subframe number is 6, of a previous radio frame. An uplink-downlink configuration 1 is used by the later-released UE. In an uplink subframe, whose subframe number is 2, of a current radio frame, PUCCH resource regions are separately assigned to downlink subframes, whose subframe numbers are 6 and 5, of a previous radio frame. For the legacy UE, M is 1, and a sequence number of the downlink subframe whose subframe number is 6 is 0; for the later-released UE, M is 2, and a sequence number of the downlink subframe whose subframe number is 5 is 0, and a sequence number of the downlink subframe whose subframe number is 6 is 1. Other parameters in the formula are all the same, and only M and m are different. Therefore, results of assignment are shown in the figure, and PUCCH resource regions assigned to UEs of two versions have an overlap. In this way, in order that the base station can distinguish, from overlapped PUCCH resource regions, a different PUCCH resource to be configured to UE of a different version, complexity of a PDCCH scheduling algorithm inevitably needs to be increased, causing a reduction in running efficiency of the base station.

Figure 2:
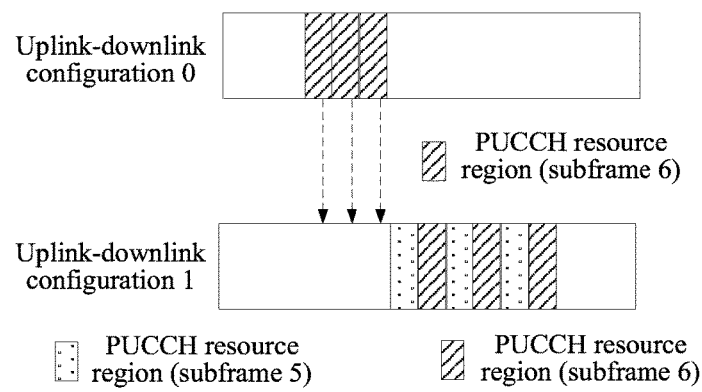
FIG. 2 is a schematic diagram of another implementation manner of assigning, in an uplink subframe, a PUCCH resource region to a downlink subframe.

To reduce complexity of the scheduling algorithm, a resource configuration method may be provided. As shown in FIG. 2, an offset is given to a PUCCH resource region of a second group of UEs, so that the PUCCH resource region of the second group and a PUCCH resource region of a first group are completely staggered. However, in this way, it is equivalent to that two PUCCH resource regions are assigned to a downlink subframe whose subframe number is 6, one PUCCH resource region is assigned to legacy UE, and one PUCCH resource region is also assigned to later-released UE, causing a waste of resources. In a same uplink subframe, when downlink subframes to which a PUCCH resource region needs to be assigned in the legacy UE and downlink subframes to which a PUCCH resource region needs to be assigned in the later-released UE have a larger quantity of common downlink subframes, the waste is severer.

Through the analysis of the foregoing two solutions, embodiments provided can avoid problems of increased complexity of an algorithm and waste of resources.

Figure 3:
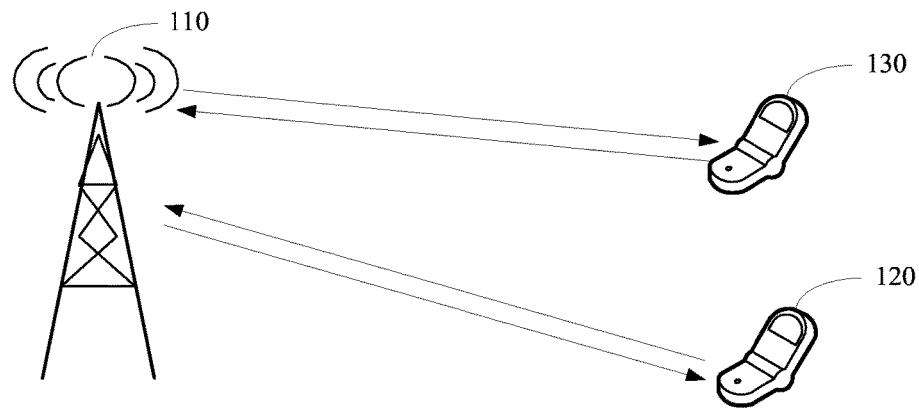
FIG. 3 is a schematic structural diagram of an implementation manner of a resource assignment system according to the present application.

Referring to FIG. 3, FIG. 3 is a schematic structural diagram of an implementation manner of a resource assignment system according to the present application. The resource assignment system in this implementation manner includes: a base station 110, a first group of UEs 120, and a second group of UEs 130. A system of the base station 110 may be compatible with both the first group of UEs 120 and the second group of UEs 130. The base station 110 may separately communicate with the first group of UEs 120 and the second group of UEs 130. The first group of UEs 120 use a first uplink-downlink configuration, and the first group of UEs 120 are UEs that do not have a dynamic TDD uplink-downlink configuration capability, or UEs that are not configured with a dynamic TDD uplink-downlink configuration by the base station, or are legacy UEs, that is, backward compatible UEs (legacy UE), for example, UEs that support LTE Release-8/9/10/11. The reference uplink-downlink configuration that is used for indicating HARQ timing of the second group of UEs or the second uplink-downlink configuration that is used for indicating uplink-downlink subframe assignment of the second group of UEs, the second group of UEs 130 are UEs that have a dynamic TDD uplink-downlink configuration capability, or UEs that are configured with a dynamic TDD uplink-downlink configuration by the base station, or are later-released UEs, for example, UEs that support LTE Release-12, or support releases later than LTE Release-12.

Figure 4:
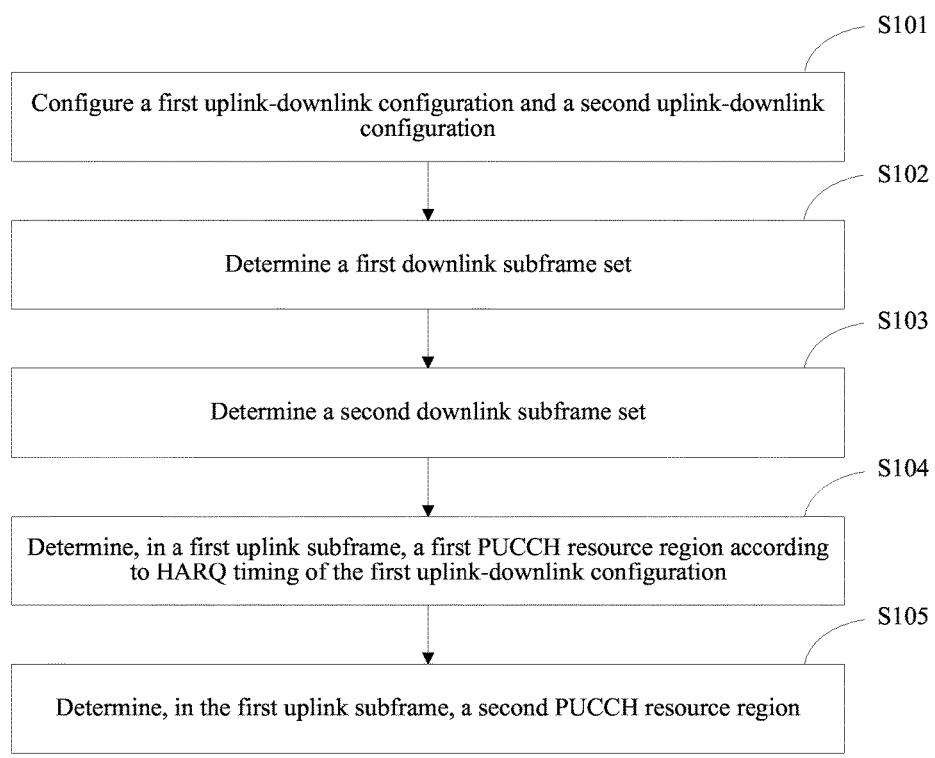
FIG. 4 is a flowchart of a first implementation manner of a resource assignment method according to the present application.

FIG. 4 is a flowchart of a first implementation manner of a resource assignment method according to the present application. This implementation manner is described by using an example in which a base station is used as an executing entity. As shown in FIG. 4, the method in this embodiment may include:

S101: A base station configures a first uplink-downlink configuration and a second uplink-downlink configuration.

The base station determines two UE groups according to a UE capability, a service requirement, release information, or the like. For example, a first group of UEs are UEs that do not have a dynamic TDD uplink-downlink configuration capability, and a second group of UEs are UEs that have a dynamic TDD uplink-downlink configuration capability; or the first group of UEs are UEs that are not configured with a dynamic TDD uplink-downlink configuration by the base station, and the second group of UEs are UEs that are configured with a dynamic TDD uplink-downlink configuration by the base station; or the first group of UEs are legacy UEs, that is, backward compatible UEs (legacy UE), for example, UEs that support LTE Release-8/9/10/11, and the second group of UEs are later-released UEs, for example, UEs that support LTE Release-12, or support releases later than LTE Release-12.

The base station configures the first uplink-downlink configuration for the first group of UEs, that is, the first uplink-downlink configuration is an uplink-downlink configuration applied to the first group of UEs. The base station may notify, by using higher layer signaling, preferably, by using a SIB1 (system information block 1), the first group of UEs of the first uplink-downlink configuration. The higher layer signaling is relative to physical layer signaling, is signaling that is from a higher layer and has a smaller sending frequency, and includes Radio Resource Control (RRC) signaling, Media Access Control (MAC) signaling, and the like.

The base station configures the second uplink-downlink configuration for the second group of UEs, that is, the second uplink-downlink configuration is an uplink-downlink configuration applied to the second group of UEs. The second uplink-downlink configuration may be used for indicating uplink-downlink subframe assignment, in other words, used for indicating a subframe that can be used for transmitting uplink-downlink data. Correspondingly, the second uplink-downlink configuration changes in a relatively dynamic manner, and the base station may notify, by using physical layer signaling, the second group of UEs of the second uplink-downlink configuration. Alternatively, preferably, the second uplink-downlink configuration may be a reference uplink-downlink configuration (reference UL-DL configuration), and the reference uplink-downlink configuration is used for determining HARQ timing of the UEs. In an application scenario of a dynamic TDD uplink-downlink configuration, an uplink-downlink configuration may change dynamically, and correspondingly, HARQ timing also changes dynamically. In this way, it is caused that within a period when the uplink-downlink configuration is changing, HARQ feedback information for some downlink packets cannot be sent. Therefore, a reference uplink-downlink configuration is introduced, and even if the uplink-downlink configuration changes, the UEs also determine HARQ timing according to this configuration, thereby avoiding a problem that HARQ feedback information for a downlink packet cannot be sent within the period when the uplink-downlink configuration is changing. Preferably, the reference uplink-downlink configuration is a configuration in which a quantity of downlink subframes is larger than that of uplink subframes, for example, uplink-downlink configuration 5 or uplink-downlink configuration 2. There are three methods for configuring a reference uplink-downlink configuration: 1. The base station may notify, by using higher layer signaling (for example, RRC signaling), the second group of UEs of the second uplink-downlink configuration. 2. It is predefined in the standards that a reference uplink-downlink configuration is uplink-downlink configuration 5 or uplink-downlink configuration 2. 3. A rule for determining a reference uplink-downlink configuration is predefined in the standards, and the base station and the UE both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of two uplink-downlink configurations before and after switching belongs to a downlink-to-uplink switching point period of 10 ms, uplink-downlink configuration 5 is used as a reference uplink-downlink configuration.

During communication, if the first uplink-downlink configuration and the second uplink-downlink configuration used by the first group of UEs and the second group of UEs are a same uplink-downlink configuration, PUCCH resource regions assigned to the first group of UEs and the second group of UEs are identical, problems of overlapped PUCCH resource regions and waste of resources do not exist. When the first uplink-downlink configuration is used by the first group of UEs, and the second uplink-downlink configuration is used by the second group of UEs (assuming that uplink-downlink configuration 0 shown in Table 1 is used by the first group of UEs and uplink-downlink configuration 1 shown in Table 1 is used by the second group of UEs), referring to Table 2, for the first group of UEs, in an uplink subframe whose subframe number is 2, a PUCCH resource region needs to be assigned to a downlink subframe, whose subframe number is 6, of a previous radio frame, and for the second group of UEs, in an uplink subframe whose subframe number is 2, PUCCH resource regions need to be assigned to downlink subframes, whose subframe numbers are 5 and 6, of the previous radio frame. That is, a downlink subframe set of a first uplink subframe associated with the first group of UEs by which the first uplink-downlink configuration is used is {6}, and a downlink subframe set of a first uplink subframe associated with the second group of UEs by which the second uplink-downlink configuration is used is {5, 6}.

For the first group of UEs, PUCCH resource region assignment may be performed according to an existing algorithm. For the second group of UEs, PUCCH resource region assignment must be performed according to the following.

S102: The base station determines a first downlink subframe set, where the first downlink subframe set is associated with a first uplink subframe in both the first uplink-downlink configuration and the second uplink-downlink configuration.

Although different HARQ timing is defined for different uplink-downlink configurations, for some downlink subframes, same HARQ timing still exists in two uplink-downlink configurations. Therefore, the base station determines that one subframe set includes these downlink subframes, so as to subsequently reserve a PUCCH resource region according to a rule.

Therefore, the base station determines the first downlink subframe set, where the first downlink subframe set is associated with the first uplink subframe in both the first uplink-downlink configuration and the second uplink-downlink configuration. The base station determines, according to HARQ timing of the first uplink-downlink configuration, a downlink subframe set A associated with the first uplink subframe, and next, the base station determines, according to HARQ timing of the second uplink-downlink configuration, a downlink subframe set B associated with the first uplink subframe; finally, the base station determines that the first downlink subframe set is an intersection set of the downlink subframe set A and the downlink subframe set B. For example, for an uplink subframe whose subframe number is 2, the first downlink subframe set is an intersection set, that is, a set {6}, of a set {6} and a set {5, 6}. Similarly, if uplink-downlink configuration 1 is used by the first group of UEs, and uplink-downlink configuration 2 is used for the second group of UEs, the first downlink subframe set is an intersection set, that is, a set {5, 6}, of a set {5, 6} and a set {4, 5, 8, 6}. If uplink-downlink configuration 2 is used by the first group of UEs, and uplink-downlink configuration 3 is used by the second group of UEs, the first downlink subframe set is an intersection set, that is, a set {5, 6}, of a set {4, 5, 8, 6} and a set {5, 6, 1}.

S103: The base station determines a second downlink subframe set, where the second downlink subframe set is associated with the first uplink subframe in the second uplink-downlink configuration, and the second downlink subframe set is not associated with the first uplink subframe in the first uplink-downlink configuration.

The base station determines the second downlink subframe set, where the second downlink subframe set is a complementary set of the first downlink subframe set in a downlink subframe set that is associated with the first uplink subframe and that is determined according to HARQ timing of the second uplink-downlink configuration. Therefore, the base station determines, according to the first uplink-downlink configuration, a downlink subframe set A associated with the first uplink subframe, and next, the base station determines, according to the second uplink-downlink configuration, a downlink subframe set B associated with the first uplink subframe; finally, the base station determines that the second downlink subframe set is an intersection set of a complementary set $\overline{A}$ of the downlink subframe set A and the downlink subframe set B. That is, a downlink subframe included in the second downlink subframe set does not belong to the downlink subframe set A, but belongs to the downlink subframe set B. For example, for an uplink subframe whose subframe number is 2, the second downlink subframe set is a complementary set, that is, a set {5}, of the first downlink subframe set {6} in a set {5, 6}. Similarly, if uplink-downlink configuration 1 is used by the first group of UEs, and uplink-downlink configuration 2 is used by the second group of UEs, the second downlink subframe set is a complementary set, that is, a set {4, 8}, of the first downlink subframe set {5, 6} in a set {4, 5, 8, 6}. If uplink-downlink configuration 2 is used by the first group of UEs, and uplink-downlink configuration 3 is used by the second group of UEs, the second downlink subframe set is a complementary set, that is, a set {1}, of the first downlink subframe set {5, 6} in a set {5, 6, 1}.

S104: The base station determines, in the first uplink subframe, a first PUCCH resource region according to HARQ timing of the first uplink-downlink configuration, where the first PUCCH resource region is a resource region reserved for HARQ feedback information for the first downlink subframe set.

The HARQ feedback information for the first downlink subframe set refers to HARQ feedback information for a PDSCH or downlink SPS release signaling sent in a downlink subframe in the first downlink subframe set.

For the first downlink subframe set, the base station determines a PUCCH resource region for the second group of UEs according to the HARQ timing of the first uplink-downlink configuration. Specifically, the base station assigns the first PUCCH resource region to the first downlink subframe set according to $M_1$ and j, where $M_1$ is a quantity of elements in a downlink subframe set A that is determined according to the HARQ timing of the first uplink-downlink configuration and that is associated with the first uplink subframe, and j is a sequence number, of a downlink subframe in the first downlink subframe set, in the downlink subframe set A. In this way, for the first downlink subframe set, the base station configures the same PUCCH resource region for the first group of UEs and the second group of UEs, which not only avoids complexity of implementing the base station, but also reduces PUCCH resource overheads.

Specifically, the base station assigns a PUCCH resource region to a downlink subframe in the first downlink subframe set according to a formula $n_{PUCCH}^{(1,p_x)}=(M_1-j-1)\cdot N_c+j\cdot N_{c+1}+n_{CCE}+x+N_{PUCCH}^{(1)}$, wherein $n_{PUCCH}^{(1,p_x)}$ is a PUCCH resource in the first PUCCH resource region, $p_x$ is an antenna port number, where when an antenna port is $p_0$, x=0, when an antenna port is $p_1$, x=1, and it is similar when there are more antenna ports, $M_1$ is a quantity of elements in the downlink subframe set A that is determined according to the first uplink-downlink configuration and that is associated with the first uplink subframe, j is a sequence number, of a downlink subframe in the first downlink subframe set, in the downlink subframe set A, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} \leq N_{c+1}$, $n_{CCE}$ is a number of a first CCE occupied by a PDCCH transmitted in a downlink subframe in the first downlink subframe set, and $N_{PUCCH}^{(1)}$ is an offset of the first PUCCH resource region, and is configured by using higher layer signaling, that is, a resource offset configured for the first group of UEs.

Therefore, for the first group of UEs and the second group of UEs, values of parameters $M_1$ and j used for determining a PUCCH resource of the first downlink subframe set are identical. Therefore, for the first group of UEs and the second group of UEs, PUCCH resource regions assigned to same downlink subframes are identical.

For example, when the first downlink subframe set is $\{6\}$, and a downlink subframe set associated with the first uplink subframe in the first uplink-downlink configuration is $\{6\}$, a sequence number of a downlink subframe 6 is 0. Similarly, when the first downlink subframe set is $\{5, 6\}$, and a downlink subframe set associated with the first uplink subframe in the first uplink-downlink configuration is $\{5, 6\}$, a sequence number of a downlink subframe 5 in the downlink subframe set associated with the first uplink subframe in the first uplink-downlink configuration is 0, and a sequence number of a downlink subframe 6 in the downlink subframe set associated with the first uplink subframe in the first uplink-downlink configuration is 1. When the first downlink subframe set is $\{5, 6\}$, and a downlink subframe set associated with the first uplink subframe in the first uplink-downlink configuration is $\{4, 5, 8, 6\}$, a sequence number of a downlink subframe 5 is 1, and a sequence number of a downlink subframe 6 is 3.

S105: The base station determines, in the first uplink subframe, a second PUCCH resource region, where the second PUCCH resource region is a resource region reserved for HARQ feedback information for the second downlink subframe set.

Step S105 may be implemented by using two solutions.

Figure 5:
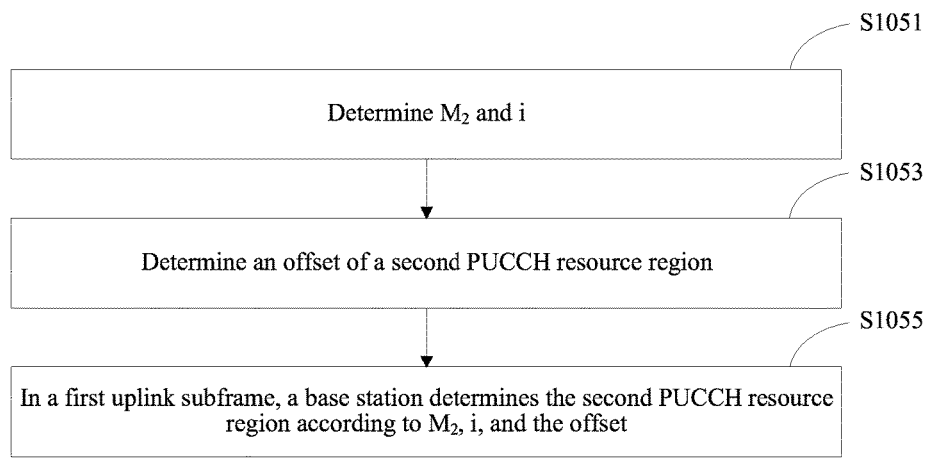
FIG. 5 is a flowchart of determining, in a first uplink subframe, a second PUCCH resource region in solution 1 in the first implementation manner of the resource assignment method according to the present application.

In solution 1, referring to FIG. 5, FIG. 5 is a flowchart of determining, in a first uplink subframe, a second PUCCH resource region in solution 1 in the first implementation manner of the resource assignment method according to the present application. A design objective of the second PUCCH resource region includes two points: 1. To avoid an overlap with the PUCCH resource region determined for the first group of UEs. 2. To make the second PUCCH resource region occupy a relatively small quantity of resources. To achieve the foregoing two objectives, determining of the second PUCCH resource region may include 2 steps, step S1051 and step S1053:

S1051: The base station determines $M_2$ and i, where $M_2$ is a quantity of elements in the second downlink subframe set, and i is a sequence number, of a downlink subframe in the second downlink subframe set, in the second downlink subframe set.

S1053: The base station determines an offset of the second PUCCH resource region, where an offset makes a PUCCH resource region assigned to the second downlink subframe set and a PUCCH resource region assigned to the first group of UEs completely stagger.

A method for determining an offset is to make an offset equal a quantity of downlink subframes associated with the first uplink subframe in the first uplink-downlink configuration multiplied by a maximum quantity of CCEs that can be configured in one downlink subframe. A maximum quantity of OFDM symbols included in a PDCCH resource region corresponding to one downlink subframe may be 3, or may be 4, which is specifically determined by a bandwidth of a system. When the bandwidth is relatively large, the maximum quantity of symbols may be 3, and when the bandwidth is relatively small, the maximum quantity of symbols may be 4. A quantity of CCEs that is determined according to the maximum quantity of OFDM (Orthogonal Frequency Division Multiplexing) symbols may ensure a sufficient offset to make a PUCCH resource region assigned to the first downlink subframe set and a PUCCH resource region assigned to the second downlink subframe set completely stagger; however, a few resources may be wasted, because a quantity of OFDM symbols occupied by a PDCCH resource region may change dynamically.

In another method, an offset is made to equal a quantity of downlink subframes associated with the first uplink subframe in the first uplink-downlink configuration multiplied by a quantity of CCEs actually configured in one downlink subframe. For example, a maximum quantity of OFDM symbols included in a PUCCH resource region corresponding to one downlink subframe may be 3, but in fact only two OFDM symbols are currently configured. In this way, according to an actual configuration, a PUCCH resource region assigned to the first downlink subframe set and a PUCCH resource region assigned to the second downlink subframe set are made to just stagger, thereby reducing resource overheads.

Specifically, the foregoing two methods may be further divided into the following four methods to determine an offset.

Method 1: A rule is predetermined in the standards, and the rule needs to ensure that PUCCH resource regions configured for the first group of UEs and the second group of UEs do not crash, thereby avoiding complexity of implementing a base station. For example, it is assumed that a PDCCH region occupies a maximum of four OFDM symbols, and $N_A=M_1 \times N_4$, $M_1$ represents a quantity of elements in a downlink subframe set that is determined according to the first uplink-downlink configuration and that is associated with the first uplink subframe, or a distinction may be made according to a downlink system bandwidth, where when the downlink system bandwidth is less than or equal to 10 RBs, the PDCCH region occupies a maximum of four OFDM symbols $N_4$, or otherwise, the PDCCH region occupies a maximum of three OFDM symbols $N_3$; therefore, the offset $N_A$ may be determined according to the following formula:

$$N_\Delta = \begin{cases} M_1 \times N_4 & (N_{RB}^{DL} \leq 10) \\ M_1 \times N_3 & (N_{RB}^{DL} > 10) \end{cases}$$

Method 2: $N_\Delta$ may be configured by using higher layer signaling, or in consideration of a scenario of a dynamic TDD uplink-downlink configuration, $N_\Delta$ may be configured by using physical layer signaling. It should be noted that, for the first group of UEs, one offset $N_{PUCCH}^{(1)}$ is also configured by using higher layer signaling, and correspondingly, for the second downlink subframe set, an actual offset is $N_{PUCCH}^{(2)} = N_{PUCCH}^{(1)} + N_\Delta$; therefore, optionally, $N_{PUCCH}^{(2)}$ is configured by using higher layer signaling, or is configured by using physical layer signaling.

Method 3: Similarly, $N_\Delta$ $M_1 \times N_c$, and the value of c may be configured by using higher layer signaling, or in consideration of a scenario of a dynamic TDD uplink-downlink configuration, the value of c may be configured by using physical layer signaling. For example, when a PDCCH region actually occupies two OFDM symbols, the base station configures that c=2.

By means of Method 2 or 3, the base station is more flexible, and the base station may flexibly configure $N_\Delta$ or $N_{PUCCH}^{(2)}$ according to a quantity of OFDM symbols actually occupied by a PDCCH region, where when the quantity of OFDM symbols actually occupied by a PDCCH region is less than 4 or 3, PUCCH resource overheads may be further reduced.

S1055: In the first uplink subframe, the base station determines the second PUCCH resource region according to $M_2$, i, and an offset $N_\Delta$.

Specifically, the base station 110 assigns a PUCCH resource region to a downlink subframe in the second downlink subframe set according to a formula $n_{PUCCH2}^{(1,p_x)} = (M_2-i-1) \cdot N_c + i \cdot N_{c+1} + n_{CCE}' + x + N_{PUCCH}^{(2)}$, where $n_{PUCCH2}^{(1,p_x)}$ is a PUCCH resource in the second PUCCH resource region, $p_x$ is an antenna port number, where when an antenna port is $p_0$, x=0, and when an antenna port is $p_1$, x=1, $M_2$ is a quantity of elements in the second downlink subframe set, i is a sequence number, of a downlink subframe in the second downlink subframe set, in the second downlink subframe set, $N_c = \max\{0, \lfloor [N_{RB}^{DL} \cdot (N_{sc}^{RB} \cdot c-4)]/36 \rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE}' < N_{c+1}$, $n_{CCE}'$ is a number of a first CCE occupied by a PDCCH transmitted in a downlink subframe in the second downlink subframe set, and $N_{PUCCH}^{(2)} = N_{PUCCH}^{(1)} + N_\Delta$ is an offset of the second PUCCH resource region.

Figure 6:
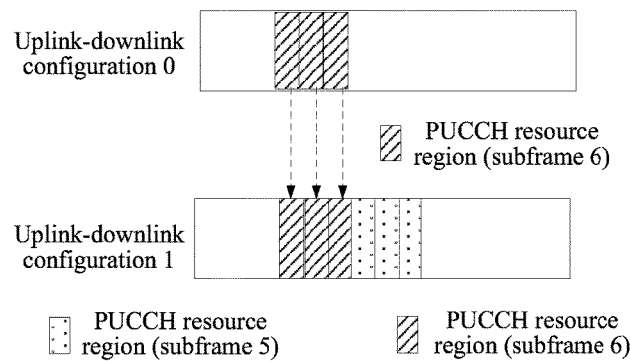
FIG. 6 is a schematic diagram of a result obtained after assignment in which uplink-downlink configuration 0 is used by a first group of UEs and uplink-downlink configuration 1 is used by a second group of UEs according to the present application.

Referring to FIG. 6, if uplink-downlink configuration 0 shown in Table 1 is used by the first group of UEs 120, and uplink-downlink configuration 1 shown in Table 1 is used by the second group of UEs, a result after assignment is shown in FIG. 6.

Figure 7:
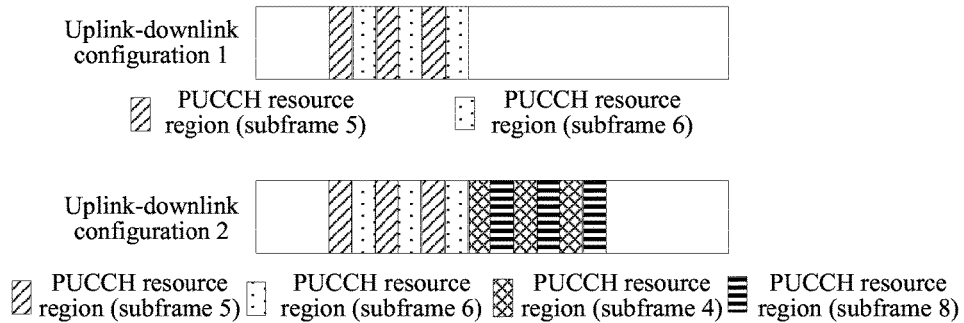
FIG. 7 is a schematic diagram of a result obtained after assignment in which uplink-downlink configuration 1 is used by a first group of UEs and uplink-downlink configuration 2 is used by a second group of UEs according to the present application.

Referring to FIG. 7, if uplink-downlink configuration 1 shown in Table 1 is used by the first group of UEs 120, and uplink-downlink configuration 2 shown in Table 1 is used by the second group of UEs, a result after assignment is shown in FIG. 7.

Figure 8:
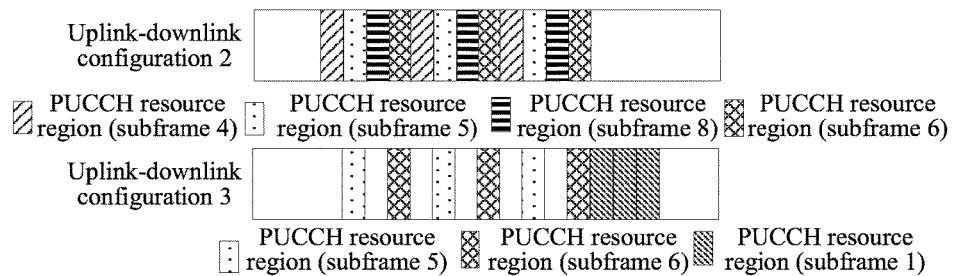
FIG. 8 is a schematic diagram of a result obtained after assignment in which uplink-downlink configuration 2 is used by a first group of UEs and uplink-downlink configuration 3 is used by a second group of UEs according to the present application.

Referring to FIG. 8, if uplink-downlink configuration 2 shown in Table 1 is used by the first group of UEs 120, and uplink-downlink configuration 3 shown in Table 1 is used by the second group of UEs, a result after assignment is shown in FIG. 8.

Figure 9:
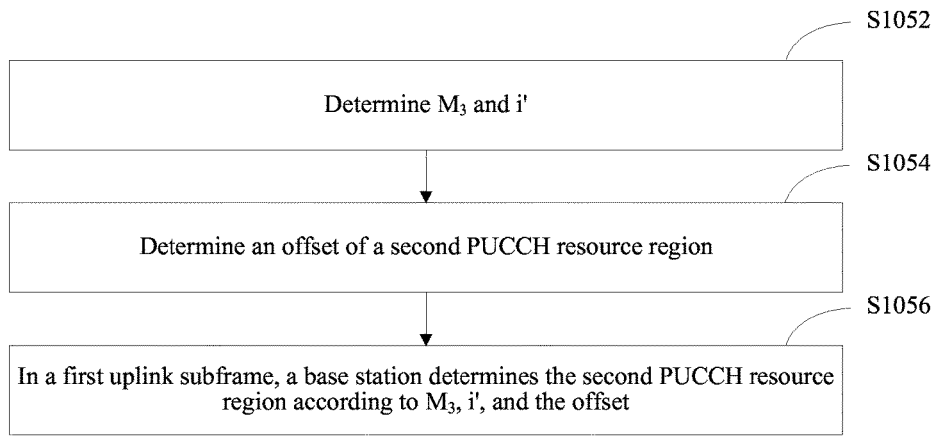
FIG. 9 is a flowchart of determining, in a first uplink subframe, a second PUCCH resource region in solution 2 in the first implementation manner of the resource assignment method according to the present application.

As an optional solution, solution 2 is more flexible. Referring to FIG. 9, FIG. 9 is a flowchart of determining, in a first uplink subframe, a second PUCCH resource region in solution 2 in the first implementation manner of the resource assignment method according to the present application.

The second downlink subframe set may include subframes of two types: one is a downlink subframe in which a PDCCH region is configured; and the other is a downlink subframe in which a PDCCH region is not configured. For the downlink subframe in which a PDCCH region is not configured, two cases are included: 1. the downlink subframe in which a PDCCH region is not configured but an ePDCCH (enhanced PDCCH) region is configured, where in a subframe of this type, a PUCCH resource is reserved according to a rule of mapping of an ePDCCH resource to a PUCCH resource in an existing solution; 2. a false downlink subframe, that is, a downlink subframe is currently configured to be an uplink subframe or an empty subframe, where when the second uplink-downlink configuration is a reference uplink-downlink configuration, the configuration cannot indicate uplink-downlink subframe assignment in an actual manner; therefore, some subframes in the second downlink subframe set may be configured to be uplink subframes or empty subframes that do not transmit data. Therefore, if a PUCCH region still needs to be reserved for these subframes in which PDCCH regions are not configured, a waste of PUCCH resources is caused. Solution 2 is to resolve the problem, and specifically includes 3 steps.

S1052: The base station determines $M_3$ and i', where $M_3$ is a quantity of downlink subframes, in which PDCCH regions are configured, in the second downlink subframe set, and i' is a sequence number of a downlink subframe, in which a PDCCH region is configured, in the second downlink subframe set, or $M_3$ is a quantity of downlink subframes, for which PUCCH resource regions need to be reserved according to a PDCCH resource region, in the second downlink subframe set, and i' is a sequence number of a downlink subframe, for which a PUCCH resource region needs to be reserved according to a PDCCH resource region, in the second downlink subframe set.

Optionally, the base station may notify the second group of UEs of values of $M_3$ and i' by using higher layer signaling or physical layer signaling.

S1054: The base station determines an offset $N_\Delta$ of the second PUCCH resource region, where the offset makes a PUCCH resource region assigned to the second downlink subframe set and a PUCCH resource region assigned to the first group of UEs completely stagger.

See S1053 for details, which are not described herein.

S1056: In the first uplink subframe, the base station determines the second PUCCH resource region according to $M_3$, i', and the offset $N_\Delta$.

Specifically, the base station assigns a PUCCH resource region to a downlink subframe in the second downlink subframe set according to a formula $n_{PUCCH2}^{(1,p_x)} = (M_3-i'-1) \cdot N_c + i' \cdot N_{c+1} + n_{CCE}' + x + N_{PUCCH}^{(2)}$, where $n_{PUCCH2}^{(1,p_x)}$ is a PUCCH resource in the second PUCCH resource region, $p_x$ is an antenna port number, where when an antenna port is $p_0$, x=0, and when an antenna port is $p_1$, x=1, $N_c = \max\{0, \lfloor [N_{RB}^{DL} \cdot (N_{sc}^{RB} \cdot c-4)]/36 \rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE}' < N_{c+1}$, $n_{CCE}'$ is a number of a first CCE occupied by a PDCCH transmitted in a downlink subframe in the second downlink subframe set, and $N_{PUCCH}^{(2)} = N_{PUCCH}^{(1)} + N_\Delta$ is an offset of the second PUCCH resource region.

After the method is used, for example, the second downlink subframe set is {a downlink subframe 4, a downlink subframe 8}, but a PDCCH region is not configured in the downlink subframe 8. In this way, the base station may configure that $M_3=1$, and the downlink subframe 4 corresponds to i'=0. For example, the second downlink subframe set is {a downlink subframe 9, a downlink subframe 0, a downlink subframe 3, a downlink subframe 7, a downlink subframe 1}, but PDCCH region is not configured in the downlink subframe 9 and the downlink subframe 3. In this way, the base station may configure that $M_3=3$, and the downlink subframe 0 corresponds to i'=0, the downlink subframe 7 corresponds to i'=1, and the downlink subframe 1 corresponds to i'=2.

It should be noted that step S101 takes place first, followed by step S102 and step S103, and finally step S104 and step S105. There may be no specific timing relationship between step S102 and step S103, where step S102 and step S103 may be performed synchronously, or may be performed sequentially, or only step S102 or only step S103 may be performed. Similarly, there may also be no specific timing relationship between step S104 and step S105, where step S104 and step S105 may be performed synchronously, or may be performed sequentially, or only step S104 or only step S105 may be performed. As can be seen from FIG. 4 to FIG. 6, in the resource assignment method provided in this embodiment, when a PUCCH resource region is assigned to the second group of UEs, for downlink subframes having same HARQ timing of the second group of UEs and the first group of UEs, the base station determines a PUCCH resource region according to a mapping rule of the first group of UEs, and for a downlink subframe having HARQ timing different from that of the first group of UEs, the base station determines a PUCCH resource region according to a new mapping rule, so as to ensure that there is no overlap with a PUCCH resource region of the first group of UEs; therefore, the method not only avoids complexity of implementing the base station, but also reduces PUCCH resource overheads.

Figure 10:
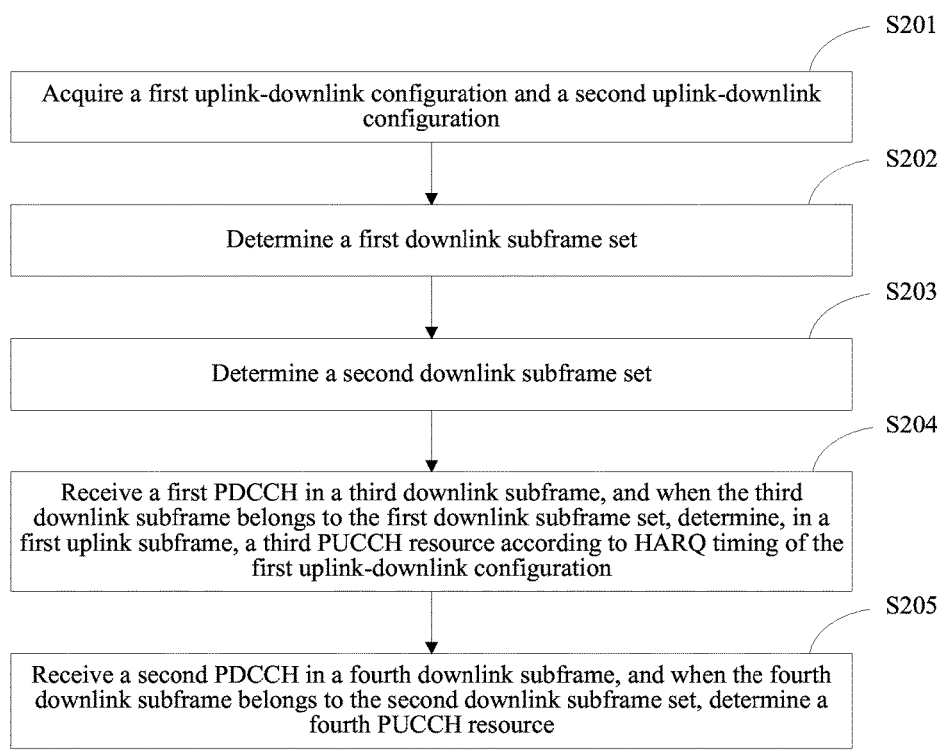
FIG. 10 is a flowchart of a second implementation manner of a resource assignment method according to the present application.

Referring to FIG. 10, FIG. 10 is a flowchart of a second implementation manner of a resource assignment method according to the present application. This embodiment is described by using an example in which UE is used as an executing entity. As shown in FIG. 10, the method in this embodiment may include the following steps.

S201: UE acquires a first uplink-downlink configuration and a second uplink-downlink configuration.

The UE is UE of the second group described in step S101, that is, the second group of UEs are UEs that have a dynamic TDD uplink-downlink configuration capability; or the second group of UEs are UEs that are configured with a dynamic TDD uplink-downlink configuration by a base station; or the second group of UEs are later-released UEs, for example, UEs that support LTE Release-12, or support releases later than LTE Release-12.

The first uplink-downlink configuration is an uplink-downlink configuration applied to a first group of UEs. Although the UE is UE of the second group, the first uplink-downlink configuration may be acquired according to a manner of the first group of UEs, that is, by receiving higher layer signaling, and preferably, the UE acquires the first uplink-downlink configuration by receiving a SIB1.

The second uplink-downlink configuration is an uplink-downlink configuration applied to the second group of UEs. The second uplink-downlink configuration may be used for indicating uplink-downlink subframe assignment, and correspondingly, the UE may acquire the second uplink-downlink configuration by receiving physical layer signaling.

Alternatively, preferably, the second uplink-downlink configuration may be a reference uplink-downlink configuration (reference UL-DL configuration), and the reference uplink-downlink configuration is used for determining HARQ timing of the UEs. The UE may acquire the second uplink-downlink configuration by receiving higher layer signaling (for example, RRC signaling), or it is predefined in the standards that a reference uplink-downlink configuration is uplink-downlink configuration 5 or uplink-downlink configuration 2, or a rule for determining a reference uplink-downlink configuration is predefined in the standards, and the base station and the UE both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

S202: The UE determines a first downlink subframe set, where the first downlink subframe set is associated with a first uplink subframe in both the first uplink-downlink configuration and the second uplink-downlink configuration.

Although different HARQ timing is defined for different uplink-downlink configurations, for some downlink subframes, same HARQ timing still exists in two uplink-downlink configurations. Therefore, the UE determines that one subframe set includes these downlink subframes, so as to subsequently reserve a PUCCH resource region according to a rule used by the first group of UEs.

Specific details are the same as those in S102 in Embodiment 1 on the base station side, and are not repeated herein.

S203: The UEs determines a second downlink subframe set, where the second downlink subframe set is associated with the first uplink subframe in the second uplink-downlink configuration, and the second downlink subframe set is not associated with the first uplink subframe in the first uplink-downlink configuration.

The UE determines the second downlink subframe set, where the second downlink subframe set is a complementary set of the first downlink subframe set in a downlink subframe set that is determined according to the second uplink-downlink configuration and that is associated with the first uplink subframe.

Specific details are the same as those in step S103 in Embodiment 1 on the base station side, and are not repeated herein.

S204: The UE receives a first PDCCH in a third downlink subframe, and when the third downlink subframe belongs to the first downlink subframe set, determines, in the first uplink subframe, a third PUCCH resource according to HARQ timing of the first uplink-downlink configuration, where the third PUCCH resource is a PUCCH resource occupied by HARQ feedback information for a PDSCH scheduled by the first PDCCH or HARQ feedback information for downlink SPS release signaling indicated by the first PDCCH.

For a downlink subframe in the first downlink subframe set, the UE determines a PUCCH resource region according to the HARQ timing of the first uplink-downlink configuration. Specifically, the UE determines the third PUCCH resource for the third downlink subframe according to $M_1$ and j, where $M_1$ is a quantity of elements in a downlink subframe set A that is determined according to the HARQ timing of the first uplink-downlink configuration and that is associated with the first uplink subframe, and j is a sequence number of the third downlink subframe in the downlink subframe set A.

Specifically, the UE assigns a PUCCH resource to the third downlink subframe according to a formula $n_{PUCCH}^{(1,p_x)}=(M_1-j-1)\cdot N_c+j\cdot N_{c+1}+n_{CCE}+x+N_{PUCCH}^{(1)}$, where $n_{PUCCH}^{(1,p_x)}$ is the third PUCCH resource, $p_x$ is an antenna port number, where when an antenna port is $p_0$, x=0, and when an antenna port is $p_1$, x=1, $M_1$ is a quantity of elements in the downlink subframe set A that is determined according to the first uplink-downlink configuration and that is associated with the first uplink subframe, j is a sequence number of the third downlink subframe in the downlink subframe set A, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by the first PDCCH, and $N_{PUCCH}^{(1)}$ is an offset of the third PUCCH resource, and is configured by using higher layer signaling, that is, a resource offset configured for the first group of UEs.

In this way, for the first downlink subframe set, a same PUCCH resource region is configured for both the first group of UEs and the second group of UEs, and CCEs occupied by PDCCHs of different UEs are different, and therefore, determined PUCCH resources are also different, which not only avoids complexity of implementing the base station, but also reduces PUCCH resource overheads.

S205: The UE receives a second PDCCH in a fourth downlink subframe, and when the fourth downlink subframe belongs to the second downlink subframe set, determines a fourth PUCCH resource, where the fourth PUCCH resource is a PUCCH resource occupied by HARQ feedback information for a PDSCH scheduled by the second PDCCH or HARQ feedback information for downlink SPS release signaling indicated by the second PDCCH.

Figure 11:
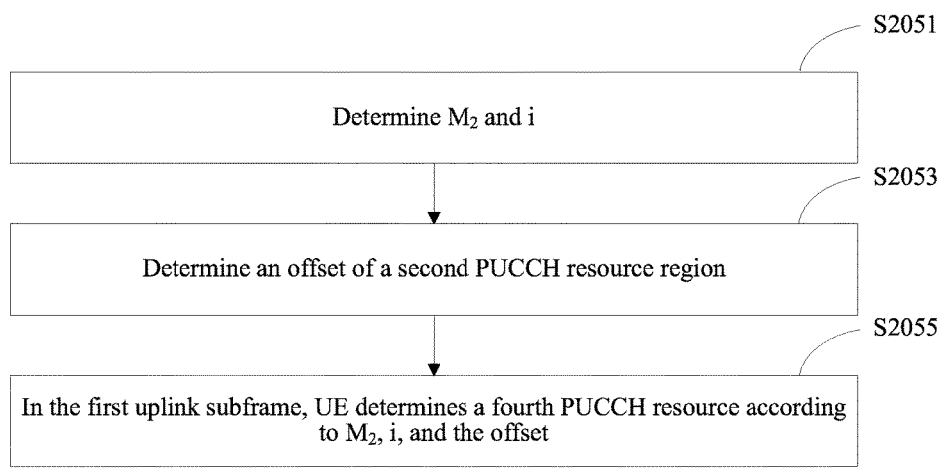
FIG. 11 is a flowchart of determining a fourth PUCCH resource in solution 1 in the second implementation manner of the resource assignment method according to the present application.

Step S205 may be implemented by using two solutions:

In solution 1, referring to FIG. 11, FIG. 11 is a flowchart of determining a fourth PUCCH resource in solution 1 in the second implementation manner of the resource assignment method according to the present application. Determining of a fourth PUCCH resource may include 2 steps.

S2051: The UE determines $M_2$ and i, where $M_2$ is a quantity of elements in the second downlink subframe set, and i is a sequence number of the fourth downlink subframe in the second downlink subframe set.

S2053: The UE determines an offset $N_\Delta$, where the offset makes a PUCCH resource region assigned to the second downlink subframe set and a PUCCH resource region assigned to the first group of UEs completely stagger.

A method for determining an offset is to make an offset equal a quantity of downlink subframes associated with the first uplink subframe in the first uplink-downlink configuration multiplied by a maximum quantity of CCEs that can be configured in one downlink subframe.

In another method, an offset is made to equal a quantity of downlink subframes associated with the first uplink subframe in the first uplink-downlink configuration multiplied by a quantity of CCEs actually configured in one downlink subframe.

Specifically, the methods may be divided into the following four methods to determine an offset.

Method 1: A rule is predetermined in the standards, and the rule needs to ensure that PUCCH resource regions configured for the first group of UEs and the second group of UEs do not crash, thereby avoiding complexity of implementing a base station. For example, it is assumed that a PDCCH region occupies a maximum of four OFDM symbols, and $N_\Delta=M_1 \times N_4$, $M_1$ represents a quantity of elements in a downlink subframe set that is determined according to the first uplink-downlink configuration and that is associated with the first uplink subframe, or a distinction may be made according to a downlink system bandwidth, where when the downlink system bandwidth is less than or equal to 10 RBs, the PDCCH region occupies a maximum of four OFDM symbols $N_4$, or otherwise, the PDCCH region occupies a maximum of three OFDM symbols $N_3$; therefore, the offset $N_\Delta$ may be determined according to the following formula:

$$N_\Delta = \begin{cases} M_1 \times N_4 & (N_{RB}^{DL} \leq 10) \\ M_1 \times N_3 & (N_{RB}^{DL} > 10) \end{cases}$$

Method 2: The UE receives higher layer signaling or physical layer signaling, where the higher layer signaling or physical layer signaling indicates $N_\Delta$. It should be noted that, for the first group of UEs, one offset $N_{PUCCH}^{(1)}$ is also configured by using higher layer signaling, and correspondingly, for the second downlink subframe set, an actual offset is $N_{PUCCH}^{(2)}=N_{PUCCH}^{(1)}+N_\Delta$; therefore, optionally, the UE receives higher layer signaling or physical layer signaling, where the higher layer signaling or physical layer signaling indicates $N_{PUCCH}^{(2)}$.

Method 3: Similarly, $N_\Delta=M_1 \times N_c$, and the UE receives higher layer signaling or physical layer signaling, where the higher layer signaling or physical layer signaling indicates a value of c.

S2055: In the first uplink subframe, the UE determines a fourth PUCCH resource according to $M_2$, i, and the offset $N_\Delta$.

Specifically, the UE assigns a PUCCH resource to the fourth downlink subframe according to a formula $n_{PUCCH2}^{(1,p_x)}=(M_2-i-1)\cdot N_c+i\cdot N_{c+1}+n_{CCE}'+x+N_{PUCCH}^{(2)}$, where $n_{PUCCH2}^{(1,p_x)}$ is a fourth PUCCH resource in a second PUCCH resource region, $p_x$ is an antenna port number, where when an antenna port is $p_0$, x=0, and when an antenna port is $p_1$, x=1, $M_2$ is a quantity of elements in the second downlink subframe set, i is a sequence number of the fourth downlink subframe in the second downlink subframe set, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ a number of a first CCE occupied by the second PDCCH, and $N_{PUCCH}^{(2)}=N_{PUCCH}^{(1)}+N_\Delta$ is an offset of the fourth PUCCH resource.

Figure 12:
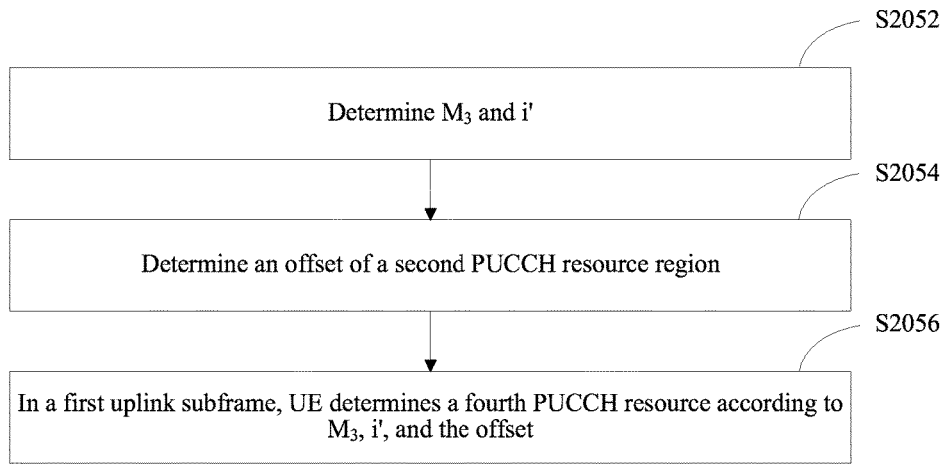
FIG. 12 is a flowchart of determining a fourth PUCCH resource in solution 2 in the second implementation manner of the resource assignment method according to the present application.

Solution 2 is more flexible. Referring to FIG. 12, FIG. 12 is a flowchart of determining a fourth PUCCH resource in solution 2 in the second implementation manner of the resource assignment method according to the present application. Specifically, 3 steps are included.

S2052: Determine $M_3$ and i', where $M_3$ is a quantity of downlink subframes, in which PDCCH regions are configured, in the second downlink subframe set, and i' is a sequence number of the fourth downlink subframe, or $M_3$ is a quantity of downlink subframes, for which PUCCH resource regions need to be reserved according to a PDCCH resource region, in the second downlink subframe set, and i' is a sequence number of the fourth downlink subframe.

Optionally, the UE acquires values of $M_3$ and i' by receiving higher layer signaling or physical layer signaling sent by the base station.

S2054: Determine an offset $N_A$ of the second PUCCH resource region, where the offset makes a PUCCH resource region assigned to the second downlink subframe set and a PUCCH resource region assigned to the first group of UEs completely stagger.

See S2053 for details, which are not described herein.

S2056: In the first uplink subframe, the UE determines a fourth PUCCH resource according to $M_3$, i', and the offset $N_A$.

Specifically, the UE assigns a PUCCH resource to the fourth downlink subframe according to a formula $n_{PUCCH2}^{(1,p_x)} = (M_3 - i' - 1) \cdot N_c + i' \cdot N_{c+1} + n_{CCE}' + x + N_{PUCCH}^{(2)}$, where $n_{PUCCH2}^{(1,p_x)}$ is a fourth PUCCH resource in the second PUCCH resource region, $p_x$ is an antenna port number, where when an antenna port is $p_0$, x=0, and when an antenna port is $p_1$, x=1, $N_c = \max\{0, \lfloor [N_{RB}^{DL} \cdot (N_{sc}^{RB} \cdot c - 4)]/36 \rfloor \}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_A$ is an offset of the fourth PUCCH resource.

After the method is used, for example, the second downlink subframe set is {a downlink subframe 4, a downlink subframe 8}, but a PDCCH region is not configured in the downlink subframe 8. In this way, the base station may configure that $M_3=1$, and the downlink subframe 4 corresponds to i'=0. For example, the second downlink subframe set is {a downlink subframe 9, a downlink subframe 0, a downlink subframe 3, a downlink subframe 7, a downlink subframe 1}, but PDCCH regions are not configured in the downlink subframe 9 and the downlink subframe 3. In this way, the base station may configure that $M_3=3$, and the downlink subframe 0 corresponds to i'=0, the downlink subframe 7 corresponds to i'=1, and the downlink subframe 1 corresponds to i'=2.

It should be noted that step S201 takes place first, followed by step S202 and step S203, and finally step S204 and step S205. There may be no specific timing relationship between step S202 and step S203, where S202 and S203 may be performed synchronously, or may be performed sequentially, or only step S202 or only step S203 may be performed. Similarly, there may also be no specific timing relationship between step S204 and step S205, where step S204 and step S205 may be performed synchronously, or may be performed sequentially, or only step S204 or only step S205 may be performed.

In the resource assignment method provided in this embodiment, when a PUCCH resource region is assigned to a second group of UEs, for downlink subframes having same HARQ timing of the second group of UEs and a first group of UEs, a base station determines a PUCCH resource region according to a mapping rule of the first group of UEs, and for a downlink subframe having HARQ timing different from that of the first group of UEs, the base station determines a PUCCH resource region according to a new mapping rule, so as to ensure that there is no overlap with a PUCCH resource region of the first group of UEs; therefore, the method not only avoids complexity of implementing the base station, but also reduces PUCCH resource overheads.

Figure 13:
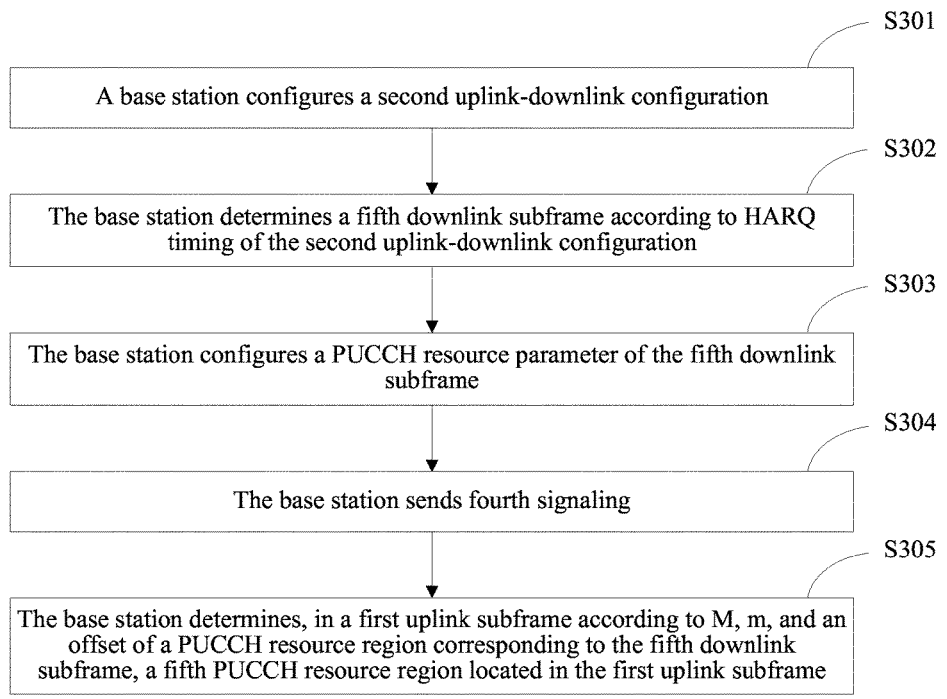
FIG. 13 is a flowchart of a third implementation manner of a resource assignment method according to the present application.

Referring to FIG. 13, FIG. 13 is a flowchart of a third implementation manner of a resource assignment method according to the present application. This embodiment is described by using an example in which a base station is used as an executing entity. As shown in FIG. 13, the method in this embodiment may include the following steps.

S301: A base station configures a second uplink-downlink configuration.

A first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs are UEs that have a dynamic TDD uplink-downlink configuration capability, or are UEs that are configured with a dynamic TDD uplink-downlink configuration, or are later-released UEs.

Specific details are the same as those in S101 in Embodiment 1, and are not repeated herein.

S302: The base station determines a fifth downlink subframe according to HARQ timing of the second uplink-downlink configuration, where the fifth downlink subframe is associated with a first uplink subframe.

The fifth downlink subframe is associated with the first uplink subframe, that is, HARQ feedback information for a PDSCH (scheduled by a PDCCH) or downlink SPS release signaling transmitted in the fifth downlink subframe is carried in the first uplink subframe. HARQ feedback information for multiple downlink subframes may need to be sent in the first uplink subframe according to the HARQ timing of the second uplink-downlink configuration. The fifth downlink subframe discussed herein may be any downlink subframe of the multiple downlink subframes, and has universality. For example, the second uplink-downlink configuration is a configuration 1, and according to the HARQ timing of the second uplink-downlink configuration, HARQ feedback information for downlink subframes whose subframe numbers are 5 and 6 is both fed back in an uplink subframe whose subframe number is 2; therefore, the fifth downlink subframe may be a downlink subframe 5, or may be a downlink subframe 6.

S303: The base station configures a PUCCH resource parameter of the fifth downlink subframe, where the PUCCH resource parameter includes M, m, and $N_{PUCCH}^{(2)}$, or the PUCCH resource parameter includes M, m, and $N_A$.

The base station may adaptively configure M according to a current subframe configuration status, where M is a positive integer. M indicates a discrete level of a PUCCH resource region corresponding to the fifth downlink subframe. As discussed above, when one downlink subframe set has multiple downlink subframes, PUCCH resource regions of the multiple downlink subframes are distributed in a staggered manner. For example, a PUCCH resource region corresponding to the fifth downlink subframe is divided into three pieces or four pieces, when the base station configures that M=1, the three pieces or four pieces of PUCCH resource regions are continuous, and when the base station configures that M>1, the three pieces or four pieces of the PUCCH resource regions are discrete, where a larger value of M indicates a higher discrete level.

m is a sequence number of the fifth downlink subframe, where m is a non-negative integer and is less than M. For example, when M=1, the base station can configure only that a sequence number of the fifth downlink subframe is 0, and when M=2, the base station may configure that a sequence number of the fifth downlink subframe is 0 or 1.

$N_{PUCCH}^{(2)}=N_{PUCCH}^{(1)}+N_A$ is an offset of the PUCCH resource region corresponding to the fifth downlink subframe, $N_{PUCCH}^{(2)}$ is a non-negative integer, $N_A$ is a non-negative integer, $N_{PUCCH}^{(1)}$ is an offset of a PUCCH resource configured for the first group of UEs. The base station may adaptively configure $N_{PUCCH}^{(2)}$ or $N_A$, or may configure $N_{PUCCH}^{(2)}$ or $N_A$ by using the method given in step S1052 in Embodiment 1.

S304: The base station sends fourth signaling, where the fourth signaling indicates the PUCCH resource parameter, or the fourth signaling indicates at least one parameter of M, m, and $N_{PUCCH}^{(2)}$, or the fourth signaling indicates at least one parameter of M, m, and $N_A$.

The fourth signaling may be higher layer signaling, or may be physical layer signaling. When the fourth signaling is physical layer signaling, the fourth signaling may be carried by using a PDCCH/ePDCCH; for example, the fourth signaling and signaling for indicating an uplink-downlink subframe configuration share one PDCCH.

S305: The base station determines, in the first uplink subframe according to M, m, and $N_{PUCCH}^{(2)}$, a fifth PUCCH resource region located in the first uplink subframe, where the fifth PUCCH resource region is a resource region reserved for HARQ feedback information for the fifth downlink subframe.

Specifically, the base station determines the fifth PUCCH resource region according to a formula $n_{PUCCH}^{(1,p_x)}=(M-m-1)\cdot N_c+m\cdot N_{c+1}+n_{CCE}+x+N_{PUCCH}^{(2)}$, where $n_{PUCCH}^{(1,p_x)}$ is a PUCCH resource in the fifth PUCCH resource region, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE} < N_{c+1}$, $n_{CCE}$ is a number of a first CCE occupied by a PDCCH transmitted in the fifth downlink subframe, and $N_{PUCCH}^{(2)}=N_{PUCCH}^{(1)}+N_A$ is an offset of the fifth PUCCH resource region.

In the resource assignment method provided in this embodiment, a base station has higher flexibility of configuration, and according to a current subframe configuration status and a data scheduling status, the base station may adaptively configure at least one parameter of M, m, and $N_{PUCCH}^{(2)}$, which not only avoids increasing complexity of implementing the base station, but also can greatly reduce reserved PUCCH resources. For example, when a first group of UEs in a system has a very small quantity or the first group of UEs perform transmission in only limited downlink subframes (for example, although the first group of UEs may perform transmission in downlink subframes 0, 1, 5, and 6, the base station schedules the first group of UEs in only the subframe 0), the base station may configure at least one parameter of M, m, and $N_{PUCCH}^{(2)}$ to enable a PUCCH resource region reserved for a second group of UEs and a PUCCH resource region reserved for the first group of UEs to overlap partially or overlap completely.

Figure 14:
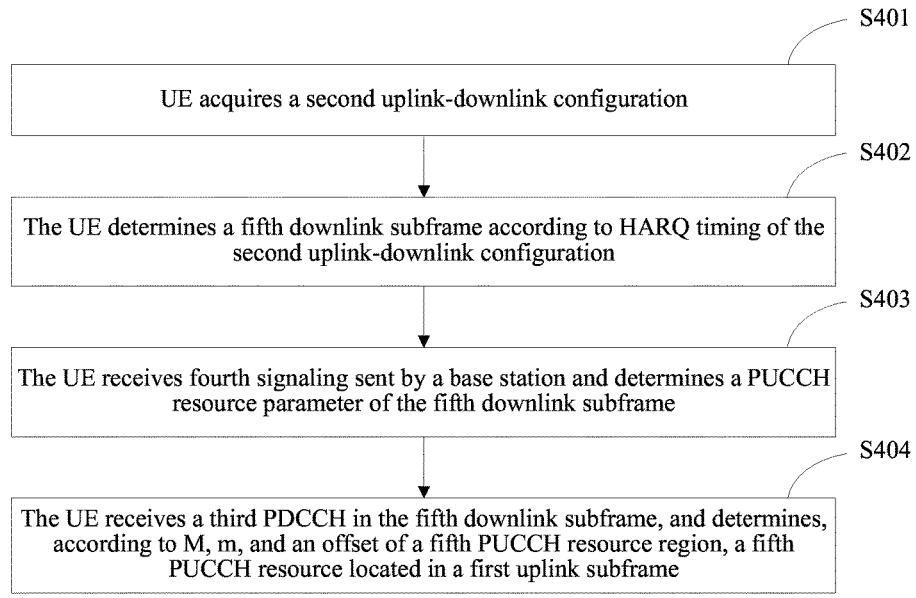
FIG. 14 is a flowchart of a fourth implementation manner of a resource assignment method according to the present application.

Referring to FIG. 14, FIG. 14 is a flowchart of a fourth implementation manner of a resource assignment method according to the present application. This embodiment is described by using an example in which UE is used as an executing entity, and as shown in FIG. 14, the method in this embodiment may include the following steps.

S401: UE acquires a second uplink-downlink configuration.

The UE is UE of a second group. The second group of UEs are UEs that have a dynamic TDD uplink-downlink configuration capability; or the second group of UEs are UEs that are configured with a dynamic TDD uplink-downlink configuration by a base station; or the second group of UEs are later-released UEs, for example, UEs that support LTE Release-12, or support releases later than LTE Release-12.

A first uplink-downlink configuration is an uplink-downlink configuration applied to the first group of UEs. Although the UE is UE of the second group, the first uplink-downlink configuration may be acquired according to a manner of the first group of UEs, that is, by receiving higher layer signaling, and preferably, the UE acquires the first uplink-downlink configuration by receiving a SIB1.

The second uplink-downlink configuration is an uplink-downlink configuration applied to the second group of UEs. The second uplink-downlink configuration may be used for indicating uplink-downlink subframe assignment, and correspondingly, the UE may acquire the second uplink-downlink configuration by receiving physical layer signaling. Alternatively, preferably, the second uplink-downlink configuration may be a reference uplink-downlink configuration (reference UL-DL configuration), and the reference uplink-downlink configuration is used for determining HARQ timing of the UEs. The UE may acquire the second uplink-downlink configuration by receiving higher layer signaling (for example, RRC signaling), or it is predefined in the standards that a reference uplink-downlink configuration is uplink-downlink configuration 5 or uplink-downlink configuration 2, or a rule for determining a reference uplink-downlink configuration is predefined in the standards, and the base station and the UE both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

S402: The UE determines a fifth downlink subframe according to HARQ timing of the second uplink-downlink configuration, where the fifth downlink subframe is associated with a first uplink subframe.

The fifth downlink subframe is associated with the first uplink subframe, that is, HARQ feedback information for a PDSCH (scheduled by a PDCCH) or downlink SPS release signaling transmitted in the fifth downlink subframe is carried in the first uplink subframe. Specific details are the same as those in S301 in Embodiment 3, and are not repeated herein.

S403: The UE receives fourth signaling sent by the base station and determine a PUCCH resource parameter of the fifth downlink subframe, where the PUCCH resource parameter includes M, m, and $N_{PUCCH}^{(2)}$, or the PUCCH resource parameter includes M, m, and $N_A$, and the fourth signaling indicates the PUCCH resource parameter, or the fourth signaling indicates at least one parameter of M, m, and $N_{PUCCH}^{(2)}$, or the fourth signaling indicates at least one parameter of M, m, and $N_A$.

The fourth signaling may be higher layer signaling, or may be physical layer signaling. When the fourth signaling is physical layer signaling, the fourth signaling may be carried by using a PDCCH/ePDCCH; for example, the fourth signaling and signaling for indicating an uplink-downlink subframe configuration share one PDCCH.

The UE determines the PUCCH resource parameter of the fifth downlink subframe according to the fourth signaling, and a PUCCH resource parameter that is not included in the fourth signaling is determined by the UE according to a predefined rule, for example, the rule described in Embodiment 2.

S404: The UE receives a third PDCCH in the fifth downlink subframe, and determines, according to M, m, and $N_{PUCCH}^{(2)}$, a fifth PUCCH resource located in the first uplink subframe, where the fifth PUCCH resource is a PUCCH resource occupied by HARQ feedback information for a PDSCH scheduled by the third PDCCH or HARQ feedback information for downlink SPS release signaling indicated by the third PDCCH.

Specifically, the base station determines the fifth PUCCH resource according to a formula $n_{PUCCH}^{(1,p_x)} = (M-m-1) \cdot N_c + m \cdot N_{c+1} + n_{CCE} + x + N_{PUCCH}^{(2)}$, where $n_{PUCCH}^{(1,p_x)}$ is the fifth PUCCH resource, $p_x$ is an antenna port number, x is a non-negative integer, $N_c = \max\{0, \lfloor [N_{RB}^{DL} \cdot (N_{sc}^{RB} \cdot c - 4)] / 36 \rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE} < N_{c+1}$, $n_{CCE}$ is a number of a first CCE occupied by the third PDCCH, and $N_{PUCCH}^{(2)} = N_{PUCCH}^{(1)} + N_\Delta$ is an offset of the fifth PUCCH resource.

The resource assignment method provided in this embodiment, a base station has higher flexibility of configuration, and according to a current subframe configuration status and a data scheduling status, the base station may adaptively configure at least one parameter of M, m, and $N_{PUCCH}^{(2)}$, which not only avoids increasing complexity of implementing the base station, but also can greatly reduce reserved PUCCH resources.

Figure 15:
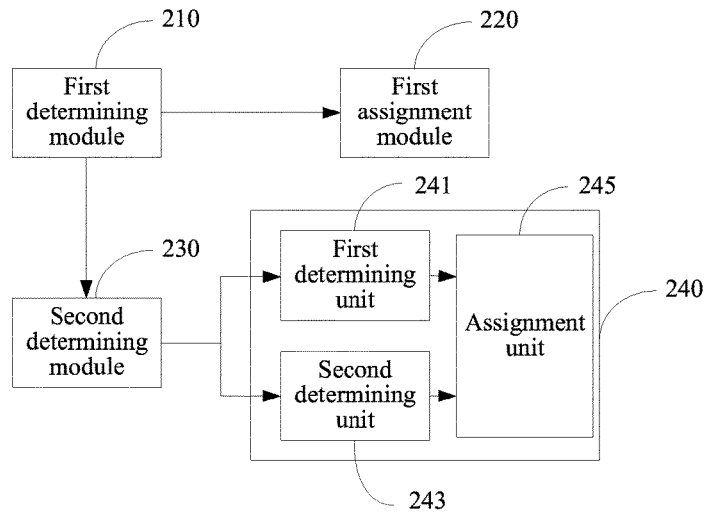
FIG. 15 is a schematic structural diagram of a first implementation manner of a base station according to the present application.

Referring to FIG. 15, FIG. 15 is a schematic structural diagram of a first implementation manner of a base station according to the present application. The base station in this implementation manner includes: a first determining module 210, a first assignment module 220, a second determining module 230, and a second assignment module 240.

The first determining module 210 is configured to determine a first downlink subframe set, where the first downlink subframe set is associated with a first uplink subframe in both a first uplink-downlink configuration and a second uplink-downlink configuration.

For example, the base station determines two UE groups according to a UE capability, a service requirement, release information, or the like. For example, a first group of UEs are UEs that do not have a dynamic TDD uplink-downlink configuration capability, and a second group of UEs are UEs that have a dynamic TDD uplink-downlink configuration capability; or the first group of UEs are UEs that are not configured with a dynamic TDD uplink-downlink configuration by the base station, and the second group of UEs are UEs that are configured with a dynamic TDD uplink-downlink configuration by the base station; or the first group of UEs are legacy UEs, that is, backward compatible UEs (legacy UE), for example, UEs that support LTE Release-8/9/10/11, and the second group of UEs are later-released UEs, for example, UEs that support LTE Release-12, or support releases later than LTE Release-12.

The base station configures the first uplink-downlink configuration for the first group of UEs, that is, the first uplink-downlink configuration is an uplink-downlink configuration applied to the first group of UEs. The base station may notify the first group of UEs of the first uplink-downlink configuration by using higher layer signaling, preferably, by using a SIB1 (system information block 1).

The higher layer signaling is relative to physical layer signaling, is signaling that is from a higher layer and has a smaller sending frequency, and includes Radio Resource Control (RRC) signaling, Media Access Control (MAC) signaling, and the like.

The base station configures the second uplink-downlink configuration for the second group of UEs, that is, the second uplink-downlink configuration is an uplink-downlink configuration applied to the second group of UEs. The second uplink-downlink configuration may be used for indicating uplink-downlink subframe assignment, in other words used for indicating a subframe that can be used for transmitting uplink-downlink data. Correspondingly, the second uplink-downlink configuration changes in a relatively dynamic manner, and the base station may notify, by using physical layer signaling, the second group of UEs of the second uplink-downlink configuration. Alternatively, preferably, the second uplink-downlink configuration may be a reference uplink-downlink configuration (reference UL-DL configuration), and the reference uplink-downlink configuration is used for determining HARQ timing of the UEs. In an application scenario of a dynamic TDD uplink-downlink configuration, an uplink-downlink configuration may change dynamically, and correspondingly, HARQ timing also changes dynamically. In this way, it is caused that within a period when an uplink-downlink configuration is changing, HARQ feedback information for some downlink packets cannot be sent; therefore, a reference uplink-downlink configuration is introduced, and even if the uplink-downlink configuration changes, the UEs also determine HARQ timing according to this configuration, thereby avoiding a problem that HARQ feedback information for a downlink packet cannot be sent within the period when the uplink-downlink configuration is changing. Preferably, the reference uplink-downlink configuration is a configuration in which a quantity of downlink subframes is larger than that of uplink subframes, for example, uplink-downlink configuration 5 or uplink-downlink configuration 2. There are three methods for configuring a reference uplink-downlink configuration: 1. The base station may notify, by using higher layer signaling (for example, RRC signaling), the second group of UEs of the second uplink-downlink configuration. 2. It is predefined in the standards that a reference uplink-downlink configuration is uplink-downlink configuration 5 or uplink-downlink configuration 2. 3. A rule for determining a reference uplink-downlink configuration is predefined in the standards, and the base station and the UEs both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

For the first group of UEs, PUCCH resource region assignment may be performed according to an existing algorithm. For the second group of UEs, PUCCH resource region assignment must be performed according to the following.

Although different HARQ timing is defined for different uplink-downlink configurations, for some downlink subframes, same HARQ timing still exists in two uplink-downlink configurations. Therefore, the base station determines that one subframe set includes these downlink subframes, so as to subsequently reserve a PUCCH resource region according to a rule.

Therefore, the base station determines the first downlink subframe set, where the first downlink subframe set is associated with the first uplink subframe in both the first uplink-downlink configuration and the second uplink-downlink configuration. The base station determines, according to HARQ timing of the first uplink-downlink configuration, a downlink subframe set A associated with the first uplink subframe, and next, the base station determines, according to HARQ timing of the second uplink-downlink configuration, a downlink subframe set B associated with the first uplink subframe; finally, the first determining module 210 determines that the first downlink subframe set is an intersection set of the downlink subframe set A and the downlink subframe set B.

The first determining module 210 sends the first downlink subframe set to the first assignment module 220.

The first assignment module 220 is configured to receive the first downlink subframe set, and determine, in the first uplink subframe, a first PUCCH resource region according to the HARQ timing of the first uplink-downlink configuration, where the first PUCCH resource region is a resource region reserved for HARQ feedback information for the first downlink subframe set.

For example, the HARQ feedback information for the first downlink subframe set refers to HARQ feedback information for a PDSCH or downlink SPS release signaling sent in a downlink subframe in the first downlink subframe set.

For the first downlink subframe set, the first assignment module 220 determines a PUCCH resource region for the second group of UEs according to the HARQ timing of the first uplink-downlink configuration. Specifically, the first assignment module 220 assigns the first PUCCH resource region to the first downlink subframe set according to $M_1$ and j, where $M_1$ is a quantity of elements in a downlink subframe set A that is determined according to the HARQ timing of the first uplink-downlink configuration and that is associated with the first uplink subframe, and j is a sequence number, of a downlink subframe in the first downlink subframe set, in the downlink subframe set A. In this way, for the first downlink subframe set, the base station configures a same PUCCH resource region for both the first group of UEs and the second group of UEs, which not only avoids complexity of implementing the base station, but also reduces PUCCH resource overheads.

Specifically, the first assignment module 220 assigns, according to a formula:

$$n_{PUCCH}^{(1,p_x)}=(M_1-j-1)\cdot N_c+j\cdot N_{c+1}+n_{CCE}+x+N_{PUCCH}^{(1)}$$

a PUCCH resource region to a downlink subframe in the first downlink subframe set, where $N_{PUCCH}^{(1,p_x)}$ is a PUCCH resource in the first PUCCH resource region, $p_x$ is an antenna port number, where when an antenna port is $p_0$, x=0, when an antenna port is $p_1$, x=1, and it is similar when there are more antenna ports, $M_1$ is a quantity of elements in the downlink subframe set A that is determined according to the first uplink-downlink configuration and that is associated with the first uplink subframe, j is a sequence number, of a downlink subframe in the first downlink subframe set, in the downlink subframe set A, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE} < N_{c+1}$, $n_{CCE}$ is a number of a first CCE occupied by a PDCCH transmitted in a downlink subframe in the first downlink subframe set, and $N_{PUCCH}^{(1)}$ is an offset of the first PUCCH resource region, and is configured by using higher layer signaling, that is, a resource offset configured for the first group of UEs.

Therefore, for the first group of UEs and the second group of UEs, values of parameters $M_1$ and j used for determining a PUCCH resource of the first downlink subframe set are identical. Therefore, for the first group of UEs and the second group of UEs, PUCCH resource regions assigned to same downlink subframes are identical.

The second determining module 230 is configured to determine a second downlink subframe set, where the second downlink subframe set is associated with the first uplink subframe in the second uplink-downlink configuration, and the second downlink subframe set is not associated with the first uplink subframe in the first uplink-downlink configuration.

For example, the base station determines, according to the first uplink-downlink configuration, a downlink subframe set A associated with the first uplink subframe, and next, the base station determines, according to the second uplink-downlink configuration, a downlink subframe set B associated with the first uplink subframe; finally, the second determining module 230 determines that the second downlink subframe set is an intersection set of a complementary set $\overline{A}$ of the downlink subframe set A and the downlink subframe set B. That is, a downlink subframe included in the second downlink subframe set does not belong to the downlink subframe set A, but belongs to the downlink subframe set B.

The second determining module 230 sends the second downlink subframe set to the second assignment module 240.

The second assignment module 240 is configured to receive the second downlink subframe set, and determine, in the first uplink subframe, a second PUCCH resource region, where the second PUCCH resource region is a resource region reserved for HARQ feedback information for the second downlink subframe set.

In solution 1, the second assignment module includes a first determining unit 241, a second determining unit 243, and an assignment unit 245.

The first determining unit 241 is configured to determine $M_2$ and i, where $M_2$ is a quantity of elements in the second downlink subframe set, and i is a sequence number, of a downlink subframe in the second downlink subframe set, in the second downlink subframe set.

The second determining unit 243 is configured to determine an offset $N_A$, where the offset makes a PUCCH resource region assigned to the second downlink subframe set and a PUCCH resource region assigned to the first group of UEs completely stagger.

In a method for determining an offset, the second determining unit 243 makes an offset equal a quantity of downlink subframes associated with the first uplink subframe in the first uplink-downlink configuration multiplied by a maximum quantity of CCEs that can be configured in one downlink subframe.

In another method, the second determining unit 243 makes an offset equal a quantity of downlink subframes associated with the first uplink subframe in the first uplink-downlink configuration multiplied by a quantity of CCEs actually configured in one downlink subframe.

Specifically, the methods may be divided into the following four methods to determine an offset.

Method 1: A rule is predetermined in the standards, and the rule needs to ensure that PUCCH resource regions configured for the first group of UEs and the second group of UEs do not crash, thereby avoiding complexity of implementing a base station. For example, it is assumed that a PDCCH region occupies a maximum of four OFDM symbols, and $N_\Delta = M_1 \times N_4$, $M_1$ represents a quantity of elements in a downlink subframe set that is determined according to the first uplink-downlink configuration and that is associated with the first uplink subframe, or a distinction may be made according to a downlink system bandwidth, where when the downlink system bandwidth is less than or equal to 10 RBs, the PDCCH region occupies a maximum of four OFDM symbols $N_4$, or otherwise, the PDCCH region occupies a maximum of three OFDM symbols $N_3$; the second determining unit 243 determines an offset $N_\Delta$ according to the following formula:

$$N_\Delta = \begin{cases} M_1 \times N_4 & (N_{RB}^{DL} \leq 10) \\ M_1 \times N_3 & (N_{RB}^{DL} > 10) \end{cases}$$

Method 2: The second determining unit 243 sends higher layer signaling or physical layer signaling, where the higher layer signaling or physical layer signaling indicates $N_\Delta$. It should be noted that, for the first group of UEs, one offset $N_{PUCCH}^{(1)}$ is also configured by using higher layer signaling, and correspondingly, for the second downlink subframe set, an actual offset is $N_{PUCCH}^{(2)} = N_{PUCCH}^{(1)} + N_\Delta$; therefore, optionally, higher layer signaling or physical layer signaling is sent, where the higher layer signaling or physical layer signaling indicates $N_{PUCCH}^{(2)}$.

Method 3: Similarly, $N_\Delta = M_1 \times N_c$, and the second determining unit 243 sends higher layer signaling or physical layer signaling, where the higher layer signaling or physical layer signaling indicates a value of c.

The assignment unit 245 is configured to determine the second PUCCH resource region according to $M_2$, i, and the offset $N_\Delta$.

Specifically, the base station assigns a PUCCH resource to a downlink subframe in the second downlink subframe set according to a formula $n_{PUCCH2}^{(1,p_x)} = (M_2 - i - 1) \cdot N_c + i \cdot N_{c+1} + n_{CCE}' + x + N_{PUCCH}^{(2)}$, where $n_{PUCCH2}^{(1,p_x)}$ is a PUCCH resource in the second PUCCH resource region, $p_x$ is an antenna port number, where when an antenna port is $p_0$, x=0, and when an antenna port is $p_1$, x=1, $M_2$ is a quantity of elements in the second downlink subframe set, i is a sequence number, of a downlink subframe in the second downlink subframe set, in the second downlink subframe set, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by a second PDCCH, and $N_{PUCCH}^{(2)} = N_{PUCCH}^{(1)} + N_\Delta$ is an offset of the second PUCCH resource region.

Solution 2 is more flexible, and in solution 2, the second assignment module 240 also includes a first determining unit 241, a second determining unit 243, and an assignment unit 245.

The first determining unit 241 is configured to determine $M_3$ and i', where $M_3$ is a quantity of downlink subframes, in which PDCCH regions are configured, in the second downlink subframe set, and i' is a sequence number of a downlink subframe, in which a PDCCH region is configured, in the second downlink subframe set, or $M_3$ is a quantity of downlink subframes, for which PUCCH resource regions need to be reserved according to a PDCCH resource region, in the second downlink subframe set, and i' is a sequence number of a downlink subframe, for which a PUCCH resource region needs to be reserved according to a PDCCH resource region, in the second downlink subframe set. Optionally, the base station may notify the second group of UEs of values of $M_3$ and i' by using higher layer signaling or physical layer signaling.

The second determining unit 243 is configured to determine an offset $N_\Delta$ of the second PUCCH resource region, where the offset makes a PUCCH resource region assigned to the second downlink subframe set and a PUCCH resource region assigned to the first group of UEs completely stagger.

See the foregoing description of the second determining unit 243 for details, which are not described herein.

The assignment unit 245 is configured to determine, in the first uplink subframe, the second PUCCH resource region according to $M_3$, i', and the offset $N_\Delta$.

Specifically, the base station assigns a PUCCH resource to a downlink subframe in the second downlink subframe set according to a formula $n_{PUCCH2}^{(1,p_x)} = (M_3 - i' - 1) \cdot N_c + i' \cdot N_{c+1} + n_{CCE}' + x + N_{PUCCH}^{(2)}$, where $n_{PUCCH2}^{(1,p_x)}$ is a PUCCH resource in the second PUCCH resource region, $p_x$ is an antenna port number, where when an antenna port is $p_0$, x=0, and when an antenna port is $p_1$, x=1, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_\Delta$ is an offset of the second PUCCH resource region.

In this implementation manner, when a PUCCH resource region is assigned to a second group of UEs, for downlink subframes having same HARQ timing of the second group of UEs and a first group of UEs, the base station determines a PUCCH resource region according to a mapping rule of the first group of UEs, and for a downlink subframe having HARQ timing different from that of the first group of UEs, the base station determines a PUCCH resource region according to a new mapping rule, so as to ensure that there is no overlap with a PUCCH resource region of the first group of UEs; therefore, the method not only avoids complexity of implementing the base station, but also reduces PUCCH resource overheads.

Figure 16:
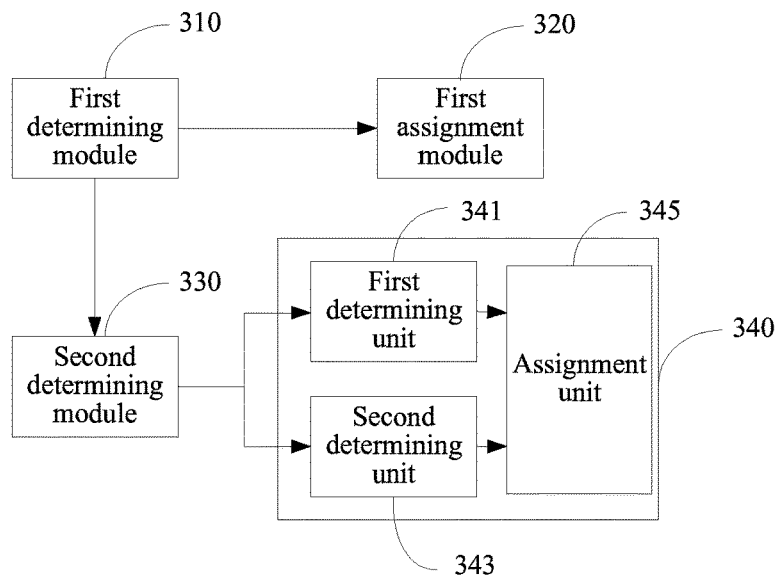
FIG. 16 is a schematic structural diagram of a first implementation manner of user equipment according to the present application.

Referring to FIG. 16, FIG. 16 is a schematic structural diagram of a first implementation manner of user equipment according to the present application. The user equipment in this implementation manner includes: a first determining module 310, a first assignment module 320, a second determining module 330, and a second assignment module 340. The first determining module 310 is configured to determine a first downlink subframe set, where the first downlink subframe set is associated with a first uplink subframe in both a first uplink-downlink configuration and a second uplink-downlink configuration.

For example, the UE is UE of a second group, that is, the second group of UEs are UEs that have a dynamic TDD uplink-downlink configuration capability; or the second group of UEs are UEs that are configured with a dynamic TDD uplink-downlink configuration by a base station; or the second group of UEs are later-released UEs, for example, UEs that support LTE Release-12, or support releases later than LTE Release-12.

The first uplink-downlink configuration is an uplink-downlink configuration applied to a first group of UEs. Although the UE is UE of the second group, the first uplink-downlink configuration may be acquired according to a manner of the first group of UEs, that is, by receiving higher layer signaling, and preferably, the UE acquires the first uplink-downlink configuration by receiving a SIB1.

The second uplink-downlink configuration is an uplink-downlink configuration applied to the second group of UEs. The second uplink-downlink configuration may be used for indicating uplink-downlink subframe assignment, and correspondingly, the UE may acquire the second uplink-downlink configuration by receiving physical layer signaling. Alternatively, preferably, the second uplink-downlink configuration may be a reference uplink-downlink configuration (reference UL-DL configuration), and the reference uplink-downlink configuration is used for determining HARQ timing of the UEs. The UE may acquire the second uplink-downlink configuration by receiving higher layer signaling (for example, RRC signaling), or it is predefined in the standards that a reference uplink-downlink configuration is uplink-downlink configuration 5 or uplink-downlink configuration 2, or a rule for determining a reference uplink-downlink configuration is predefined in the standards, and the base station and the UEs both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

Although different HARQ timing is defined for different uplink-downlink configurations, for some downlink subframes, same HARQ timing still exists in two uplink-downlink configurations. Therefore, the UE determines that one subframe set includes these downlink subframes, so as to subsequently reserve a PUCCH resource region according to a rule used by the first group of UEs.

Specific details of determining the first downlink subframe set are the same as those of determining the first downlink subframe set by the first determining module 210 in Embodiment 1 of the base station, and are not repeated herein.

The first assignment module 320 is configured to receive a first PDCCH in a third downlink subframe, and when the third downlink subframe belongs to the first downlink subframe set, determine, in the first uplink subframe, a third PUCCH resource according to HARQ timing of the first uplink-downlink configuration, where the third PUCCH resource is a PUCCH resource occupied by HARQ feedback information for a PDSCH scheduled by the first PDCCH or HARQ feedback information for downlink SPS release signaling indicated by the first PDCCH.

For example, for a downlink subframe in the first downlink subframe set, the UE determines a PUCCH resource region according to the HARQ timing of the first uplink-downlink configuration. Specifically, the UE determines the third PUCCH resource for the third downlink subframe according to $M_1$ and j, where $M_1$ is a quantity of elements in a downlink subframe set A that is determined according to the HARQ timing of the first uplink-downlink configuration and that is associated with the first uplink subframe, and j is a sequence number of the third downlink subframe in the downlink subframe set A.

Specifically, the first assignment module 320 assigns, according to a formula:

$$n_{PUCCH}^{(1,p_x)} = (M_1 - j - 1) \cdot N_c + j \cdot N_{c+1} + n_{CCE} + x + N_{PUCCH}^{(1)}$$

a PUCCH resource to the third downlink subframe, where $n_{PUCCH}^{(1,p_x)}$ is a PUCCH resource in the first PUCCH resource region, $p_x$ is an antenna port number, where when an antenna port is $p_0$, x=0, and when an antenna port is $p_1$, x=1, $M_1$ is a quantity of elements in the downlink subframe set A that is determined according to the first uplink-downlink configuration and that is associated with the first uplink subframe, j is a sequence number of the third downlink subframe in the downlink subframe set A, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by the first PDCCH, and $N_{PUCCH}^{(1)}$ is an offset of the first PUCCH resource region, and is configured by using higher layer signaling, that is, a resource offset configured for the first group of UEs.

In this way, for the first downlink subframe set, a same PUCCH resource region is configured for both the first group of UEs and the second group of UEs, and CCEs occupied by PDCCHs of different UEs are different, and therefore, determined PUCCH resources are also different, which not only avoids complexity of implementing a base station, but also reduces PUCCH resource overheads.

The second determining module 330 is configured to determine a second downlink subframe set, where the second downlink subframe set is associated with the first uplink subframe in the second uplink-downlink configuration, and the second downlink subframe set is not associated with the first uplink subframe in the first uplink-downlink configuration.

For example, the second determining module 330 determines the second downlink subframe set, where the second downlink subframe set is a complementary set of the first downlink subframe set in a downlink subframe set that is determined according to the second uplink-downlink configuration and that is associated with the first uplink subframe.

Specific details are the same as those of determining the second downlink subframe set by the second determining unit 230 in Embodiment 1 of the base station, and are not repeated herein.

The second assignment module 340 is configured to receive a second PDCCH in a fourth downlink subframe, and when the fourth downlink subframe belongs to the second downlink subframe set, determine the fourth PUCCH resource, where the fourth PUCCH resource is a PUCCH resource occupied by HARQ feedback information for a PDSCH scheduled by the second PDCCH or HARQ feedback information for downlink SPS release signaling indicated by the second PDCCH.

In solution 1, the second assignment module 340 includes a first determining unit 341, a second determining unit 343, and an assignment unit 345.

The first determining unit 341 is configured to determine $M_2$ and i, where $M_2$ is a quantity of elements in the second downlink subframe set, and i is a sequence number of the fourth downlink subframe in the second downlink subframe set.

The second determining unit 343 is configured to determine an offset $N_A$, where the offset makes a PUCCH resource region assigned to the second downlink subframe set and a PUCCH resource region assigned to the first group of UEs completely stagger.

In a method for determining an offset is that the second determining unit 343 makes an offset equal a quantity of downlink subframes associated with the first uplink subframe in the first uplink-downlink configuration multiplied by a maximum quantity of CCEs that can be configured in one downlink subframe.

In another method, the second determining unit 343 makes an offset equal a quantity of downlink subframes associated with the first uplink subframe in the first uplink-downlink configuration multiplied by a quantity of CCEs actually configured in one downlink subframe.

Specifically, the methods may be divided into the following four methods to determine an offset.

Method 1: A rule is predetermined in the standards, and the rule needs to ensure that PUCCH resource regions configured for the first group of UEs and the second group of UEs do not crash, thereby avoiding complexity of implementing a base station. For example, it is assumed that a PDCCH region occupies a maximum of four OFDM symbols, and $N_A = M_1 \times N_4$, $M_1$ represents a quantity of elements in a downlink subframe set that is determined according to the first uplink-downlink configuration and that is associated with the first uplink subframe, or a distinction may be made according to a downlink system bandwidth, where when the downlink system bandwidth is less than or equal to 10 RBs, the PDCCH region occupies a maximum of four OFDM symbols $N_4$, or otherwise, the PDCCH region occupies a maximum of three OFDM symbols $N_3$, the second determining unit 343 may determine an offset $N_A$ according to the following formula:

$$N_\Delta = \begin{cases} M_1 \times N_4 & (N_{RB}^{DL} \leq 10) \\ M_1 \times N_3 & (N_{RB}^{DL} > 10) \end{cases}$$

Method 2: The second determining unit 343 receives higher layer signaling or physical layer signaling, where the higher layer signaling or physical layer signaling indicates $N_A$. It should be noted that, for the first group of UEs, one offset PUCCH is also configured by using higher layer signaling, and correspondingly, for the second downlink subframe set, an actual offset is $N_{PUCCH}^{(2)} = N_{PUCCH}^{(1)} + N_A$; therefore, optionally, the UE receives higher layer signaling or physical layer signaling, where the higher layer signaling or physical layer signaling indicates $N_{PUCCH}^{(2)}$.

Method 3: Similarly, $N_A = M_1 \times N_c$, and the second determining unit 343 receives higher layer signaling or physical layer signaling, where the higher layer signaling or physical layer signaling indicates a value of c.

The assignment unit 345 is configured to determine, in the first uplink subframe, the fourth PUCCH resource according to $M_2$, i, and the offset $N_A$.

Specifically, the assignment unit 345 assigns, according to a formula:

$$n_{PUCCH2}^{(1,p_x)} = (M_2 - i - 1) \cdot N_c + i \cdot N_{c+1} + n_{CCE}' + x + N_{PUCCH}^{(2)}$$

a PUCCH resource to the fourth downlink subframe, where $n_{PUCCH2}^{(1,p_x)}$ is a fourth PUCCH resource in a second PUCCH resource region, $p_x$ is an antenna port number, where when an antenna port is $p_0$, x=0, and when an antenna port is $p_1$, x=1, $M_2$ is a quantity of elements in the second downlink subframe set, i is a sequence number of the fourth downlink subframe in the second downlink subframe set, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_A$ is an offset of the fourth PUCCH resource.

Solution 2 is more flexible. In solution 2, the second assignment module 340 includes a first determining unit 341, a second determining unit 343, and an assignment unit 345.

The first determining unit 341 is configured to determine $M_3$ and i', where $M_3$ is a quantity of downlink subframes, in which PDCCH regions are configured, in the second downlink subframe set, and i' is a sequence number of the fourth downlink subframe, or $M_3$ is a quantity of downlink subframes, for which PUCCH resource regions need to be reserved according to a PDCCH resource region, in the second downlink subframe set, and i' is a sequence number of the fourth downlink subframe. Optionally, the UE acquires values of $M_3$ and i' by receiving higher layer signaling or physical layer signaling sent by the base station.

The second determining unit 343 is configured to determine an offset $N_A$ of the second PUCCH resource region, where the offset makes a PUCCH resource region assigned to the second downlink subframe set and a PUCCH resource region assigned to the first group of UEs completely stagger.

See the description of the second determining unit 343 in the user equipment for details, which are not described herein.

The assignment unit 345 is configured to determine, in the first uplink subframe, the fourth PUCCH resource according to $M_3$, i', and the offset $N_A$.

Specifically, the assignment unit 345 assigns, according to a formula:

$$n_{PUCCH2}^{(1,p_x)} = (M_3 - i' - 1) \cdot N_c + i' \cdot N_{c+1} + n_{CCE}' + x + N_{PUCCH}^{(2)}$$

a PUCCH resource to the fourth downlink subframe, where $n_{PUCCH2}^{(1,p_x)}$ is a fourth PUCCH resource in the second PUCCH resource region, $p_x$ is an antenna port number, where when an antenna port is $p_0$, x=0, and when an antenna port is $p_1$, x=1, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_A$ is an offset of the fourth PUCCH resource.

In this implementation manner, when a PUCCH resource region is assigned to a second group of UEs, for downlink subframes having same HARQ timing of the second group of UEs and a first group of UEs, a base station determines a PUCCH resource region according to a mapping rule of the first group of UEs, and for a downlink subframe having HARQ timing different from that of the first group of UEs, the base station determines a PUCCH resource region according to a new mapping rule, so as to ensure that there is no overlap with a PUCCH resource region of the first group of UEs; therefore, the method not only avoids complexity of implementing the base station, but also reduces PUCCH resource overheads.

Figure 17:
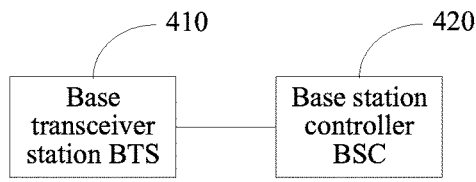
FIG. 17 is a schematic structural diagram of a second implementation manner of a base station according to the present application.

Referring to FIG. 17, FIG. 17 is a schematic structural diagram of a second implementation manner of a base station according to the present application. The base station in this implementation manner includes: a base transceiver station BTS 410 and a base station controller BSC 420. The base transceiver station 410 is coupled to the base station controller 420.

The base transceiver station 410 includes a radio transmission/receiving device, an antenna, and all special signal processing parts for a radio interface. The base transceiver station 410 is configured to be responsible for processing of mobile signal reception and transmission.

The base station controller 420 is configured to determine a first downlink subframe set, where the first downlink subframe set is associated with a first uplink subframe in both a first uplink-downlink configuration and a second uplink-downlink configuration.

For example, the base station determines two UE groups according to a UE capability, a service requirement, release information, or the like. For example, a first group of UEs are UEs that do not have a dynamic TDD uplink-downlink configuration capability, and a second group of UEs are UEs that have a dynamic TDD uplink-downlink configuration capability; or the first group of UEs are UEs that are not configured with a dynamic TDD uplink-downlink configuration by a base station, and the second group of UEs are UEs that are configured with a dynamic TDD uplink-downlink configuration by a base station; or the first group of UEs are legacy UEs, that is, backward compatible UEs (legacy UE), for example, UEs that support LTE Release-8/9/10/11, and the second group of UEs are later-released UEs, for example, UEs that support LTE Release-12, or support releases later than LTE Release-12.

The base station configures the first uplink-downlink configuration for the first group of UEs, that is, the first uplink-downlink configuration is an uplink-downlink configuration applied to the first group of UEs. The base station may notify the first group of UEs of the first uplink-downlink configuration by using higher layer signaling, preferably, by using a SIB1 (system information block 1). The higher layer signaling is relative to physical layer signaling, is signaling that is from a higher layer and has a smaller sending frequency, and includes Radio Resource Control (RRC) signaling, Media Access Control (MAC) signaling, and the like.

The base station configures the second uplink-downlink configuration for the second group of UEs, that is, the second uplink-downlink configuration is an uplink-downlink configuration applied to the second group of UEs. The second uplink-downlink configuration may be used for indicating uplink-downlink subframe assignment, in other words used for indicating a subframe that can be used for transmitting uplink-downlink data. Correspondingly, the second uplink-downlink configuration changes in a relatively dynamic manner, and the base station may notify, by using physical layer signaling, the second group of UEs of the second uplink-downlink configuration. Alternatively, preferably, the second uplink-downlink configuration may be a reference uplink-downlink configuration (reference UL-DL configuration), and the reference uplink-downlink configuration is used for determining HARQ timing of the UEs. In an application scenario of a dynamic TDD uplink-downlink configuration, an uplink-downlink configuration may change dynamically, and correspondingly, HARQ timing also changes dynamically. In this way, it is caused that within a period when an uplink-downlink configuration is changing, HARQ feedback information for some downlink packets cannot be sent; therefore, a reference uplink-downlink configuration is introduced, and even if the uplink-downlink configuration changes, the UEs also determine HARQ timing according to this configuration, thereby avoiding a problem that HARQ feedback information for a downlink packet cannot be sent within the period when the uplink-downlink configuration is changing. Preferably, the reference uplink-downlink configuration is a configuration in which a quantity of downlink subframes is larger than that of uplink subframes, for example, uplink-downlink configuration 5 or uplink-downlink configuration 2. There are three methods for configuring a reference uplink-downlink configuration: 1. The base station may notify, by using higher layer signaling (for example, RRC signaling), the second group of UEs of the second uplink-downlink configuration. 2. It is predefined in the standards that a reference uplink-downlink configuration is uplink-downlink configuration 5 or uplink-downlink configuration 2. 3. A rule for determining a reference uplink-downlink configuration is predefined in the standards, and the base station and the UEs both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

For the first group of UEs, PUCCH resource region assignment may be performed according to an existing algorithm. For the second group of UEs, PUCCH resource region assignment must be performed according to the following.

Although different HARQ timing is defined for different uplink-downlink configurations, for some downlink subframes, same HARQ timing still exists in two uplink-downlink configurations. Therefore, the base station determines that one subframe set includes these downlink subframes, so as to subsequently reserve a PUCCH resource region according to a rule.

Therefore, the base station determines the first downlink subframe set, where the first downlink subframe set is associated with the first uplink subframe in both the first uplink-downlink configuration and the second uplink-downlink configuration. The base station determines, according to HARQ timing of the first uplink-downlink configuration, a downlink subframe set A associated with the first uplink subframe, and next, the base station determines, according to HARQ timing of the second uplink-downlink configuration, a downlink subframe set B associated with the first uplink subframe; finally, the base station controller 420 determines that the first downlink subframe set is an intersection set of the downlink subframe set A and the downlink subframe set B.

The base station controller 420 is configured to receive the first downlink subframe set, and determine, in the first uplink subframe, a first PUCCH resource region according to the HARQ timing of the first uplink-downlink configuration, where the first PUCCH resource region is a resource region reserved for HARQ feedback information for the first downlink subframe set.

For example, the HARQ feedback information for the first downlink subframe set refers to HARQ feedback information for a PDSCH or downlink SPS release signaling sent in a downlink subframe in the first downlink subframe set.

For the first downlink subframe set, the base station controller 420 determines a PUCCH resource region for the second group of UEs according to the HARQ timing of the first uplink-downlink configuration. Specifically, the base station controller 420 assigns the first PUCCH resource region to the first downlink subframe set according to $M_1$ and j, where $M_1$ is a quantity of elements in a downlink subframe set A that is determined according to the HARQ timing of the first uplink-downlink configuration and that is associated with the first uplink subframe, and j is a sequence number, of a downlink subframe in the first downlink subframe set, in the downlink subframe set A. In this way, for the first downlink subframe set, the base station configures a same PUCCH resource region for both the first group of UEs and the second group of UEs, which not only avoids complexity of implementing the base station, but also reduces PUCCH resource overheads.

Specifically, the base station controller 420 assigns, according to a formula:

$$n_{PUCCH}^{(1,p_x)}=(M_1-j-1)\cdot N_c+j\cdot N_{c+1}+n_{CCE}+x+N_{PUCCH}^{(1)}$$

a PUCCH resource region to a downlink subframe in the first downlink subframe set, where $n_{PUCCH}^{(1,p_x)}$ is a PUCCH resource in the first PUCCH resource region, $p_x$ is an antenna port number, where when an antenna port is $p_0$, x=0, when an antenna port is $p_1$, x=1, and it is similar when there are more antenna ports, $M_1$ is a quantity of elements in the downlink subframe set A that is determined according to the first uplink-downlink configuration and that is associated with the first uplink subframe, j is a sequence number, of a downlink subframe in the first downlink subframe set, in the downlink subframe set A, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE} < N_{c+1}$, $n_{CCE}$ is a number of a first CCE occupied by a PDCCH transmitted in a downlink subframe in the first downlink subframe set, and $N_{PUCCH}^{(1)}$ is an offset of the first PUCCH resource region, and is configured by using higher layer signaling, that is, a resource offset configured for the first group of UEs.

Therefore, for the first group of UEs and the second group of UEs, values of parameters M and j used for determining a PUCCH resource of the first downlink subframe set are identical. Therefore, for the first group of UEs and the second group of UEs, PUCCH resource regions assigned to same downlink subframes are identical.

The base station controller 420 is configured to determine a second downlink subframe set, where the second downlink subframe set is associated with the first uplink subframe in the second uplink-downlink configuration, and the second downlink subframe set is not associated with the first uplink subframe in the first uplink-downlink configuration.

For example, the base station determines, according to the first uplink-downlink configuration, a downlink subframe set A associated with the first uplink subframe, and next, the base station determines, according to the second uplink-downlink configuration, a downlink subframe set B associated with the first uplink subframe; finally, the base station controller 420 determines that the second downlink subframe set is an intersection set of a complementary set $\overline{A}$ of the downlink subframe set A and the downlink subframe set B. That is, a downlink subframe included in the second downlink subframe set does not belong to the downlink subframe set A, but belongs to the downlink subframe set B.

The base station controller 420 is configured to receive the second downlink subframe set, and determine, in the first uplink subframe, a second PUCCH resource region, where the second PUCCH resource region is a resource region reserved for HARQ feedback information for the second downlink subframe set.

In solution 1, the base station controller 420 is configured to determine $M_2$ and i, where $M_2$ is a quantity of elements in the second downlink subframe set, and i is a sequence number, of a downlink subframe in the second downlink subframe set, in the second downlink subframe set.

The base station controller 420 is configured to determine an offset $N_\Delta$, where the offset makes a PUCCH resource region assigned to the second downlink subframe set and a PUCCH resource region assigned to the first group of UEs completely stagger.

In a method for determining an offset, the base station controller 420 makes an offset equal a quantity of downlink subframes associated with the first uplink subframe in the first uplink-downlink configuration multiplied by a maximum quantity of CCEs that can be configured in one downlink subframe.

In another method, the base station controller 420 makes an offset equal a quantity of downlink subframes associated with the first uplink subframe in the first uplink-downlink configuration multiplied by a quantity of CCEs actually configured in one downlink subframe.

Specifically, the methods may be divided into the following four methods to determine an offset.

Method 1: A rule is predetermined in the standards, and the rule needs to ensure that PUCCH resource regions configured for the first group of UEs and the second group of UEs do not crash, thereby avoiding complexity of implementing a base station. For example, it is assumed that a PDCCH region occupies a maximum of four OFDM symbols, and $N_\Delta=M_1 \times N_4$, $M_1$ represents a quantity of elements in a downlink subframe set that is determined according to the first uplink-downlink configuration and that is associated with the first uplink subframe, or a distinction may be made according to a downlink system bandwidth, where when the downlink system bandwidth is less than or equal to 10 RBs, the PDCCH region occupies a maximum of four OFDM symbols $N_4$, or otherwise, the PDCCH region occupies a maximum of three OFDM symbols $N_3$; the base station controller 420 determines an offset $N_\Delta$ according to the following formula:

$$N_\Delta = \begin{cases} M_1 \times N_4 & (N_{RB}^{DL} \leq 10) \\ M_1 \times N_3 & (N_{RB}^{DL} > 10) \end{cases}$$

Method 2: The base station controller 420 sends higher layer signaling or physical layer signaling, where the higher layer signaling or physical layer signaling indicates $N_\Delta$. It should be noted that, for the first group of UEs, one offset $N_{PUCCH}^{(1)}$ is also configured by using higher layer signaling, and correspondingly, for the second downlink subframe set, an actual offset is $N_{PUCCH}^{(2)}=N_{PUCCH}^{(1)}+N_\Delta$; therefore, optionally, the base station sends higher layer signaling or physical layer signaling, where the higher layer signaling or physical layer signaling indicates $N_{PUCCH}^{(2)}$.

Method 3: Similarly, $N_\Delta=M_1 \times N_c$, and the base station controller 420 sends higher layer signaling or physical layer signaling, where the higher layer signaling or physical layer signaling indicates a value of c.

The base station controller 420 is configured to determine the second PUCCH resource region according to $M_2$, i and the offset $N_\Delta$.

Specifically, the base station assigns a PUCCH resource to a downlink subframe in the second downlink subframe set according to a formula $n_{PUCCH2}^{(1,p_x)}=(M_2-i-1)\cdot N_c+i\cdot N_{c+1}+$ $n_{CCE}'+x+N_{PUCCH}^{(2)}$, where $n_{PUCCH2}^{(1,p_x)}$ is a PUCCH resource in the second PUCCH resource region, $p_x$ is an antenna port number, where when an antenna port is $p_0$, $x=0$, and when an antenna port is $p_1$, $x=1$, $M_2$ is a quantity of elements in the second downlink subframe set, i is a sequence number of a fourth downlink subframe in the second downlink subframe set, $N_c=\max\{0,\lfloor [N_{RB}^{DL} \cdot (N_{sc}^{RB} \cdot c-4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by a second PDCCH, and $N_{PUCCH}^{(2)} = N_{PUCCH}^{(1)} + N_\Delta$ is an offset of the second PUCCH resource region.

Solution 2 is more flexible, and in solution 2, the base station controller 420 is configured to determine $M_3$ and i', where $M_3$ is a quantity of downlink subframes, in which PDCCH regions are configured, in the second downlink subframe set, and i' is a sequence number of a downlink subframe, in which a PDCCH region is configured, in the second downlink subframe set, or $M_3$ is a quantity of downlink subframes, for which PUCCH resource regions need to be reserved according to a PDCCH resource region, in the second downlink subframe set, and i' is a sequence number of a downlink subframe, for which a PUCCH resource region needs to be reserved according to a PDCCH resource region, in the second downlink subframe set. Optionally, the base station may notify the second group of UEs of values of $M_3$ and i' by using higher layer signaling or physical layer signaling.

The base station controller 420 is configured to determine an offset $N_\Delta$ of the second PUCCH resource region, where the offset makes a PUCCH resource region assigned to the second downlink subframe set and a PUCCH resource region assigned to the first group of UEs completely stagger.

See the forgoing description of the base station controller 420 for details, which are not described herein.

The base station controller 420 is configured to determine, in the first uplink subframe, the second PUCCH resource region according to $M_3$, i', and the offset $N_\Delta$.

Specifically, the base station assigns a PUCCH resource to a downlink subframe in the second downlink subframe set according to a formula $n_{PUCCH2}^{(1,p_x)} = (M_3-i'-1) \cdot N_c + i' \cdot N_{c+1} + n_{CCE}' + x + N_{PUCCH}^{(2)}$, where $n_{PUCCH2}^{(1,p_x)}$ is a PUCCH resource in the second PUCCH resource region, $p_x$ is an antenna port number, where when an antenna port is $p_0$, $x=0$, and when an antenna port is $p_1$, $x=1$, $N_c=\max\{0,\lfloor [N_{RB}^{DL} \cdot (N_{sc}^{RB} \cdot c-4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by the second PDCCH, and $N_{PUCCH}^{(2)} = N_{PUCCH}^{(1)} + N_\Delta$ is an offset of the second PUCCH resource region.

In this implementation manner, when a PUCCH resource region is assigned to a second group of UEs, for downlink subframes having same HARQ timing of the second group of UEs and a first group of UEs, the base station determines a PUCCH resource region according to a mapping rule of the first group of UEs, and for a downlink subframe having HARQ timing different from that of the first group of UEs, the base station determines a PUCCH resource region according to a new mapping rule, so as to ensure that there is no overlap with a PUCCH resource region of the first group of UEs; therefore, the method not only avoids complexity of implementing the base station, but also reduces PUCCH resource overheads.

Figure 18:
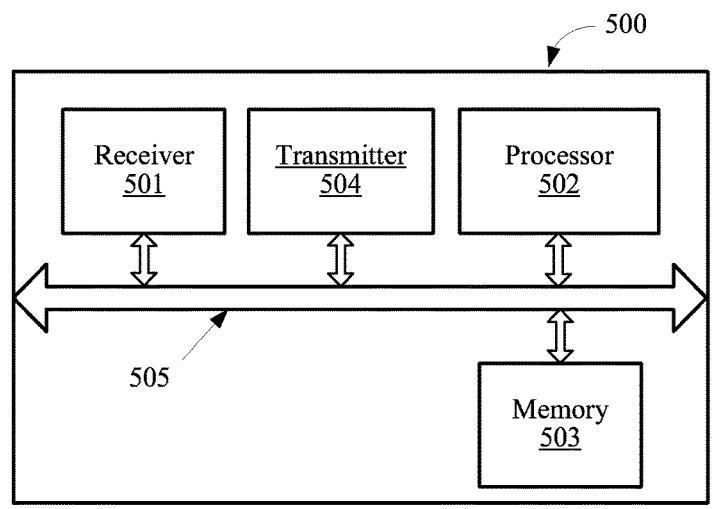
FIG. 18 is a schematic structural diagram of a second implementation manner of user equipment according to the 40 present application.

Referring to FIG. 18, FIG. 18 is a schematic structural diagram of a second implementation manner of user equipment according to the present application. The user equipment 500 in this implementation manner includes: a receiver 501, a processor 502, a memory 503, and a transmitter 504. The UE is UE of a second group, and the second group of UEs are UEs that have a dynamic TDD uplink-downlink configuration capability, or are UEs that are configured with a dynamic TDD uplink-downlink configuration, or are later-released UEs; a first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and a second uplink-downlink configuration is a reference uplink-downlink configuration that is applied to the second group of UEs and that is used for indicating HARQ timing of the second group of UEs, or an uplink-downlink configuration that is used for indicating uplink-downlink subframe assignment of the second group of UEs.

The receiver 501 may receive data in a wireless manner.

The processor 502 controls an operation of the user equipment 500, and the processor 502 may also be referred to as a CPU (Central Processing Unit). The processor 502 may be an integrated circuit chip and has a signal processing capability. The processor 502 may also be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 503 may include a read-only memory and a random access memory, and provides an instruction and data to the processor 502. A portion of the memory 503 may further include a non-volatile random access memory (NVRAM).

The transmitter 504 may send data in a wireless manner.

Components of the user equipment 500 are coupled together by using a bus system 505, where in addition to a data bus, the bus system 505 may further include a power bus, a control bus, a status signal bus, and the like. However, for clear description, various types of buses in the figure are all marked as the bus system 505.

The memory 503 stores the following elements, executable modules or data structures, or a subset thereof, or an extended set thereof: an operation instruction: including various operation instructions, used to implement various operations; and an operating system: including various system programs, configured to implement various basic services and process hardware-based tasks.

In this embodiment, the processor 502 executes the following operations by calling the operation instruction (the operation instruction may be stored in the operating system) stored in the memory 503: determining, by the processor 502, a first downlink subframe set, where the first downlink subframe set is associated with a first uplink subframe in both the first uplink-downlink configuration and the second uplink-downlink configuration; and receiving, by the receiver 501, a first PDCCH in a third downlink subframe, where the processor 502 is configured to: when the third downlink subframe belongs to the first downlink subframe set, determine, in the first uplink subframe, a third PUCCH resource according to HARQ timing of the first uplink-downlink configuration, where the third PUCCH resource is a PUCCH resource occupied by HARQ feedback information for a PDSCH scheduled by the first PDCCH or HARQ feedback information for downlink SPS release signaling indicated by the first PDCCH.

Optionally, the processor 502 is further configured to determine, in the first uplink subframe, the third PUCCH resource for the third downlink subframe according to $M_1$ and j, where $M_1$ is a quantity of elements in a downlink subframe set A that is determined according to the HARQ timing of the first uplink-downlink configuration and that is associated with the first uplink subframe, and j is a sequence number of the third downlink subframe in the downlink subframe set A.

Optionally, the processor 502 is further configured to determine the third PUCCH resource according to a formula $n_{PUCCH}^{(1,p_x)}=(M_1-j-1)\cdot N_c+j\cdot N_{c+1}+n_{CCE}+x+N_{PUCCH}^{(1)}$, where $n_{PUCCH}^{(1,p_x)}$ is the third PUCCH resource, $p_x$ is an antenna port number, x is a non-negative integer, $N_c=\max\{0, \lfloor [N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE} < N_{c+1}$, $n_{CCE}$ is a number of a first CCE occupied by the first PDCCH, and $N_{PUCCH}^{(1)}$ is an offset of the third PUCCH resource.

Optionally, the processor 502 is further configured to determine a second downlink subframe set, where the second downlink subframe set is associated with the first uplink subframe in the second uplink-downlink configuration, and the second downlink subframe set is not associated with the first uplink subframe in the first uplink-downlink configuration; the receiver 501 is further configured to receive a second PDCCH in a fourth downlink subframe; and the processor 502 is further configured to: when the fourth downlink subframe belongs to the second downlink subframe set, determine a fourth PUCCH resource, where the fourth PUCCH resource is a PUCCH resource occupied by HARQ feedback information for a PDSCH scheduled by the second PDCCH or HARQ feedback information for downlink SPS release signaling indicated by the second PDCCH.

Optionally, the processor 502 is further configured to determine $M_2$ and i, where $M_2$ is a quantity of elements in the second downlink subframe set, and i is a sequence number of the fourth downlink subframe in the second downlink subframe set; determine a second offset $N_A$; and determine, in the first uplink subframe, the fourth PUCCH resource according to $M_2$, i, and the second offset $N_A$.

Optionally, the receiver 501 is further configured to receive first signaling and determine $M_2$ and i, where the first signaling indicates $M_2$ and i, where $M_2$ is a quantity of downlink subframes, for which PUCCH resource regions need to be reserved according to a PDCCH resource region, in the second downlink subframe set, and i is a sequence number of the fourth downlink subframe. The processor 502 is further configured to determine a second offset $N_A$, and determine, in the first uplink subframe, the fourth PUCCH resource according to $M_2$, i, and the second offset $N_A$.

Optionally, the processor 502 is further configured to determine that the second offset $N_A$ equals a quantity of downlink subframes associated with the first uplink subframe in the first uplink-downlink configuration multiplied by a maximum quantity of CCEs that can be configured in one downlink subframe; or the receiver 501 is further configured to receive second signaling and determine the second offset $N_A$, where the second signaling indicates the second offset $N_A$ or $N_{PUCCH}^{(2)}$, where $N_{PUCCH}^{(2)}=N_{PUCCH}^{(1)}+N_A$; or the receiver 501 is further configured to receive third signaling and determine the second offset $N_A=M_1 \times N_c$, where the third signaling indicates a value of c.

Optionally, the processor 502 is further configured to determine the fourth PUCCH resource according to a formula $n_{PUCCH2}^{(1,p_x)}=(M_2-i-1)\cdot N_c+i\cdot N_{c+1}+n_{CCE}'+x+N_{PUCCH}^{(2)}$, where $n_{PUCCH2}^{(1,p_x)}$ is the fourth PUCCH resource, $p_x$ is an antenna port number, x is a non-negative integer, $N_c=\max\{0, \lfloor [N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, it is made that $N_c \leq n_{CCE}' < N_{c+1}$, $n_{CCE}'$ is a number of a first CCE occupied by the second PDCCH, and $N_{PUCCH}^{(2)}=N_{PUCCH}^{(1)}+N_A$ is an offset of the fourth PUCCH resource.

The methods disclosed in the foregoing embodiments may be applied to the processor 502, or implemented by using the processor 502. In an implementation process, the steps of the foregoing methods may be completed by using a hardware integrated logical circuit or a software-form instruction in the processor 502. The processor 502 may implement or execute methods, steps, and logical block diagrams that are disclosed in the embodiments. Steps of the methods disclosed with reference to the embodiments may be directly executed and completed by means of a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory 503, and the processor 502 reads information in the memory 503 and completes the steps of the foregoing methods in combination with hardware of the processor 502.

In this implementation manner, when a PUCCH resource region is assigned to a second group of UEs, for downlink subframes having same HARQ timing of the second group of UEs and a first group of UEs, a base station determines a PUCCH resource region according to a mapping rule of the first group of UEs, and for a downlink subframe having HARQ timing different from that of the first group of UEs, the base station determines a PUCCH resource region according to a new mapping rule, so as to ensure that there is no overlap with a PUCCH resource region of the first group of UEs; therefore, the methods not only avoid complexity of implementing the base station, but also reduce PUCCH resource overheads.

Figure 19:
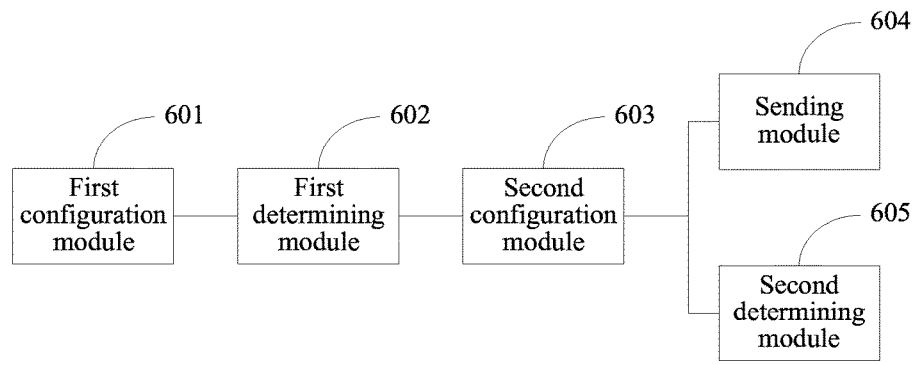
FIG. 19 is a schematic structural diagram of a third implementation manner of a base station according to the present application.

Referring to FIG. 19, FIG. 19 is a schematic structural diagram of a third implementation manner of a base station according to the present application. The base station in the present application includes: a first configuration module 601, a first determining module 602, a second configuration module 603, a sending module 604, and a second determining module 605.

The first configuration module 601 is configured to configure a second uplink-downlink configuration. A first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs are UEs that have a dynamic TDD uplink-downlink configuration capability, or are UEs that are configured with a dynamic TDD uplink-downlink configuration, or are later-released UEs.

The base station configures the first uplink-downlink configuration for the first group of UEs, that is, the first uplink-downlink configuration is an uplink-downlink configuration applied to the first group of UEs. The base station may notify the first group of UEs of the first uplink-downlink configuration by using higher layer signaling, preferably, by using a SIB1 (system information block 1). The higher layer signaling is relative to physical layer signaling, is signaling that is from a higher layer and has a smaller sending frequency, and includes Radio Resource Control (RRC) signaling, Media Access Control (MAC) signaling, and the like.

The first configuration module 601 configures the second uplink-downlink configuration for the second group of UEs, that is, the second uplink-downlink configuration is an uplink-downlink configuration applied to the second group of UEs. The second uplink-downlink configuration may be used for indicating uplink-downlink subframe assignment, in other words used for indicating a subframe that can be used for transmitting uplink-downlink data. Correspondingly, the second uplink-downlink configuration changes in a relatively dynamic manner, and the base station may notify, by using physical layer signaling, the second group of UEs of the second uplink-downlink configuration. Alternatively, preferably, the second uplink-downlink configuration may be a reference uplink-downlink configuration (reference UL-DL configuration), and the reference uplink-downlink configuration is used for determining HARQ timing of the UEs. In an application scenario of a dynamic TDD uplink-downlink configuration, an uplink-downlink configuration may change dynamically, and correspondingly, HARQ timing also changes dynamically. In this way, it is caused that within a period when an uplink-downlink configuration is changing, HARQ feedback information for some downlink packets cannot be sent; therefore, a reference uplink-downlink configuration is introduced, and even if the uplink-downlink configuration changes, the UEs also determine HARQ timing according to this configuration, thereby avoiding a problem that HARQ feedback information for a downlink packet cannot be sent within the period when the uplink-downlink configuration is changing. Preferably, the reference uplink-downlink configuration is a configuration in which a quantity of downlink subframes is larger than that of uplink subframes, for example, uplink-downlink configuration 5 or uplink-downlink configuration 2. There are three methods for configuring a reference uplink-downlink configuration: 1. The base station may notify, by using higher layer signaling (for example, RRC signaling), the second group of UEs of the second uplink-downlink configuration. 2. It is predefined in the standards that a reference uplink-downlink configuration is uplink-downlink configuration 5 or uplink-downlink configuration 2. 3. A rule for determining a reference uplink-downlink configuration is predefined in the standards, and the base station and the UE both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

The first determining module 602 is configured to determine a fifth downlink subframe according to HARQ timing of the second uplink-downlink configuration, where the fifth downlink subframe is associated with a first uplink subframe.

For example, the fifth downlink subframe is associated with the first uplink subframe, that is, HARQ feedback information for a PDSCH (scheduled by a PDCCH) or downlink SPS release signaling transmitted in the fifth downlink subframe is carried in the first uplink subframe. The first determining module 602 may need to send HARQ feedback information for multiple downlink subframes in the first uplink subframe according to the HARQ timing of the second uplink-downlink configuration. The fifth downlink subframe discussed herein may be any downlink subframe of the multiple downlink subframes, and has universality. For example, the second uplink-downlink configuration is a configuration 1, and according to the HARQ timing of the second uplink-downlink configuration, HARQ feedback information for downlink subframes whose subframe numbers are 5 and 6 is fed back on an uplink subframe whose subframe number is 2; therefore, the fifth downlink subframe may be a downlink subframe 5, or may be a downlink subframe 6.

The second configuration module 603 is configured to configure a PUCCH resource parameter of the fifth downlink subframe, where the PUCCH resource parameter includes M, m, and $N_{PUCCH}^{(2)}$, or where the PUCCH resource parameter includes M, m, and $N_A$.

For example, the second configuration module 603 may adaptively configure M according to a current subframe configuration status, where M is a positive integer. M indicates a discrete level of a PUCCH resource region corresponding to the fifth downlink subframe. As discussed above, when one downlink subframe set has multiple downlink subframes, PUCCH resource regions of the multiple downlink subframes are distributed in a staggered manner. For example, a PUCCH resource region corresponding to the fifth downlink subframe is divided into three pieces or four pieces, when the base station configures that M=1, the three pieces or four pieces of PUCCH resource regions are continuous, and when the base station configures that M>1, the three pieces or four pieces of PUCCH resource regions are discrete, where a larger value of M indicates a higher discrete level.

m is a sequence number of the fifth downlink subframe, where m is a non-negative integer and is less than M. For example, when M=1, the base station can configure only that a sequence number of the fifth downlink subframe is 0, and when M=2, the base station may configure that a sequence number of the fifth downlink subframe is 0 or 1.

$N_{PUCCH}^{(2)}=N_{PUCCH}^{(1)}+N_A$ is an offset of the PUCCH resource region corresponding to the fifth downlink subframe, $N_{PUCCH}^{(2)}$ is a non-negative integer, $N_A$ is a non-negative integer, $N_{PUCCH}^{(1)}$ is an offset of a PUCCH resource configured for the first group of UEs. The base station may adaptively configure $N_{PUCCH}^{(2)}$ or $N_A$, or may configure $N_{PUCCH}^{(2)}$ or $N_A$ by using the method given in step S1052 in Embodiment 1.

The sending module 604 is configured to send fourth signaling, where the fourth signaling indicates the PUCCH resource parameter, or the fourth signaling indicates at least one parameter of M, m, and $N_{PUCCH}^{(2)}$, or the fourth signaling indicates at least one parameter of M, m, and $N_A$.

The fourth signaling may be higher layer signaling, or may be physical layer signaling. When the fourth signaling is physical layer signaling, the fourth signaling may be carried by using a PDCCH/ePDCCH; for example, the fourth signaling and signaling for indicating an uplink-downlink subframe configuration share one PDCCH.

The second determining module 605 is configured to determine, in the first uplink subframe according to M, m, and $N_{PUCCH}^{(2)}$, a fifth PUCCH resource region located in the first uplink subframe, where the fifth PUCCH resource region is a resource region reserved for HARQ feedback information for the fifth downlink subframe.

Specifically, the second determining module 605 determines the fifth PUCCH resource region according to a formula $n_{PUCCH}^{(1,\tilde{p}_x)}=(M-m-1)\cdot N_c+m\cdot N_{c+1}+n_{CCE}+x+N_{PUCCH}^{(2)}$, where $n_{PUCCH}^{(1,\tilde{p}_x)}$ is a PUCCH resource in the fifth PUCCH resource region, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to {0, 1, 2, 3} it is made that $N_c \leq n_{CCE} < N_{c+1}$, $n_{CCE}$ is a number of a first CCE occupied by a PDCCH transmitted in the fifth downlink subframe, and $N_{PUCCH}^{(2)}=N_{PUCCH}^{(1)}+N_\Delta$ is an offset of the fifth PUCCH resource region.

The base station provided in this embodiment has higher flexibility of configuration, and according to a current subframe configuration status and a data scheduling status, the base station may adaptively configure at least one parameter of M, m, and $N_{PUCCH}^{(2)}$, which not only avoids increasing complexity of implementing the base station, but also can greatly reduce reserved PUCCH resources. For example, when a first group of UEs in a system has a very small quantity or the first group of UEs perform transmission in only limited downlink subframes (for example, although the first group of UEs may perform transmission in downlink subframes 0, 1, 5, and 6, the base station schedules the first group of UEs in only the subframe 0), the base station may configure at least one parameter of M, m, and $N_{PUCCH}^{(2)}$ to enable a PUCCH resource region reserved for a second group of UEs and a PUCCH resource region reserved for the first group of UEs to overlap partially or overlap completely.

Figure 20:
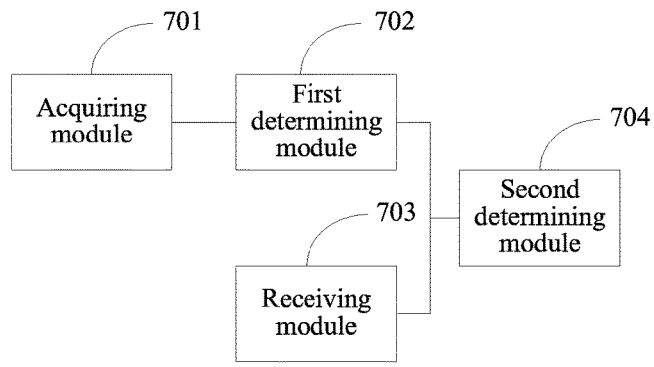
FIG. 20 is a schematic structural diagram of a third implementation manner of user equipment according to the present application.

Referring to FIG. 20, FIG. 20 is a schematic structural diagram of a third implementation manner of user equipment according to the present application. The user equipment in this implementation manner includes: an acquiring module 701, a first determining module 702, a receiving module 703, and a second determining module 704.

The acquiring module 701 is configured to acquire a second uplink-downlink configuration.

The UE is UE of a second group. The second group of UEs are UEs that have a dynamic TDD uplink-downlink configuration capability; or the second group of UEs are UEs that are configured with a dynamic TDD uplink-downlink configuration by a base station; or the second group of UEs are later-released UEs, for example, UEs that support LTE Release-12, or support releases later than LTE Release-12.

A first uplink-downlink configuration is an uplink-downlink configuration applied to a first group of UEs. Although the UE is UE of the second group, the first uplink-downlink configuration may be acquired according to a manner of the first group of UEs, that is, by receiving higher layer signaling, and preferably, the UE acquires the first uplink-downlink configuration by receiving a SIB1.

The second uplink-downlink configuration is an uplink-downlink configuration applied to the second group of UEs. The second uplink-downlink configuration may be used for indicating uplink-downlink subframe assignment, and correspondingly, the UE may acquire the second uplink-downlink configuration by receiving physical layer signaling.

Alternatively, preferably, the second uplink-downlink configuration may be a reference uplink-downlink configuration (reference UL-DL configuration), and the reference uplink-downlink configuration is used for determining HARQ timing of the UEs. The UE may acquire the second uplink-downlink configuration by receiving higher layer signaling (for example, RRC signaling), or it is predefined in the standards that a reference uplink-downlink configuration is uplink-downlink configuration 5 or uplink-downlink configuration 2, or a rule for determining a reference uplink-downlink configuration is predefined in the standards, and the base station and the UE both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

The first determining module 702 is configured to determine a fifth downlink subframe according to HARQ timing of the second uplink-downlink configuration, where the fifth downlink subframe is associated with a first uplink subframe.

The fifth downlink subframe is associated with the first uplink subframe, that is, HARQ feedback information for a PDSCH (scheduled by a PDCCH) or downlink SPS release signaling transmitted in the fifth downlink subframe is carried in the first uplink subframe. Specific details are the same as those in S301 in Embodiment 3, and are not repeated herein.

The receiving module 703 is configured to receive fourth signaling sent by the base station and determine a PUCCH resource parameter of the fifth downlink subframe, where the PUCCH resource parameter includes M, m, and $N_{PUCCH}^{(2)}$, or the PUCCH resource parameter includes M, m, and $N_\Delta$, and the fourth signaling indicates the PUCCH resource parameter, or the fourth signaling indicates at least one parameter of M, m, and $N_{PUCCH}^{(2)}$, or the fourth signaling indicates at least one parameter of M, m, and $N_\Delta$.

The fourth signaling may be higher layer signaling, or may be physical layer signaling. When the fourth signaling is physical layer signaling, the fourth signaling may be carried by using a PDCCH/ePDCCH; for example, the fourth signaling and signaling for indicating an uplink-downlink subframe configuration share one PDCCH.

The UE determines the PUCCH resource parameter of the fifth downlink subframe according to the fourth signaling, and a PUCCH resource parameter that is not included in the fourth signaling is determined by the UE according to a predefined rule, for example, the rule described in Embodiment 2.

The second determining module 704 is configured to receive a third PDCCH in the fifth downlink subframe, and determine, according to M, m, and $N_{PUCCH}^{(2)}$, a fifth PUCCH resource located in the first uplink subframe, where the fifth PUCCH resource is a PUCCH resource occupied by HARQ feedback information for a PDSCH scheduled by the third PDCCH or HARQ feedback information for downlink SPS release signaling indicated by the third PDCCH.

Specifically, the base station determines the fifth PUCCH resource according to a formula $n_{PUCCH}^{(1,\tilde{p}_x)}=(M-m-1)\cdot N_c+m\cdot N_{c+1}+n_{CCE}+x+N_{PUCCH}^{(2)}$, where $n_{PUCCH}^{(1,\tilde{p}_x)}$ is the fifth PUCCH resource, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to {0, 1, 2, 3}, it is made that $N_c \leq n_{CCE} < N_{c+1}$, $n_{CCE}$ is a number of a first CCE occupied by the third PDCCH, and $N_{PUCCH}^{(2)} = N_{PUCCH}^{(1)} + N_\Delta$ is an offset of the fifth PUCCH resource.

For the user equipment provided in this embodiment, an adaptive base station has higher flexibility of configuration, and according to a current subframe configuration status and a data scheduling status, the base station may adaptively configure at least one parameter of M, m, and $N_{PUCCH}^{(2)}$, which not only avoids increasing complexity of implementing the base station, but also can greatly reduce reserved PUCCH resources.

Figure 21:
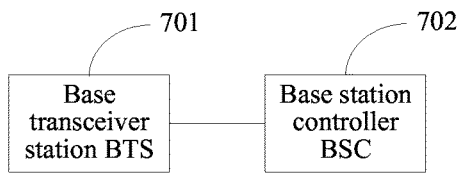
FIG. 21 is a schematic structural diagram of a fourth implementation manner of a base station according to the present application.

Referring to FIG. 21, FIG. 21 is a schematic structural diagram of a fourth implementation manner of a base station according to the present application. The base station in this implementation manner includes: a base transceiver station BTS 701 and a base station controller BSC 702. The base transceiver station 701 is coupled to the base station controller 702.

The base transceiver station 701 includes a radio transmission/receiving device, an antenna, and all special signal processing parts for a radio interface. The base transceiver station 701 is configured to be responsible for processing of mobile signal reception and transmission.

The base station controller 702 is configured to configure a second uplink-downlink configuration. A first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs are UEs that have a dynamic TDD uplink-downlink configuration capability, or are UEs that are configured with a dynamic TDD uplink-downlink configuration, or are later-released UEs.

The base station configures the first uplink-downlink configuration for the first group of UEs, that is, the first uplink-downlink configuration is an uplink-downlink configuration applied to the first group of UEs. The base station may notify the first group of UEs of the first uplink-downlink configuration by using higher layer signaling, preferably, by using a SIB1 (system information block 1). The higher layer signaling is relative to physical layer signaling, is signaling that is from a higher layer and has a smaller sending frequency, and includes Radio Resource Control (RRC) signaling, Media Access Control (MAC) signaling, and the like.

The base station controller 702 configures the second uplink-downlink configuration for the second group of UEs, that is, the second uplink-downlink configuration is an uplink-downlink configuration applied to the second group of UEs. The second uplink-downlink configuration may be used for indicating uplink-downlink subframe assignment, in other words used for indicating a subframe that can be used for transmitting uplink-downlink data. Correspondingly, the second uplink-downlink configuration changes in a relatively dynamic manner, and the base station may notify, by using physical layer signaling, the second group of UEs of the second uplink-downlink configuration. Alternatively, preferably, the second uplink-downlink configuration may be a reference uplink-downlink configuration, and the reference uplink-downlink configuration is used for determining HARQ timing of the UEs. In an application scenario of a dynamic TDD uplink-downlink configuration, an uplink-downlink configuration may change dynamically, and correspondingly, HARQ timing also changes dynamically. In this way, it is caused that within a period when an uplink-downlink configuration is changing, HARQ feedback information for some downlink packets cannot be sent; therefore, a reference uplink-downlink configuration is introduced, and even if the uplink-downlink configuration changes, the UEs also determine HARQ timing according to this configuration, thereby avoiding a problem that HARQ feedback information for a downlink packet cannot be sent within the period when the uplink-downlink configuration is changing. Preferably, the reference uplink-downlink configuration is a configuration in which a quantity of downlink subframes is larger than that of uplink subframes, for example, uplink-downlink configuration 5 or uplink-downlink configuration 2. There are three methods for configuring a reference uplink-downlink configuration: 1. The base station may notify, by using higher layer signaling (for example, RRC signaling), the second group of UEs of the second uplink-downlink configuration. 2. It is predefined in the standards that a reference uplink-downlink configuration is uplink-downlink configuration 5 or uplink-downlink configuration 2. 3. A rule for determining a reference uplink-downlink configuration is predefined in the standards, and the base station and the UE both determine a reference uplink-downlink configuration according to this rule. For example, when two uplink-downlink configurations before and after switching both belong to a downlink-to-uplink switching point period of 5 ms, uplink-downlink configuration 2 is used as a reference uplink-downlink configuration; and when either of the two uplink-downlink configurations before and after switching belongs to a downlink-to-uplink switching point period of 10 ms, uplink-downlink configuration 5 is used as a reference uplink-downlink configuration.

The base station controller 702 is configured to determine a fifth downlink subframe according to HARQ timing of the second uplink-downlink configuration, where the fifth downlink subframe is associated with a first uplink subframe.

For example, the fifth downlink subframe is associated with the first uplink subframe, that is, HARQ feedback information for a PDSCH (scheduled by an PDCCH) or downlink SPS release signaling transmitted in the fifth downlink subframe is carried in the first uplink subframe. The base station controller 702 may need to send HARQ feedback information for multiple downlink subframes in the first uplink subframe according to the HARQ timing of the second uplink-downlink configuration. The fifth downlink subframe discussed herein may be any downlink subframe of the multiple downlink subframes, and has universality. For example, the second uplink-downlink configuration is a configuration 1, and according to the HARQ timing of the second uplink-downlink configuration, HARQ feedback information for downlink subframes whose subframe numbers are 5 and 6 is fed back in an uplink subframe whose subframe number is 2; therefore, the fifth downlink subframe may be a downlink subframe 5, or may be a downlink subframe 6.

The base station controller 702 is configured to configure a PUCCH resource parameter of the fifth downlink subframe, where the PUCCH resource parameter includes M, m, and $N_{PUCCH}^{(2)}$, or the PUCCH resource parameter includes M, m, and $N_A$.

For example, the base station controller 702 may adaptively configure M according to a current subframe configuration status, where M is a positive integer. M indicates a discrete level of a PUCCH resource region corresponding to the fifth downlink subframe. As discussed above, when one downlink subframe set has multiple downlink subframes, PUCCH resource regions of the multiple downlink subframes are distributed in a staggered manner. For example, a PUCCH resource region corresponding to the fifth downlink subframe is divided into three pieces or four pieces, when the base station configures that M=1, the three pieces or four pieces of PUCCH resource regions are continuous, and when the base station configures that M>1, the three pieces or four pieces of PUCCH resource regions are discrete, where a larger value of M indicates a higher discrete level.

m is a sequence number of the fifth downlink subframe, where m is a non-negative integer and is less than M. For example, when M=1, the base station can configure only that a sequence number of the fifth downlink subframe is 0, and when M=2, the base station may configure that a sequence number of the fifth downlink subframe is 0 or 1.

$N_{PUCCH}^{(2)} = N_{PUCCH}^{(1)} + N_A$ is an offset of the PUCCH resource region corresponding to the fifth downlink subframe, $N_{PUCCH}^{(2)}$ is a non-negative integer, $N_A$ is a non-negative integer, $N_{PUCCH}^{(1)}$ is an offset of a PUCCH resource configured for the first group of UEs. The base station may adaptively configure $N_{PUCCH}^{(2)}$ or $N_A$, or may configure $N_{PUCCH}^{(2)}$ or $N_A$ by using the method given in step S1052 in Embodiment 1.

The base station controller 702 is configured to send fourth signaling, where the fourth signaling indicates the PUCCH resource parameter, or the fourth signaling indicates at least one parameter of M, m, and $N_{PUCCH}^{(2)}$, or the fourth signaling indicates at least one parameter of M, m, and $N_A$.

The fourth signaling may be higher layer signaling, or may be physical layer signaling. When the fourth signaling is physical layer signaling, the fourth signaling may be carried by using a PDCCH/ePDCCH; for example, the fourth signaling and signaling for indicating an uplink-downlink subframe configuration share one PDCCH.

The base station controller 702 is configured to determine, in the first uplink subframe according to M, m, and $N_{PUCCH}^{(2)}$, a fifth PUCCH resource region located in the first uplink subframe, where the fifth PUCCH resource region is a resource region reserved for HARQ feedback information for the fifth downlink subframe.

Specifically, the base station controller 702 determines the fifth PUCCH resource region according to a formula $n_{PUCCH}^{(1,p_x)} = (M-m-1) \cdot N_c + m \cdot N_{c+1} + n_{CCE} + x + N_{PUCCH}^{(2)}$, where $n_{PUCCH}^{(1,p_x)}$ is a PUCCH resource in the fifth PUCCH resource region, $p_x$ is an antenna port number, x is a non-negative integer, $N_c = \max\{0, [[N_{RB}^{DL} \cdot (N_{sc}^{RB} \cdot c - 4)]/36]\}$, $N_{RB}^{DL}$ is a downlink system bandwidth, $N_{sc}^{RB}$ is a frequency domain size of a resource block, c belongs to $\{0, 1, 2, 3\}$ it is made that $N_c \leq n_{CCE} < N_{c+1}$, $n_{CCE}$ is a number of a first CCE occupied by a PDCCH transmitted in the fifth downlink subframe, and $N_{PUCCH}^{(2)} = N_{PUCCH}^{(1)} + N_A$ is an offset of the fifth PUCCH resource region.

The base station provided in this embodiment has higher flexibility of configuration, and according to a current subframe configuration status and a data scheduling status, the base station may adaptively configure at least one parameter of M, m, and $N_{PUCCH}^{(2)}$, which not only avoids increasing complexity of implementing the base station, but also can greatly reduce reserved PUCCH resources. For example, when a first group of UEs in a system has a very small quantity or the first group of UEs perform transmission in only limited downlink subframes (for example, although the first group of UEs may perform transmission in downlink subframes 0, 1, 5, and 6, the base station schedules the first group of UEs in only the subframe 0), the base station may configure at least one parameter of M, m, and $N_{PUCCH}^{(2)}$ to enable a PUCCH resource region reserved for a second group of UEs and a PUCCH resource region reserved for the first group of UEs to overlap partially or overlap completely.

Figure 22:
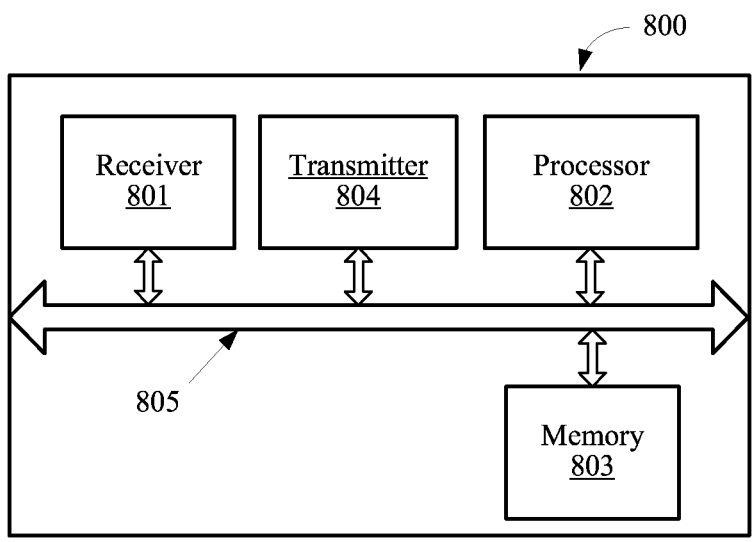
FIG. 22 is a schematic structural diagram of a fourth implementation manner of user equipment according to the present application.

Referring to FIG. 22, FIG. 22 is a schematic structural diagram of a fourth implementation manner of user equipment according to the present application. The user equipment 800 in this implementation manner includes: a receiver 801, a processor 802, a memory 803 and a transmitter 804. The UE is UE of a second group, and the second group of UEs are UEs that have a dynamic TDD uplink-downlink configuration capability, or are UEs that are configured with a dynamic TDD uplink-downlink configuration, or are later-released UEs; a first uplink-downlink configuration is an uplink-downlink configuration used by a first group of user equipments UEs, and the first group of UEs are UEs that do not have a dynamic TDD uplink-downlink configuration capability, or are UEs that are not configured with a dynamic TDD uplink-downlink configuration, or are legacy UEs; and a second uplink-downlink configuration is a reference uplink-downlink configuration that is applied to the second group of UEs and that is used for indicating HARQ timing of the second group of UEs, or an uplink-downlink configuration that is used for indicating uplink-downlink subframe assignment of the second group of UEs.

The receiver 801 may receive data in a wireless manner.

The processor 802 controls an operation of the user equipment 800, and the processor 802 may also be referred to as a CPU (Central Processing Unit). The processor 802 may be an integrated circuit chip and has a signal processing capability. The processor 802 may be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 803 may include a read-only memory and a random access memory, and provides an instruction and data to the processor 802. A portion of the memory 803 may further include a non-volatile random access memory (NVRAM).

The transmitter 804 may send data in a wireless manner.

Components of the user equipment 800 are coupled together by using a bus system 805, where in addition to a data bus, the bus system 805 may further include a power bus, a control bus, a status signal bus, and the like. However, for clear description, various types of buses in the figure are all marked as the bus system 805.

The memory 803 stores the following elements, executable modules or data structures, or a subset thereof, or an extended set thereof: an operation instruction: including various operation instructions, used to implement various operations; and an operating system: including various system programs, configured to implement various basic services and process hardware-based tasks.

In this embodiment, the processor 802 executes the following operations by calling the operation instruction (the operation instruction may be stored in the operating system) stored in the memory 803: acquiring, by the receiver 801, a second uplink-downlink configuration, and determining, by the processor 802, the fifth downlink subframe according to HARQ timing of the second uplink-downlink configuration, where the fifth downlink subframe is associated with a first uplink subframe; receiving, by the receiver 801, fourth signaling sent by a base station and determining a PUCCH resource parameter of the fifth downlink subframe, where the PUCCH resource parameter includes M, m, and $N_{PUCCH}^{(2)}$, or where the PUCCH resource parameter includes M, m, and $N_A$, and the fourth signaling indicates the PUCCH resource parameter, or the fourth signaling indicates at least one parameter of M, m, and $N_{PUCCH}^{(2)}$, or the fourth signaling indicates at least one parameter of M, m, and $N_A$; receiving, by the receiver 801, a third PDCCH in the fifth downlink subframe, and determining, by the processor 802 according to M, m, and $N_{PUCCH}^{(2)}$, a fifth PUCCH resource located in the first uplink subframe, where the fifth PUCCH resource is a PUCCH resource occupied by HARQ feedback information for a PDSCH scheduled by the third PDCCH or HARQ feedback information for downlink SPS release signaling indicated by the third PDCCH.

The methods disclosed in the foregoing embodiments may be applied to the processor 802, or implemented by using the processor 802. In an implementation process, the steps of the foregoing methods may be completed by using a hardware integrated logical circuit or a software-form instruction in the processor 802. The processor 802 may implement or execute methods, steps, and logical block diagrams that are disclosed in the embodiments. Steps of the methods disclosed with reference to the embodiments may be directly executed and completed by means of a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory 803, and the processor 802 reads information in the memory 803 and completes the steps of the foregoing methods in combination with hardware of the processor 802.

For the user equipment provided in this embodiment, an adaptive base station has higher flexibility of configuration, and according to a current subframe configuration status and a data scheduling status, the base station may adaptively configure at least one parameter of M, m, and $N_{PUCCH}^{(2)}$, which not only avoids increasing complexity of implementing the base station, but also can greatly reduce reserved PUCCH resources.

In the several implementation manners provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual needs to achieve the objectives of the solutions of the implementation manners.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of the present application. The foregoing storage medium includes: any medium that can store program code, such as a USB flash drive, a portable hard disk, a read-only memory (ROM), a random access memory (RAM), a magnetic disk, or an optical disc.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A method, comprising:
   determining, by a network device, a first downlink subframe set, wherein the first downlink subframe set is associated with a first uplink subframe in both a first uplink-downlink configuration and a second uplink-downlink configuration;
   determining, in the first uplink subframe by the network device, a first physical uplink control channel (PUCCH) resource region according to hybrid automatic repeat request (HARQ) timing of the first uplink-downlink configuration, wherein the first PUCCH resource region is a resource region reserved for HARQ feedback information for the first downlink subframe set;
   determining, by the network device, a second downlink subframe set, wherein the second downlink subframe set is associated with the first uplink subframe in the second uplink-downlink configuration, and the second downlink subframe set is not associated with the first uplink subframe in the first uplink-downlink configuration;
   determining, in the first uplink subframe by the network device, a second PUCCH resource region, wherein the second PUCCH resource region is a resource region reserved for HARQ feedback information for the sec- ond downlink subframe set, and wherein determining the second PUCCH resource region comprises:
  determining $M_2$ and i, wherein $M_2$ is a quantity of elements in the second downlink subframe set, and i is a sequence number of a downlink subframe in the second downlink subframe set;
  determining a first offset $N_A$; and
  determining, in the first uplink subframe, the second PUCCH resource region according to $M_2$, i and the first offset $N_A$;
indicating the determined first PUCCH resource region and the second PUCCH resource region to a first user equipment; and
receiving HARQ feedback information of the first UE in the first PUCCH resource region and the second PUCCH resource region.

2. The method according to claim 1, wherein
the first uplink-downlink configuration is an uplink-downlink configuration used by a first group of user equipment (UEs), and the first group of UEs do not have a dynamic time division duplex (TDD) uplink-downlink configuration capability, or are not configured with a dynamic TDD uplink-downlink configuration, or are legacy UEs; and
the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs are UEs that have a dynamic TDD uplink-downlink configuration capability, or are UEs that are configured with a dynamic TDD uplink-downlink configuration, or are later-released UEs.

3. The method according to claim 1, wherein determining the first PUCCH resource region according to HARQ timing of the first uplink-downlink configuration further comprises:
  determining, in the first uplink subframe, the first PUCCH resource region for a downlink subframe in the first downlink subframe set according to $M_1$ and j, wherein $M_1$ is a quantity of elements in a downlink subframe set A that is determined according to the HARQ timing of the first uplink-downlink configuration and that is associated with the first uplink subframe, and j is a sequence number, of a downlink subframe in the first downlink subframe set and in the downlink subframe set A.

4. The method according to claim 3, wherein determining the first PUCCH resource region for a downlink subframe in the first downlink subframe set according to $M_1$ and j further comprises:
  determining the first PUCCH resource region according to a relation $n_{PUCCH}^{(1,p_x)}=(M_1-j-1)\cdot N_c+j\cdot N_{c+1}+n_{CCE}+x+N_{PUCCH}^{(1)}$, wherein $n_{PUCCH}^{(1,p_x)}$ is a PUCCH resource in the first PUCCH resource region, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, $N_c\leq n_{CCE}<N_{c+1}$, $n_{CCE}$ is a number of a first control channel element (CCE) occupied by a physical downlink control channel (PDCCH) transmitted in a downlink subframe in the first downlink subframe set, and $N_{PUCCH}^{(1)}$ is an offset of the first PUCCH resource region.

5. The method according to claim 1, wherein determining the first offset $N_A$ comprises:
  determining that the first offset $N_A$ equals a quantity of downlink subframes associated with the first uplink subframe in the first uplink-downlink configuration multiplied by a maximum quantity of control channel elements (CCEs) that can be configured in one downlink subframe; or
  configuring the first offset $N_A$, wherein indicating the determined second PUCCH resource region to the first user equipment comprises sending first signaling to the first user equipment, wherein the first signaling indicates the first offset $N_A$ or $N_{PUCCH}^{(2)}$, wherein $N_{PUCCH}^{(2)}=N_{PUCCH}^{(1)}+N_A$, wherein $N_{PUCCH}^{(2)}$ is an offset of the second PUCCH resource region and $N_{PUCCH}^{(1)}$ is an offset of the first PUCCH resource region; or,
  configuring the first offset $N_A=M_1\times N_c$, wherein indicating the determined second PUCCH resource region to the first user equipment comprises sending second signaling to the first user equipment, wherein the second signaling indicates a value of c, wherein $M_1$ is a quantity of elements in a downlink subframe set A, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, and $N_c\leq n_{CCE}<N_{c+1}$, $n_{CCE}$ is a number of a first control channel element (CCE) occupied by a physical downlink control channel (PDCCH) transmitted in a downlink subframe in the first downlink subframe set.

6. The method according to claim 1, wherein determining, in the first uplink subframe, the second PUCCH resource region according to $M_2$, i, and the first offset $N_A$ further comprises:
  determining the second PUCCH resource region according to a relation $n_{PUCCH2}^{(1,p_x)}=(M_2-i-1)\cdot N_c+i\cdot N_{c+1}+n_{CCE}'+x+N_{PUCCH}^{(2)}$, where $n_{PUCCH2}^{(1,p_x)}$ is a PUCCH resource in the second PUCCH resource region, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, $N_c\leq n_{CCE}'<N_{c+1}$, $n_{CCE}'$ is a number of a first control channel element (CCE) occupied by a physical downlink control channel (PDCCH) transmitted in a downlink subframe in the second downlink subframe set, and $N_{PUCCH}^{(2)}=N_{PUCCH}^{(1)}+N_A$, wherein $N_{PUCCH}^{(2)}$ is an offset of the second PUCCH resource region and $N_{PUCCH}^{(1)}$ is an offset of the first PUCCH resource region.

7. The method according to claim 1, wherein indicating the determined second PUCCH resource region to the first user equipment comprises:
  sending first signaling, wherein the first signaling indicates $M_2$ and i, wherein $M_2$ is a quantity of downlink subframes for which PUCCH resource regions need to be reserved according to a PDCCH resource region in the second downlink subframe set, and i is a sequence number of a downlink subframe for which a PUCCH resource region needs to be reserved according to a PDCCH resource region in the second downlink subframe set.

8. A method, comprising:
  determining, by user equipment (UE), a first downlink subframe set, wherein the first downlink subframe set is associated with a first uplink subframe in both a first uplink-downlink configuration and a second uplink-downlink configuration;

receiving, by the UE, a first physical downlink control channel (PDCCH) in a first downlink subframe, wherein the first downlink subframe belongs to the first downlink subframe set;

determining, by the UE in the first uplink subframe, a first physical uplink control channel (PUCCH) resource according to hybrid automatic repeat request (HARQ) timing of the first uplink-downlink configuration, wherein the first PUCCH resource is a PUCCH resource occupied by HARQ feedback information for a physical downlink shared channel (PDSCH) scheduled by the first PDCCH or HARQ feedback information for downlink semi-persistent scheduling (SPS) release signaling indicated by the first PDCCH;

determining, by the UE, a second downlink subframe set, wherein the second downlink subframe set is associated with the first uplink subframe in the second uplink-downlink configuration, and the second downlink subframe set is not associated with the first uplink subframe in the first uplink-downlink configuration;

receiving, by the UE, a second PDCCH in a second downlink subframe, the second downlink subframe belonging to the second downlink subframe set;

determining a second PUCCH resource, wherein the second PUCCH resource is a PUCCH resource occupied by HARQ feedback information for a PDSCH scheduled by the second PDCCH or HARQ feedback information for downlink SPS release signaling indicated by the second PDCCH, wherein and determining the second PUCCH resource comprises:

determining $M_2$ and i, wherein $M_2$ is a quantity of elements in the second downlink subframe set, and i is a sequence number of the second downlink subframe in the second downlink subframe set;

determining a first offset $N_A$; and determining, in the first uplink subframe, the second PUCCH resource according to $M_2$, i, and the first offset $N_A$; and sending, by the UE, HARQ feedback information using the determined second PUCCH resource.

9. The method according to claim 8, wherein:
the UE is included in a second group, and the second group of UEs have a dynamic time division duplex (TDD) uplink-downlink configuration capability, or are configured with a dynamic TDD uplink-downlink configuration, or are later-released UEs;

the first uplink-downlink configuration is an uplink-downlink configuration used by a first group of UEs, and the first group of UEs do not have a dynamic TDD uplink-downlink configuration capability, or are not configured with a dynamic TDD uplink-downlink configuration, or are legacy UEs; and the second uplink-downlink configuration is a reference uplink-downlink configuration that is applied to the second group of UEs and that is used for indicating HARQ timing of the second group of UEs, or an uplink-downlink configuration that is used for indicating uplink-downlink subframe assignment of the second group of UEs.

10. The method according to claim 8, wherein determining the first PUCCH resource according to HARQ timing of the first uplink-downlink configuration comprises:

determining, in the first uplink subframe, the first PUCCH resource for the first downlink subframe according to $M_1$ and j, wherein $M_1$ is a quantity of elements in a downlink subframe set A that is determined according to the HARQ timing of the first uplink-downlink configuration and that is associated with the first uplink subframe, and j is a sequence number of the first downlink subframe in the downlink subframe set A.

11. The method according to claim 10, wherein determining the first PUCCH resource for the first downlink subframe according to $M_1$ and j further comprises:

determining the first PUCCH resource according to a relation $n_{PUCCH}^{(1,p_x)} = (M_1 - j - 1) \cdot N_c + j \cdot N_{c+1} + n_{CCE} + x + N_{PUCCH}^{(1)}$, wherein $n_{PUCCH}^{(1,p_x)}$ is the first PUCCH resource, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, $N_c \leq n_{CCE} < N_{c+1}$, $n_{CCE}$ is a number of a first control channel element (CCE) occupied by the first PDCCH, and $N_{PUCCH}^{(1)}$ is an offset of the first PUCCH resource.

12. The method according to claim 8, wherein determining the first offset $N_A$ comprises:

determining that the first offset $N_A$ equals a quantity of downlink subframes associated with the first uplink subframe in the first uplink-downlink configuration multiplied by a maximum quantity of control channel elements (CCEs) that can be configured in one downlink subframe; or receiving first signaling and determining the first offset $N_A$ of the second PUCCH resource, wherein the first signaling indicates the first offset $N_A$ or $N_{PUCCH}^{(2)}$, wherein $N_{PUCCH}^{(2)} = N_{PUCCH}^{(1)} + N_A$, wherein $N_{PUCCH}^{(2)}$ is an offset of the second PUCCH resource and $N_{PUCCH}^{(1)}$ is an offset of the first PUCCH resource region; or, receiving second signaling and determining the first offset $N_A = M_1 \times N_c$, wherein the second signaling indicates a value of c, wherein $M_1$ is a quantity of elements in a downlink subframe set A, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, and $N_c \leq n_{CCE} < N_{c+1}$, and $n_{CCE}$ is a number of a first control channel element (CCE) occupied by a physical downlink control channel (PDCCH) transmitted in a downlink subframe in the first downlink subframe set.

13. The method according to claim 8, wherein determining the second PUCCH resource according to $M_2$, i, and the first offset $N_A$ comprises:

determining the second PUCCH resource according to a relation $n_{PUCCH2}^{(1,p_x)} = (M_2 - i - 1) \cdot N_c + i \cdot N_{c+1} + n_{CCE}' + x + N_{PUCCH}^{(2)}$, wherein $n_{PUCCH2}^{(1,p_x)}$ is the second PUCCH resource, $p_x$ is an antenna port number, x is a non-negative integer, $N_c = \max\{0, \lfloor [N_{RB}^{DL} \cdot (N_{sc}^{RB} \cdot c - 4)]/36 \rfloor\}$, $N_{RB}^{DL}$ is a downlink system bandwidth, $N_{sc}^{RB}$ is a frequency domain size of a resource block, c belongs to $\{0, 1, 2, 3\}$, $N_c \leq n_{CCE}' < N_{c+1}$, $n_{CCE}'$ is a number of a first control channel element (CCE) occupied by the second PDCCH, and $N_{PUCCH}^{(2)} = N_{PUCCH}^{(1)} + N_A$, wherein $N_{PUCCH}^{(2)}$ is an offset of the second PUCCH resource and $N_{PUCCH}^{(1)}$ is an offset of the first PUCCH resource region.

14. The method according to claim 8, wherein determining the second PUCCH resource comprises:

receiving first signaling, wherein the first signaling indicates $M_2$ and i, wherein $M_2$ is a quantity of downlink subframes for which PUCCH resource regions need to be reserved according to a PDCCH resource region in the second downlink subframe set, and i is a sequence number of the second downlink subframe.

15. A base station, comprising:
a base transceiver station (BTS); and
a base station controller (BSC);
wherein the base transceiver station is coupled to the base station controller, and the base station controller is configured to:
   determine a first downlink subframe set, wherein the first downlink subframe set is associated with a first uplink subframe in both a first uplink-downlink configuration and a second uplink-downlink configuration;
   determine, in the first uplink subframe, a first physical uplink control channel (PUCCH) resource region according to hybrid automatic repeat request (HARQ) timing of the first uplink-downlink configuration, wherein the first PUCCH resource region is a resource region reserved for HARQ feedback information for the first downlink subframe set;
   determine a second downlink subframe set, wherein the second downlink subframe set is associated with the first uplink subframe in the second uplink-downlink configuration, and the second downlink subframe set is not associated with the first uplink subframe in the first uplink-downlink configuration;
   determine, in the first uplink subframe, a second PUCCH resource region, wherein the second PUCCH resource region is a resource region reserved for HARQ feedback information for the second downlink subframe set;
   determine $M_2$ and i, wherein $M_2$ is a quantity of elements in the second downlink subframe set, i is a sequence number of a downlink subframe in the second downlink subframe set;
   determine a first offset $N_A$;
   determine, in the first uplink subframe, the second PUCCH resource region according $M_2$, i, and the first offset $N_A$;
   indicate the determined first PUCCH resource region and second PUCCH resource region to a user equipment (UE); and
   receive HARQ feedback information of the UE in the first PUCCH resource region and the second PUCCH resource region.

16. The base station according to claim 15, wherein:
the first uplink-downlink configuration is an uplink-downlink configuration used by a first group of user equipments (UEs), and the first group of UEs do not have a dynamic time division duplex (TDD) uplink-downlink configuration capability, or are not configured with a dynamic TDD uplink-downlink configuration, or are legacy UEs; and
the second uplink-downlink configuration is a reference uplink-downlink configuration that is applied to a second group of UEs and that is used for indicating HARQ timing of the second group of UEs, or an uplink-downlink configuration that is used for indicating uplink-downlink subframe assignment of the second group of UEs, and the second group of UEs have a dynamic TDD uplink-downlink configuration capability, or are configured with a dynamic TDD uplink-downlink configuration, or are later-released UEs.

17. The base station according to claim 15, wherein the base station controller is further configured to:
   determine, in the first uplink subframe, the first PUCCH resource region for a downlink subframe in the first downlink subframe set according to $M_1$ and j, wherein $M_1$ is a quantity of elements in a downlink subframe set A that is determined according to the HARQ timing of the first uplink-downlink configuration and that is associated with the first uplink subframe, and j is a sequence number, of a downlink subframe in the first downlink subframe set, in the downlink subframe set A.

18. The base station according to claim 17, wherein the base station controller is further configured to determine the first PUCCH resource region according to a relation $n_{PUCCH}^{(1,\tilde{p}_x)}=(M_1-j-1)\cdot N_c+j\cdot N_{c+1}+n_{CCE}+x+N_{PUCCH}^{(1)}$, wherein $n_{PUCCH}^{(1,\tilde{p}_x)}$ is a PUCCH resource in the first PUCCH resource region, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, $N_c \leq n_{CCE} < N_{c+1}$, $n_{CCE}$ is a number of a first control channel element (CCE) occupied by a physical downlink control channel (PDCCH) transmitted in a downlink subframe in the first downlink subframe set, and $N_{PUCCH}^{(1)}$ is an offset of the first PUCCH resource region.

19. The base station according to claim 15, wherein the base station controller being configured to indicate the determined first PUCCH resource region and second PUCCH resource region to the UE comprises the base station controller being configured to:
   send first signaling to the UE, wherein the first signaling indicates $M_2$ and i, wherein $M_2$ is a quantity of downlink subframes, for which PUCCH resource regions need to be reserved according to a physical downlink control channel (PDCCH) resource region, in the second downlink subframe set, and i is a sequence number of a downlink subframe, for which a PUCCH resource region needs to be reserved according to a PDCCH resource region, in the second downlink subframe set.

20. The base station according to claim 15, wherein the base station controller is further configured to:
   determine that the first offset $N_A$ equals a quantity of downlink subframes associated with the first uplink subframe in the first uplink-downlink configuration multiplied by a maximum quantity of control channel elements (CCEs) that can be configured in one downlink subframe; or
   configure the first offset $N_A$, wherein indicating the determined second PUCCH resource region to the UE comprises sending first signaling to the UE, wherein the first signaling indicates the first offset $N_A$ or $N_{PUCCH}^{(2)}$, wherein $N_{PUCCH}^{(2)}=N_{PUCCH}^{(1)}+N_A$, wherein $N_{PUCCH}^{(2)}$ is an offset of the second PUCCH resource region and $N_{PUCCH}^{(1)}$ is an offset of the first PUCCH resource region; or
   configure the first offset $N_A=M_1\times N_c$, wherein indicating the determined second PUCCH resource region to the UE comprises sending second signaling, wherein the second signaling indicates a value of c, wherein $M_1$ is a quantity of elements in a downlink subframe set A, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, and $N_c \leq n_{CCE} < N_{c+1}$, $n_{CCE}$ is a number of a first control channel element (CCE) occupied by a physical downlink control channel (PDCCH) transmitted in a downlink subframe in the first downlink subframe set.

21. The base station according to claim 15, wherein the base station controller is further configured to determine the second PUCCH resource region according to a relation $n_{PUCCH2}^{(1,p_x)}=(M_2-i-1)\cdot N_c+i\cdot N_{c+1}+n_{CCE}'+x+N_{PUCCH}^{(2)}$, where $n_{PUCCH2}^{(1,p_x)}$ is a PUCCH resource in the second PUCCH resource region, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, $N_c \le n_{CCE}' < N_{c+1}$, $n_{CCE}'$ is a number of a first control channel element (CCE) occupied by a physical downlink control channel (PDCCH) transmitted in a downlink subframe in the second downlink subframe set, and $N_{PUCCH}^{(2)}=N_{PUCCH}^{(1)}+N_A$, wherein $N_{PUCCH}^{(2)}$ is an offset of the second PUCCH resource region and $N_{PUCCH}^{(1)}$ is an offset of the first PUCCH resource region.

22. A user equipment (UE), comprising:
a receiver;
a processor; and
a transmitter;
wherein the processor is separately coupled to the receiver and the transmitter, and the processor is configured to determine a first downlink subframe set, wherein the first downlink subframe set is associated with a first uplink subframe in both a first uplink-downlink configuration and a second uplink-downlink configuration;
wherein the receiver is configured to receive a first physical downlink control channel (PDCCH) in a first downlink subframe; and
wherein the processor is further configured to:
determine that the first downlink subframe belongs to the first downlink subframe set; and
determine, in the first uplink subframe, a first physical uplink control channel (PUCCH) resource according to hybrid automatic repeat request (HARQ) timing of the first uplink-downlink configuration, wherein the first PUCCH resource is a PUCCH resource occupied by HARQ feedback information for a physical downlink shared channel (PDSCH) scheduled by the first PDCCH or HARQ feedback information for downlink semi-persistent scheduling (SPS) release signaling indicated by the first PDCCH;
determine a second downlink subframe set, wherein the second downlink subframe set is associated with the first uplink subframe in the second uplink-downlink configuration, and the second downlink subframe set is not associated with the first uplink subframe in the first uplink-downlink configuration;
wherein the receiver is further configured to receive a second PDCCH in a second downlink subframe;
wherein the processor is further configured to in response to the second downlink subframe belonging to the second downlink subframe set, determine a second PUCCH resource, wherein the second PUCCH resource is a PUCCH resource occupied by HARQ feedback information for a PDSCH scheduled by the second PDCCH or HARQ feedback information for downlink SPS release signaling indicated by the second PDCCH;
wherein the processor is further configured to:
determine $M_2$ and i, wherein $M_2$ is a quantity of elements in the second downlink subframe set, and i is a sequence number of the second downlink subframe in the second downlink subframe set;
determine a first offset $N_A$; and
determine, in the first uplink subframe, the second PUCCH resource according to $M_2$, i and the first offset $N_A$; and wherein the transmitter is configured to send HARQ feedback information in the determined second PUCCH resource.

23. The user equipment according to claim 22, wherein:
the UE belongs to a second group, and the second group of UEs have a dynamic time division duplex (TDD) uplink-downlink configuration capability, or are configured with a dynamic TDD uplink-downlink configuration, or are later-released UEs;
the first uplink-downlink configuration is an uplink-downlink configuration used by a first group of user UEs, and the first group of UEs do not have a dynamic TDD uplink-downlink configuration capability, or are not configured with a dynamic TDD uplink-downlink configuration, or are legacy UEs; and
the second uplink-downlink configuration is a reference uplink-downlink configuration that is applied to the second group of UEs and that is used for indicating HARQ timing of the second group of UEs, or an uplink-downlink configuration that is used for indicating uplink-downlink subframe assignment of the second group of UEs.

24. The user equipment according to claim 22, wherein the processor is further configured to determine, in the first uplink subframe, the first PUCCH resource for the first downlink subframe according to $M_1$ and j, wherein $M_1$ is a quantity of elements in a downlink subframe set A that is determined according to the HARQ timing of the first uplink-downlink configuration and that is associated with the first uplink subframe, and j is a sequence number of the first downlink subframe in the downlink subframe set A.

25. The user equipment according to claim 24, wherein the processor is further configured to determine the first PUCCH resource according to a relation $n_{PUCCH}^{(1,p_x)}=(M_1-j-1)\cdot N_c+j\cdot N_{c+1}+n_{CCE}+x+N_{PUCCH}^{(1)}$, wherein $n_{PUCCH}^{(1,p_x)}$ is the first PUCCH resource, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, $N_c \le n_{CCE} < N_{c+1}$, $n_{CCE}$ is a number of a first control channel element (CCE) occupied by the first PDCCH, and $N_{PUCCH}^{(1)}$ is an offset of the first PUCCH resource.

26. The user equipment according to claim 22, wherein:
the receiver is further configured to receive first signaling, wherein the first signaling indicates $M_2$ and i, wherein $M_2$ is a quantity of downlink subframes, for which PUCCH resource regions need to be reserved according to a PDCCH resource region, in the second downlink subframe set, and i is a sequence number of the second fourth downlink subframe.

27. The user equipment according to claim 22, wherein:
the processor is further configured to determine that the first offset $N_A$ equals a quantity of downlink subframes associated with the first uplink subframe in the first uplink-downlink configuration multiplied by a maximum quantity of control channel elements (CCEs) that can be configured in one downlink subframe; or
the receiver is further configured to receive first signaling and determine the first offset $N_A$, wherein the first signaling indicates the first offset $N_A$ or $N_{PUCCH}^{(2)}$, wherein $N_{PUCCH}^{(2)}=N_{PUCCH}^{(1)}+N_A$, wherein $N_{PUCCH}^{(2)}$ is an offset of the second PUCCH resource region and $N_{PUCCH}^{(1)}$ is an offset of the first PUCCH resource region; or
the receiver is further configured to receive second signaling and determine the first offset $N_A=M_1\times N_c$, wherein the second signaling indicates a value of c, wherein $M_1$ is a quantity of elements in a downlink subframe set A, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, and $N_c \leq n_{CCE} < N_{c+1}$, $n_{CCE}$ is a number of a first control channel element (CCE) occupied by a physical downlink control channel (PDCCH) transmitted in a downlink subframe in the first downlink subframe set.

28. The user equipment according to claim 22, wherein the processor is further configured to determine the second PUCCH resource according to a relation $n_{PUCCH2}^{(1,p_x)}=(M_2-i-1)\cdot N_c+i\cdot N_{c+1}+n_{CCE}'+x+N_{PUCCH}^{(2)}$, wherein $n_{PUCCH2}^{(1,p_x)}$ is the second PUCCH resource, $p_x$ is an antenna port number, x is a non-negative integer, $N_c=\max\{0,\lfloor[N_{RB}^{DL}\cdot(N_{sc}^{RB}\cdot c-4)]/36\rfloor\}$, $N_{RB}^{DL}$ is a downlink system bandwidth, $N_{sc}^{RB}$ is a frequency domain size of a resource block, c belongs to $\{0, 1, 2, 3\}$, $N_c \leq n_{CCE}' < N_{c+1}$, $n_{CCE}'$ is a number of a first control channel element (CCE) occupied by the second PDCCH, and $N_{PUCCH}^{(2)}=N_{PUCCH}^{(1)}+N_\Delta$, wherein $N_{PUCCH}^{(2)}$ is an offset of the second PUCCH resource and $N_{PUCCH}^{(1)}$ is an offset of the first PUCCH resource region.

* * * * *